US012691039B2

(12) United States Patent
Tsuda et al.

(10) Patent No.: US 12,691,039 B2
(45) Date of Patent: Jul. 28, 2026

(54) DRUG SORTATION APPARATUS

(71) Applicant: YUYAMA MFG. Co., LTD., Osaka (JP)

(72) Inventors: Hiromichi Tsuda, Osaka (JP); Kosuke Ito, Osaka (JP); Takumi Onoue, Osaka (JP); Takao Kumaki, Osaka (JP)

(73) Assignee: Yuyama MFG. Co., LTD., Osaka (JP)

( * ) Notice: Subject to any disclaimer, the term of this patent is extended or adjusted under 35 U.S.C. 154(b) by 0 days.

(21) Appl. No.: 18/395,158

(22) PCT Filed: Jun. 27, 2022

(86) PCT No.: PCT/JP2022/025456

§ 371 (c)(1),
(2) Date: Dec. 22, 2023

(87) PCT Pub. No.: WO2023/276915

PCT Pub. Date: Jan. 5, 2023

(65) Prior Publication Data

US 2025/0099338 A1 Mar. 27, 2025

(30) Foreign Application Priority Data

Jun. 29, 2021 (JP) ................................ 2021-108099
Jun. 8, 2022 (JP) ................................ 2022-093260

(51) Int. Cl.
*B65B 35/00* (2006.01)
*A61J 7/00* (2006.01)

(52) U.S. Cl.
CPC .................................. *A61J 7/0084* (2013.01)

(58) Field of Classification Search
CPC ......... B65B 35/00; B65B 35/32; B65B 3/003; B65B 1/04; B65B 37/02; B65B 37/16
See application file for complete search history.

(56) References Cited

U.S. PATENT DOCUMENTS 4,085,782 A * 4/1978 Carlson .................. B65B 3/003
222/400.7
4,403,462 A * 9/1983 Halbich ............ B65D 83/0445
53/158

(Continued)

FOREIGN PATENT DOCUMENTS

JP 2018-35001 A 3/2018
JP 2020110732 A 7/2020

(Continued)

OTHER PUBLICATIONS

European Search Report for Application No. 22833062.7-1014, mailed Jan. 2, 2025 (14 pages).

(Continued)

*Primary Examiner* — Gloria R Weeks
(74) *Attorney, Agent, or Firm* — Barnes & Thornburg LLP

(57) ABSTRACT

A drug sorting apparatus with reduced packaging time is provided. A drug sorting apparatus includes: a second accommodating portion in which a plurality of sorting cups are arrangeable, the plurality of sorting cups being configured to accommodate a plurality of types of drugs in a state of being sorted by type; a packaging mechanism configured to package a drug, which is accommodated in the accommodating portion; a first dispensing mechanism configured to dispense, for each of the plurality of sorting containers, the drug accommodated in the accommodating portion to the packaging unit; and a container takeout mechanism configured to take out a sorting container from the accommodating portion so as to deliver the sorting container to the first dispensing mechanism, wherein the first dispensing mechanism is configured to tilt the sorting container received from the container takeout mechanism, to thereby dispense the (Continued)

drug accommodated in the sorting container to the packaging unit.

18 Claims, 23 Drawing Sheets

(56) References Cited

U.S. PATENT DOCUMENTS

| | | | | | |
|---|---|---|---|---|---|
| 5,341,854 | A * | 8/1994 | Zezulka | G16H 20/13 | 141/2 |
| 6,006,946 | A * | 12/1999 | Williams | G07F 17/0092 | 221/9 |
| 6,991,002 | B2 * | 1/2006 | Osborne | B65B 3/003 | 604/416 |
| 7,017,623 | B2 * | 3/2006 | Tribble | G09F 3/02 | 604/407 |
| 7,128,105 | B2 * | 10/2006 | Tribble | A61J 1/20 | 604/416 |
| 7,343,943 | B2 * | 3/2008 | Khan | B65B 3/003 | 141/2 |
| 7,610,115 | B2 * | 10/2009 | Rob | B65B 3/003 | 700/239 |
| 7,930,066 | B2 * | 4/2011 | Eliuk | A61J 3/002 | 221/9 |
| 9,033,006 | B2 * | 5/2015 | Perazzo | B65B 7/28 | 141/319 |
| 9,382,021 | B2 * | 7/2016 | Tribble | A61J 1/2096 | |
| 9,597,645 | B2 * | 3/2017 | Takenaka | B01F 29/81 | |
| 9,982,990 | B2 * | 5/2018 | Rubio Aguilera | A61J 1/20 | |
| 9,999,569 | B2 * | 6/2018 | Kriheli | A61J 1/2096 | |
| 10,181,186 | B2 * | 1/2019 | Kriheli | G06V 30/224 | |
| 10,336,477 | B2 * | 7/2019 | Perazzo | A61M 5/1782 | |
| 10,837,977 | B2 * | 11/2020 | Abe | G01N 35/0099 | |
| 11,142,355 | B2 * | 10/2021 | Este | A61J 1/20 | |
| 11,912,447 | B2 * | 2/2024 | Cutler | B65B 7/2821 | |
| 2011/0067781 | A1 * | 3/2011 | Osborne | B65B 55/00 | 141/37 |
| 2011/0208350 | A1 * | 8/2011 | Eliuk | B01F 35/2209 | 700/240 |
| 2012/0241043 | A1 * | 9/2012 | Perazzo | A61J 7/0053 | 141/2 |
| 2015/0136272 | A1 * | 5/2015 | Brenneis | B65B 1/34 | 141/69 |
| 2016/0136055 | A1 * | 5/2016 | Burrows | G16H 20/13 | 705/2 |
| 2020/0163837 | A1 * | 5/2020 | Tashjian | A61J 1/2093 | |
| 2021/0205179 | A1 * | 7/2021 | Amano | A61J 7/0084 | |

FOREIGN PATENT DOCUMENTS

| | | | |
|---|---|---|---|
| JP | 2021028033 | A | 2/2021 |
| JP | 2020-196343 | | 3/2021 |
| KR | 10-2021-0019409 | | 12/2024 |
| WO | 2016073512 | A1 | 5/2016 |

OTHER PUBLICATIONS

Office Action for Japanese Application No. 2022-176691, mailed Jun. 15, 2023 (4 pages).

Office Action for Japanese Application No. 2020-196343, mailed Jan. 29, 2021 (3 pages).

International Search Report for PCT Application No. PCT/JP22/25456, mailed Jul. 7, 2022 (8 pages).

European Office Action for Application No. KR10-2023-7040149, mailed Mar. 5, 2026 (5 pages).

* cited by examiner

FIG.4
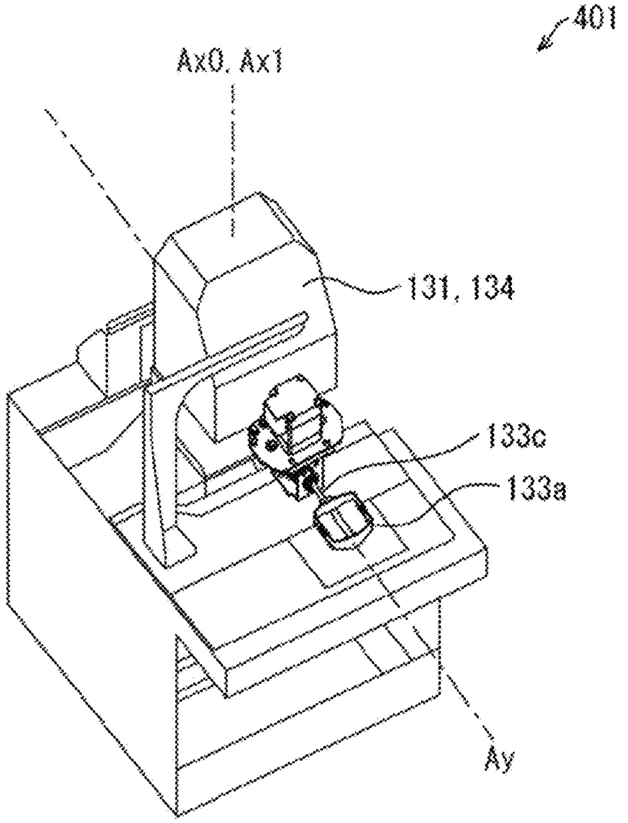
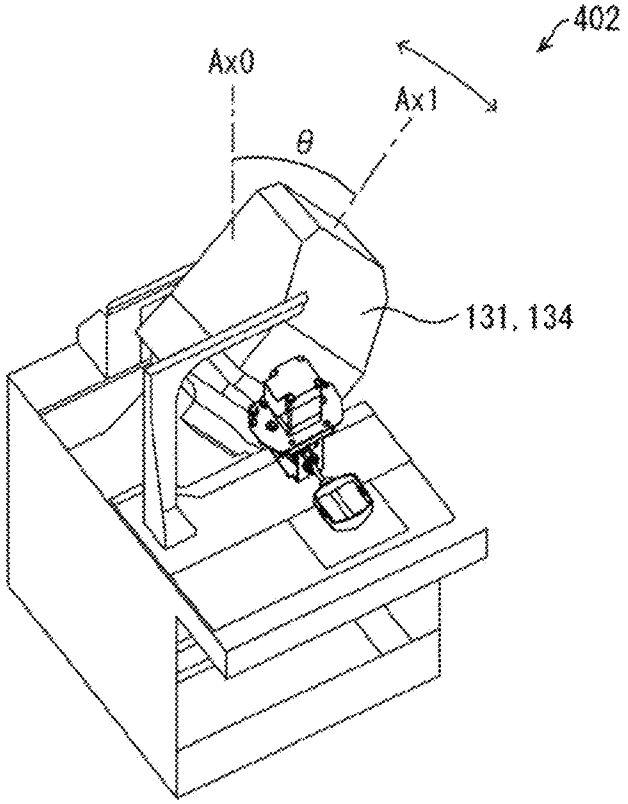

FIG.8
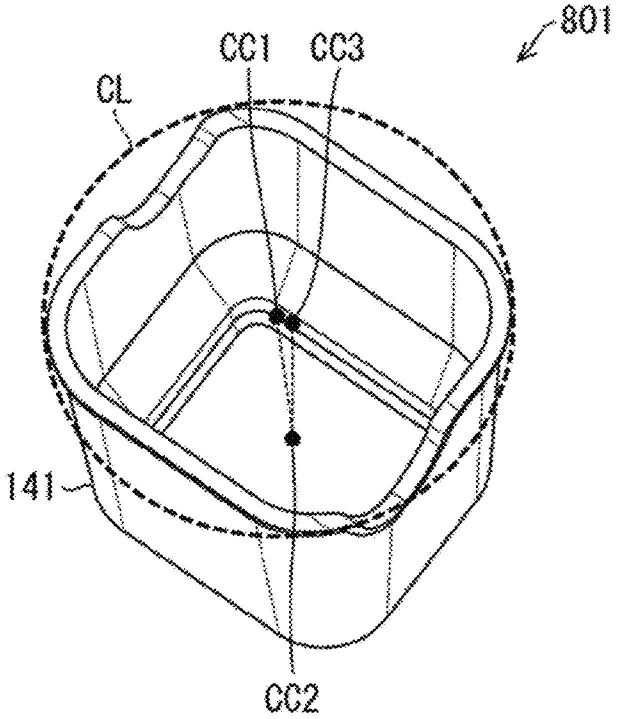
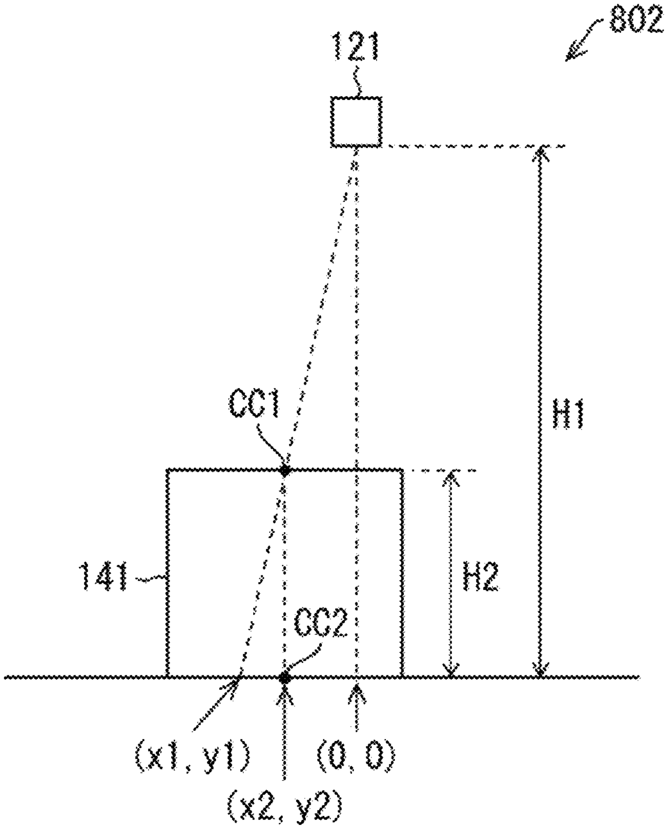

FIG.12
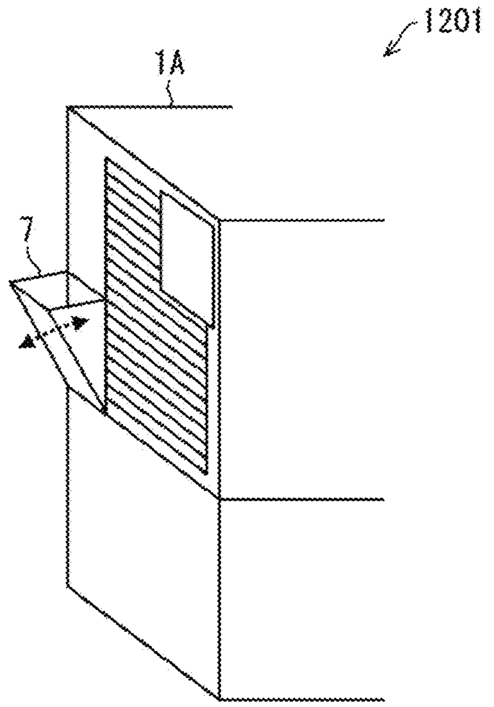
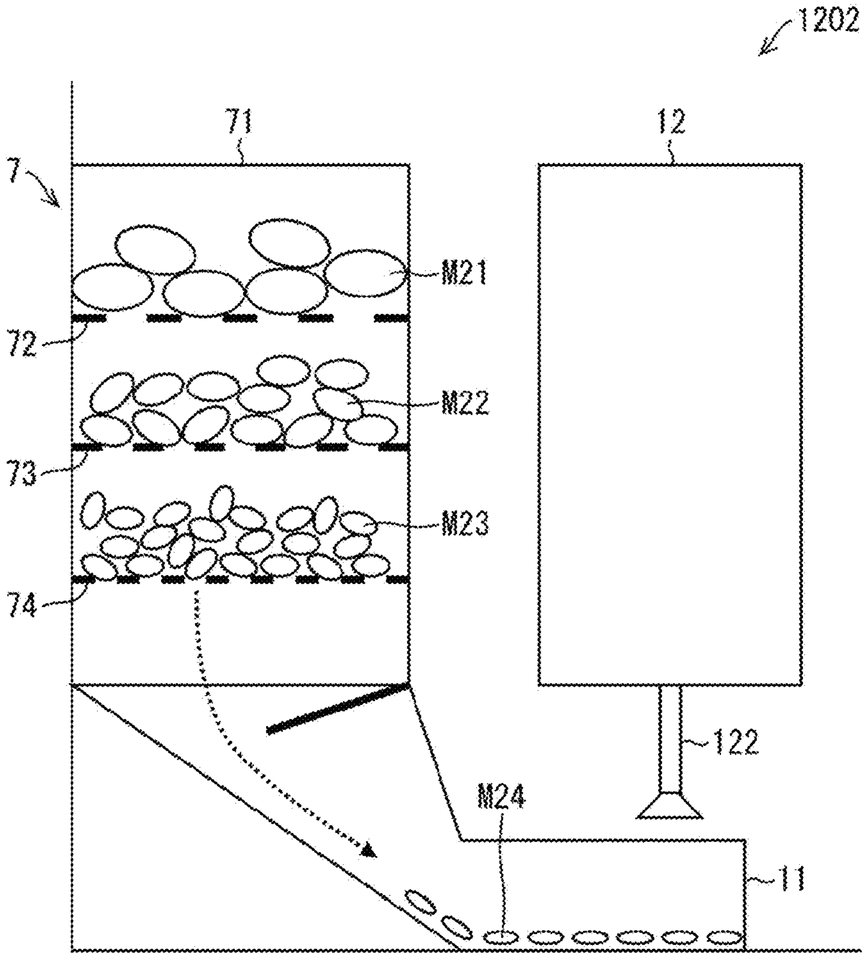

FIG.14

1401

| | NUMBER OF DRUGS |
|---|---|
| MA | 1 |
| MB | 2 |
| MC | 3 |
| MD | 4 |
| ME | 5 |
| MF | 6 |
| MG | 7 |
| MH | 8 |
| MI | 9 |
| MJ | 10 |
| MK | 50 |

1402

SECOND SORTING

| A1 | A2 | A3 | A4 | A5 |
|---|---|---|---|---|
| MA 1 DRUG | MB 2 DRUGS | MC 3 DRUGS | MD 4 DRUGS | ME 5 DRUGS |

| OPERATION TIME (MINUTE) | NUMBER OF TIMES OF IDENTIFICATION | NUMBER OF SORTED DRUGS |
|---|---|---|
| 52.5 | 105 | 15 |

1403

THIRD SORTING

| A1 | A2 | A3 | A4 | A5 |
|---|---|---|---|---|
| MF 6 DRUGS | MG 7 DRUGS | MH 8 DRUGS | MI 9 DRUGS | MJ 10 DRUGS |

| OPERATION TIME (MINUTE) | NUMBER OF TIMES OF IDENTIFICATION | NUMBER OF SORTED DRUGS |
|---|---|---|
| 45 | 90 | 40 |

1404

FOURTH SORTING

| A1 | A2 | A3 | A4 | A5 |
|---|---|---|---|---|
| MK 50 DRUGS | | | | |

| OPERATION TIME (MINUTE) | NUMBER OF TIMES OF IDENTIFICATION | NUMBER OF SORTED DRUGS |
|---|---|---|
| 25 | 50 | 50 |

FIG.15

1501

| | NUMBER OF DRUGS |
|---|---|
| MK | 50 |
| MJ | 10 |
| MI | 9 |
| MH | 8 |
| MG | 7 |
| MF | 6 |
| ME | 5 |
| MD | 4 |
| MC | 3 |
| MB | 2 |
| MA | 1 |

1502

SECOND SORTING

| A1 | A2 | A3 | A4 | A5 |
|---|---|---|---|---|
| MK 50 DRUGS | MJ 10 DRUGS | MI 9 DRUGS | MH 8 DRUGS | MG 7 DRUGS |

| OPERATION TIME (MINUTE) | NUMBER OF TIMES OF IDENTIFICATION | NUMBER OF SORTED DRUGS |
|---|---|---|
| 52. 5 | 105 | 84 |

1503

THIRD SORTING

| A1 | A2 | A3 | A4 | A5 |
|---|---|---|---|---|
| MF 6 DRUGS | ME 5 DRUGS | MD 4 DRUGS | MC 3 DRUGS | MB 2 DRUGS |

| OPERATION TIME (MINUTE) | NUMBER OF TIMES OF IDENTIFICATION | NUMBER OF SORTED DRUGS |
|---|---|---|
| 10. 5 | 21 | 20 |

1504

FOURTH SORTING

| A1 | A2 | A3 | A4 | A5 |
|---|---|---|---|---|
| MA 1 DRUG | | | | |

| OPERATION TIME (MINUTE) | NUMBER OF TIMES OF IDENTIFICATION | NUMBER OF SORTED DRUGS |
|---|---|---|
| 0. 5 | 1 | 1 |

FIG.16

1601

| | | | | | | |
|---|---|---|---|---|---|---|
| | | | | | | 7 |
| | 13/15 | | | | | 6 |
| 11/15 | 4/15 | 7/15 | 11/15 | 10/15 | 13/15 | 5 |
| 11/15 | 12/15 | 12/15 | 8/15 | 10/15 | 9/15 | 4 |
| 12/15 | 10/15 | 3/15 | 2/15 | 13/15 | 12/15 | 3 |
| 6/15 | 6/15 | 9/15 | 9/15 | 13/15 | 12/15 | 2 |
| 14/15 | 13/15 | 14/15 | 12/15 | 10/15 | 9/15 | 1 |
| A | B | C | D | E | F | |

1602

| | | | | | | |
|---|---|---|---|---|---|---|
| 6/15 | 6/15 | 9/15 | 9/15 | 13/15 | 12/15 | 2 |
| 14/15 | 13/15 | (15/15) | 12/15 | 10/15 | 9/15 | 1 |
| A | B | C | D | E | F | |

1603

| | | | | | | |
|---|---|---|---|---|---|---|
| 6/15 | 6/15 | 9/15 | 9/15 | 13/15 | 12/15 | 2 |
| 14/15 | 13/15 | | 12/15 | 10/15 | 9/15 | 1 |
| A | B | C | D | E | F | |

1604

| | | | | | | |
|---|---|---|---|---|---|---|
| 6/15 | 6/15 | 9/15 | 9/15 | 13/15 | 12/15 | 2 |
| 14/15 | 13/15 | ( 1/15) | 12/15 | 10/15 | 9/15 | 1 |
| A | B | C | D | E | F | |

FIG.17

1701

| | A | B | C | D | E | F |
|---|---|---|---|---|---|---|
| 7 | | 6/15 | [12/15] | [12/15] | [10/15] | ( 1/15) |
| 6 | | [13/15] | [12/15] | [12/15] | [10/15] | 9/15 |
| 5 | [11/15] | 4/15 | 7/15 | [11/15] | [10/15] | [13/15] |
| 4 | [11/15] | [12/15] | [12/15] | 8/15 | [10/15] | 9/15 |
| 3 | [12/15] | [10/15] | 3/15 | 2/15 | [13/15] | [12/15] |
| 2 | 6/15 | 6/15 | 9/15 | 9/15 | [13/15] | [12/15] |
| 1 | [14/15] | [13/15] | [12/15] | [12/15] | [10/15] | 9/15 |

1702

| | A | B | C | D | E | F |
|---|---|---|---|---|---|---|
| 7 | | 6/15 | | | | 1/15 |
| 6 | | | | | | 9/15 |
| 5 | | 4/15 | 7/15 | | | |
| 4 | | | | 8/15 | | 9/15 |
| 3 | | | 3/15 | 2/15 | | |
| 2 | 6/15 | 6/15 | 9/15 | 9/15 | | |
| 1 | | | | | | 9/15 |

1703

| | A | B | C | D | E | F |
|---|---|---|---|---|---|---|
| 2 | 6/15 | 6/15 | 9/15 | 9/15 | | |
| 1 | ( 1/15) | | | | | 9/15 |

DRUG SORTATION APPARATUS

CROSS REFERENCE TO RELATED APPLICATIONS

This application is a U.S. nationalization under 35 U.S.C. § 371 of International Application No. PCT/JP2022/025456, filed Jun. 27, 2022, which claims priority to Japanese Patent Application No. 2021-108099 filed Jun. 29, 2021 and Japanese Patent Application No. 2022-093260 filed Jun. 8, 2022. The disclosures set forth in the referenced applications are incorporated herein by reference in their entireties.

TECHNICAL FIELD

The present subject matter relates to a drug sorting apparatus for sorting drugs.

BACKGROUND

Hitherto, a plurality of types of returned drugs have been manually sorted by type by a pharmacist or a doctor. The returned drugs are dispensed drugs that are to be prescribed or have been prescribed to various patients. Accordingly, drugs that have been prescribed to a plurality of patients and are then collectively returned have an extremely larger number of types as compared to those used in drug dispensing work in which, based on prescription information per patient, drugs (tablets) (of one or a plurality of types) are organized (packaged) in units of timings of administration from drug type groups (drug cassettes) organized in advance in units of drug types in a dispensing device or the like. Accordingly, it is highly useful to automatically sort and reuse the returned drugs.

In order to avoid time and effort required for the sorting work or to avoid a risk of misadministration due to erroneous sorting (erroneous returning to the drug cassette), there are some pharmacies or hospitals (to be exact, in-hospital pharmaceutical departments) that discard the returned drugs.

SUMMARY

When a certain prior art drug sorting apparatus conveys the drugs from the second accommodating portion to the packaging mechanism, the drugs in a state of being sorted in the sorting cup by type are conveyed one by one. Accordingly, there arises a problem in that packaging takes time.

Further, in a certain prior art drug sorting apparatus, when drugs are stored in all of the sorting cups of the second accommodating portion, a drug having a type other than the types of those stored drugs is temporarily placed on a standby tray. In the next sorting performed after the drugs sorted in the sorting cups are packaged, the drug sorting apparatus picks up an image of the drug temporarily placed on the standby tray one by one so as to discriminate the type again, and sorts the drugs by type in the sorting cups. That is, the drug sorting apparatus performs discrimination of the type a plurality of times for the drug temporarily placed on the standby tray. Accordingly, as the number of drugs temporarily placed on the standby tray becomes larger, the number of times of discrimination of the type is increased, and thus efficiency of the sorting is reduced.

The disclosed technology provides a drug sorting apparatus with which a time required for packaging drugs sorted by type in sorting cups can be reduced.

The disclosed technology provides a drug sorting apparatus with which the number of drugs to be sorted into the sorting cups in one sorting can be increased.

The disclosed technology provides a drug sorting apparatus including: an accommodating portion in which a plurality of sorting containers are arrangeable, the plurality of sorting containers being configured to accommodate a plurality of types of drugs in a state of being sorted by type; a packaging unit configured to package a drug of the plurality of types of drugs, which is accommodated in the accommodating portion; a first dispensing mechanism configured to dispense, for each of the plurality of sorting containers, the drug accommodated in the accommodating portion to the packaging unit; and a container takeout mechanism configured to take out a sorting container of the plurality of sorting containers from the accommodating portion so as to deliver the sorting container to the first dispensing mechanism, wherein the first dispensing mechanism is configured to tilt or turn upside down the sorting container received from the container takeout mechanism, to thereby dispense the drug accommodated in the sorting container to the packaging unit.

The disclosed technology provides a drug sorting apparatus including: a first accommodating portion configured to accommodate a plurality of types of drugs; a second accommodating portion configured to accommodate the plurality of types of drugs in a state of being sorted by type; a temporarily accommodating portion configured to temporarily accommodate a drug of the plurality of types of drugs which has not been able to be accommodated in the second accommodating portion; a conveying unit configured to convey each of the plurality of types of drugs from the first accommodating portion to the second accommodating portion or the temporarily accommodating portion; a temporary accommodation data generating unit configured to generate temporary accommodation data indicating the number of drugs of each type accommodated from the first accommodating portion to the temporarily accommodating portion; and a re-conveying unit configured to convey the drug from the temporarily accommodating portion to the second accommodating portion, wherein the re-conveying unit is configured to convey the drug from the temporarily accommodating portion to the second accommodating portion based on the temporary accommodation data.

The disclosed technology provides a drug sorting apparatus including: a first accommodating portion configured to accommodate a plurality of types of drugs; a second accommodating portion in which a plurality of sorting containers are arrangeable, the plurality of sorting containers being configured to accommodate the plurality of types of drugs in a state of being sorted by type; a conveying unit configured to convey a drug of the plurality of types of drugs from the first accommodating portion to the second accommodating portion; and a packaging unit configured to package the drug accommodated in the second accommodating portion, wherein each of the plurality of sorting containers has an upper limit value set for the number of drugs to be accommodated therein, and wherein the packaging unit is configured to suspend, when the number of drugs accommodated in any of the plurality of sorting containers has reached the upper limit value in a middle of conveyance by the conveying unit, the conveyance of the drug by the conveying unit, and to package the drug accommodated in the any of the plurality of sorting containers.

The disclosed technology provides a drug sorting apparatus including: a first accommodating portion configured to accommodate a plurality of types of drugs; a second accommodating portion in which a plurality of sorting containers are arrangeable, the plurality of sorting containers being configured to accommodate the plurality of types of drugs in a state of being sorted by type; a conveying unit configured to convey a drug of the plurality of types of drugs from the first accommodating portion to the second accommodating portion; and a packaging unit configured to package the drug accommodated in the second accommodating portion, wherein the packaging unit is configured to suspend, when one or more drugs of the plurality of types of drugs are accommodated in all of the plurality of sorting containers in a middle of conveyance by the conveying unit, the conveyance of the drug by the conveying unit, and to package the drug accommodated in at least one of the plurality of sorting containers.

According to the drug sorting apparatus of the disclosed technology, it is possible to reduce the time required for packaging the drugs sorted by type in the sorting cups.

Further, according to the drug sorting apparatus of the disclosed technology, it is possible to increase the number of drugs to be sorted into the sorting cups in one sorting.

BRIEF DESCRIPTION OF DRAWINGS

FIG. 4 shows views for describing swiveling of the image pickup unit.

FIG. 8 shows views for describing a method of identifying an actual center position of a bottom surface of a sorting cup 141.

FIG. 12 shows views for illustrating a configuration of a drug sorting apparatus according to a third embodiment.

FIG. 14 shows tables for describing an example of processing in a drug sorting apparatus of a comparative example.

FIG. 15 shows tables for describing an example of processing in the drug sorting apparatus.

FIG. 16 shows diagrams for describing an operation of the drug sorting apparatus in a fifth embodiment.

FIG. 17 shows diagrams for describing an operation performed when a reference value is set in a drug sorting apparatus in a sixth embodiment.

DESCRIPTION OF EMBODIMENTS

First Embodiment (Overview of Drug Sorting Apparatus 1)

Figure 1:
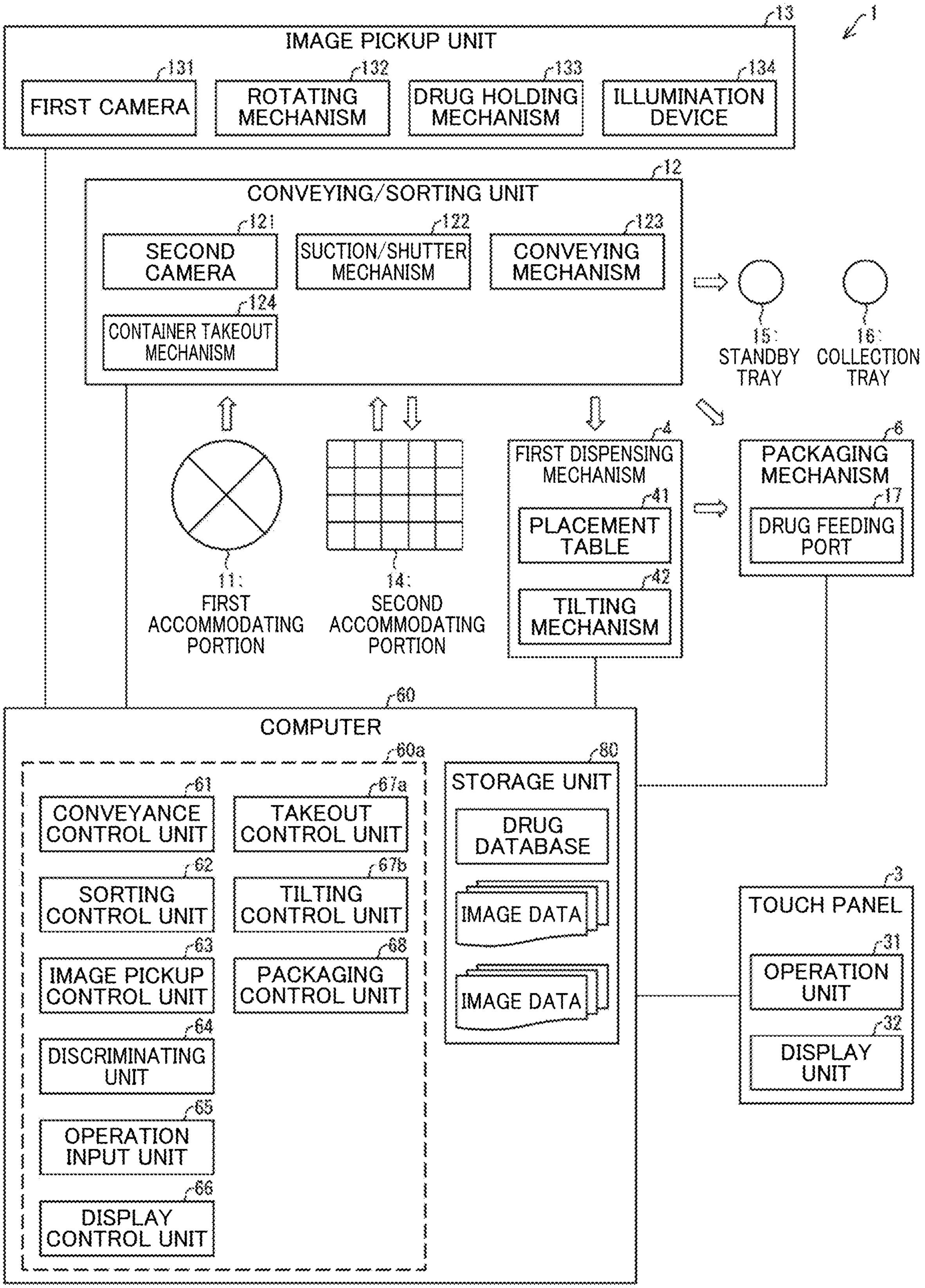
FIG. 1 is a block diagram for illustrating an overall configuration of a drug sorting apparatus according to a first embodiment.
Figure 2:
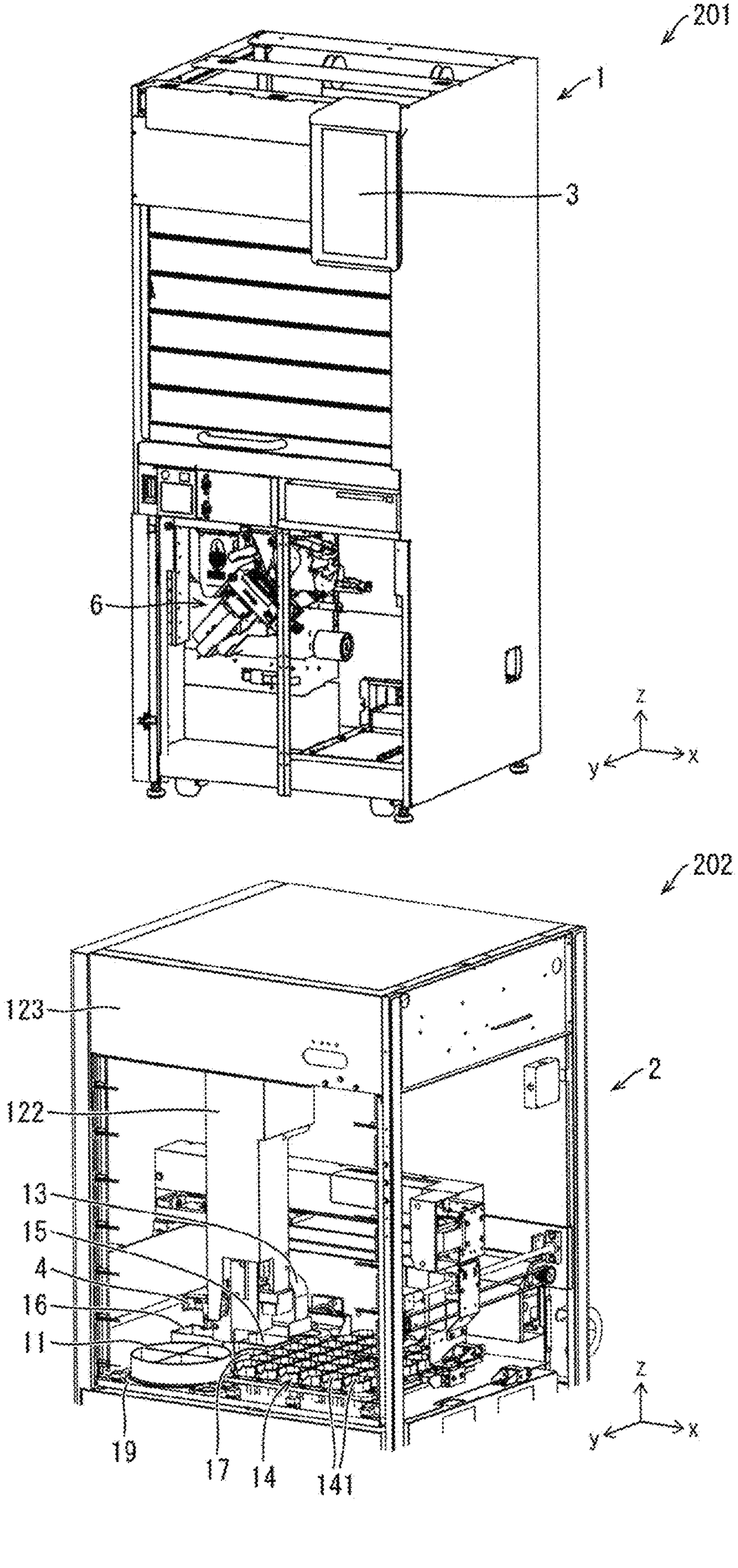
FIG. 2 shows views for illustrating a configuration example of the drug sorting apparatus according to the first embodiment.

FIG. 1 is a block diagram for illustrating an overall configuration of a drug sorting apparatus 1. FIG. 2 shows views for illustrating a configuration example of the drug sorting apparatus 1. In FIG. 2, reference symbol 201 indicates a perspective view of the drug sorting apparatus 1, and reference symbol 202 indicates a perspective view for illustrating a basic configuration of a drug sorting area 2. First, an overview of the drug sorting apparatus 1 is described with reference to FIG. 1 and FIG. 2. As illustrated in FIG. 1 and indicated by reference symbol 201 and reference symbol 202 of FIG. 2, the drug sorting apparatus 1 includes the drug sorting area 2, a touch panel 3, and a packaging mechanism 6 (packaging unit).

The drug sorting apparatus 1 picks up an image of each of a plurality of types of drugs so as to discriminate the type of a drug based on the image obtained as a result of the image pickup, and sorts the drugs by type. Specifically, this processing is performed in the drug sorting area 2. Description of the drug sorting area 2 (internal configuration of the drug sorting apparatus 1) is given later.

In this embodiment, the plurality of types of drugs are drugs that are not accommodated in a container or the like or drugs that are not subjected to packaging or the like. This embodiment is described by taking tablets or capsules as an example of the plurality of types of drugs. Further, this embodiment is described on the assumption that the plurality of types of drugs are returned drugs. The returning of a drug includes a case in which an adopted drug at a pharmacy or a hospital is returned as a “return drug” to this pharmacy or this hospital and a case in which not this adopted drug but a “brought drug” that may include a drug issued at another pharmacy or another hospital is returned to this pharmacy or this hospital. In other words, the returned drug has a concept including at least one of the “return drug” or the “brought drug” described above. The drug sorting apparatus 1 can automatically perform processing from the image pickup to the sorting after a drug is returned.

The touch panel 3 includes an operation unit 31 that receives various types of user input, and a display unit 32 that displays various images (for example, an image indicating the progress of drug sorting).

The packaging mechanism 6 packages the sorted drugs. When the drug sorting apparatus 1 includes the packaging mechanism 6, the drug sorting apparatus 1 can automatically perform processing from the above-mentioned sorting to the packaging. As the packaging mechanism 6, a packaging unit of a tablet packaging machine or powdered drug packaging machine, which has hitherto been used, can be adopted. In this case, for example, the drugs sorted by the same drug type can be packaged in one package or a plurality of packages.

(Basic Configuration of Drug Sorting Area 2)

Next, with reference to FIG. 1 and reference symbol 202 of FIG. 2, the basic configuration of the drug sorting area 2 (internal configuration of the drug sorting apparatus 1) is described.

As illustrated in FIG. 1 and indicated by reference symbol 202 of FIG. 2, the drug sorting area 2 mainly includes, as hardware, a first accommodating portion 11, a conveying/sorting unit 12 (conveying unit), an image pickup unit 13, a second accommodating portion 14 (accommodating portion), a standby tray 15 (temporarily accommodating portion), a collection tray 16, a drug feeding port 17, and a first dispensing mechanism 4. Further, each member except the conveying/sorting unit 12 is provided on a pedestal 19. Main functions of the conveying/sorting unit 12, the image pickup unit 13, and the first dispensing mechanism 4 are described in detail in description of their processing steps described later.

The first accommodating portion 11 accommodates the plurality of types of drugs, which have been returned by the user, in a mixed state. In this example, the first accommodating portion 11 is divided into a plurality of accommodating portions. In this case, for example, when all of the drugs accommodated in one accommodating portion have been conveyed by the conveying/sorting unit 12, the drugs accommodated in an accommodating portion adjacent to this accommodating portion become an object to be conveyed. In addition, the first accommodating portion 11 may be provided so as to be turnable about a Z-axis (center of a cylindrical shape). In this case, a control unit 60*a* of a computer 60 may turn, for example, at a timing at which one accommodating portion becomes vacant, the first accommodating portion 11 so that the conveying/sorting unit 12 can easily acquire the drug.

In the second accommodating portion 14, a plurality of sorting cups 141 (sorting containers) for accommodating the drugs in a state of being sorted by type can be arranged. The control unit 60*a* discriminates the type of a drug based on the image of the drug picked up by the image pickup unit 13, and determines the sorting cup 141 to be used for storing this drug based on a result of the discrimination. This drug is conveyed to and stored into the determined sorting cup 141 by the conveying/sorting unit 12.

The standby tray 15 is an accommodating portion for allowing a drug to be temporarily placed. For example, when drugs are stored in all the sorting cups 141, a drug discriminated as having a type other than the types of those stored drugs by the control unit 60*a* is temporarily placed on the standby tray 15. In this case, after drugs are removed from a sorting cup 141, the drug may be conveyed from the standby tray 15 to this sorting cup 141.

Further, in a process of conveying the drug temporarily placed on the standby tray 15 to the sorting cup 141, when drugs are stored in all of the sorting cups 141, the drug discriminated as having a type other than the types of those stored drugs by the control unit 60*a* may be temporarily placed on the first accommodating portion 11. That is, the first accommodating portion 11 may be used as a second standby tray after the conveyance of the drugs from the first accommodating portion 11 to the sorting cups 141 or the standby tray 15 is first ended. After that, when drugs are stored in all of the sorting cups 141, the control unit 60*a* temporarily places the drug discriminated as having a type other than the types of those stored drugs by the control unit 60*a* alternately on the standby tray 15 and the first accommodating portion 11. In this manner, drugs that have already been discriminated and drugs that have yet to be discriminated are arranged at different places, and thus the possibility that those drugs are mixed can be reduced. However, the drug sorting apparatus 1 may further include a second standby tray which is different from both of the standby tray 15 and the first accommodating portion 11. In this case, the first accommodating portion 11 is not used as the second standby tray.

Further, in this embodiment, an estimated drug (described later) estimated to be a drug may be temporarily placed on the standby tray 15. When the estimated drug is temporarily placed on the standby tray 15, the estimated drug may be conveyed to a predetermined region of the second accommodating portion 14 depending on the discrimination result obtained by the control unit 60*a*.

The collection tray 16 is an accommodating portion for storing items (for example, foreign matter other than drugs) having a type that has failed to be discriminated by the control unit 60*a*. Examples of the foreign matter other than drugs include a fragment of a press through pack (PTP) sheet. The fragment of the PTP sheet may get mixed into the first accommodating portion 11 when the drug is returned. Further, the control unit 60*a* stores a drug registered in the drug database as a drug to be discarded or a drug desired to be discarded by the user (for example, a drug having an old manufacturing date) into the collection tray 16.

The drug feeding port 17 is used for dispensing the drug stored in the second accommodating portion 14 to the packaging mechanism 6. In the drug sorting apparatus 1, the first dispensing mechanism 4 or the conveying/sorting unit 12 dispenses the drug stored in the second accommodating portion 14 to the packaging mechanism 6 when the drug is fed into the drug feeding port 17.

Further, as illustrated in FIG. 1, the drug sorting apparatus 1 includes the computer 60 for collectively controlling the above-mentioned members (pieces of hardware). The computer 60 mainly includes, as the control unit 60*a* (software), a conveyance control unit 61, a sorting control unit 62, an image pickup control unit 63, a discriminating unit 64, an operation input unit 65, a display control unit 66, a takeout control unit 67*a*, a tilting control unit 67*b*, and a packaging control unit 68.

The operation input unit 65 and the display control unit 66 control the operation unit 31 and the display unit 32 of the touch panel 3, respectively. The packaging control unit 68 controls the packaging mechanism 6 so as to package the drug fed from the drug feeding port 17. The conveyance control unit 61, the sorting control unit 62, the image pickup control unit 63, the discriminating unit 64, the takeout control unit 67*a*, and the tilting control unit 67*b* are described in detail in description of their processing steps described later.

In the following description, in some cases, an operation of hardware which is based on control of software is described such that the operation subject is the hardware.

Further, the computer 60 includes a storage unit 80. The storage unit 80 stores, for example, a drug database (drug master) for managing the drug data relating to the plurality of types of drugs and image data representing an image picked up by a first camera 131. Various kinds of data stored in the storage unit 80 are not required to be managed by the storage unit 80, and may be managed by, for example, an external apparatus. In this case, the control unit 60*a* may acquire the above-mentioned various kinds of data from this external apparatus through a communication line such as the Internet, as required. Further, the drug database may be updated by adding new drug data.

[Overview of Processing in Drug Sorting Apparatus 1]

In the drug sorting apparatus 1, the conveying/sorting unit 12 conveys each drug returned to the first accommodating portion 11 to the image pickup unit 13. The image pickup unit 13 sequentially picks up an image of each conveyed drug. The control unit 60*a* discriminates the type of each drug based on the picked-up image, and determines a sorting position in the second accommodating portion 14 of each discriminated drug. The conveying/sorting unit 12 conveys each drug to the determined sorting position. In addition, information on the drug stored in the second accommodating portion 14 is written to an RFID tag of the sorting cup 141, stored in the storage unit 80, or displayed on the touch panel 3. Further, after the sorting of the drugs is finished or in the middle of the sorting, the user operates the touch panel 3 so that processing such as packaging is performed. Each processing step is described in detail below.

[Processing of Conveying Drug to Image Pickup Unit 13]

First, processing of conveying a drug from the first accommodating portion 11 to the image pickup unit 13 is described with reference to FIG. 1 and reference symbol 201 of FIG. 2.

Specifically, the conveying/sorting unit 12 conveys a drug accommodated in the first accommodating portion 11 to a receiving area Ar1 (see reference symbol 302 of FIG. 3) in which the image pickup unit 13 receives the drug. The conveyance control unit 61 controls this conveying processing performed by the conveying/sorting unit 12.

The conveying/sorting unit 12 includes a second camera 121, a suction/shutter mechanism 122, and a conveying mechanism 123.

The second camera 121 successively picks up an image of the first accommodating portion 11 in order to identify a drug to be set as an object to be conveyed. The image pickup control unit 63 controls the image pickup processing of the second camera 121. The second camera 121 is provided at an end portion of the conveying/sorting unit 12 (specifically, at least in a casing including the suction/shutter mechanism 122) on a side opposed to the pedestal 19. The second camera 121 may be provided at a distal end portion of a suction mechanism described later. The image pickup control unit 63 analyzes the picked-up image so as to determine whether or not this image includes a drug. When it is determined that this image includes a drug, for example, the conveyance control unit 61 brings the above-mentioned distal end portion closer to the first accommodating portion 11, and identifies the drug included in the image picked up at that time as the drug to be conveyed.

The suction/shutter mechanism 122 includes the suction mechanism for sucking a drug identified as an object to be conveyed and a shutter mechanism for preventing the drug sucked by the suction mechanism from dropping. The suction mechanism is provided so as to be movable in a Z-axis direction. The shutter mechanism is provided in front of the above-mentioned end portion so as to be movable in substantially parallel to an XY-plane.

At the time of drug acquisition, the suction mechanism extends from the above-mentioned end portion, sucks the identified drug at its distal end portion, and then returns to a position of the above-mentioned end portion. In this state, the conveyance control unit 61 moves the shutter mechanism to a position opposed to the above-mentioned end portion, and maintains the position of the shutter mechanism (brings the shutter mechanism to a closed state) during drug conveyance. When the conveyance control unit 61 moves the suction/shutter mechanism 122 to a position opposed to a drug placement table 133*a* (see reference symbol 302 of FIG. 3) of a drug holding mechanism 133 arranged in the receiving area Ar1, the conveyance control unit 61 moves the shutter mechanism to a position that is not opposed to the above-mentioned end portion (brings the shutter mechanism to an open state). Then, after the suction mechanism is extended from the above-mentioned end portion, a sucked state is canceled so that the drug is placed on the drug placement table 133*a*.

The conveying mechanism 123 moves the suction/shutter mechanism 122 in X-axis and Y-axis directions under control of the conveyance control unit 61. With this conveying mechanism 123, the movement of the suction/shutter mechanism 122 at the time of searching for a drug to be conveyed above the first accommodating portion 11 or the drug conveyance from the first accommodating portion 11 to the drug placement table 133*a* is allowed. Further, also in drug sorting processing described later, the drug conveyance from the drug placement table 133*a* to the second accommodating portion 14, the standby tray 15, or the collection tray 16 is allowed. In addition, the drug conveyance from the second accommodating portion 14 to the drug feeding port 17 is allowed.

[Drug Image Pickup Processing]

Next, drug image pickup processing performed by the image pickup unit 13 is described with reference to FIG. 1, reference symbol 202 of FIG. 2, FIG. 3, and FIG. 4. Reference symbol 301 and reference symbol 302 of FIG. 3 indicate perspective views for illustrating the overall configuration of the image pickup unit 13, and reference symbol 303 of FIG. 3 indicates a perspective view for illustrating an example of the drug placement table 133*a*. Reference symbol 401 and reference symbol 402 of FIG. 4 indicate views for describing swiveling of the image pickup unit 13. The above-mentioned drug image pickup processing is mainly performed by the image pickup unit 13 and the image pickup control unit 63.

Figure 3:
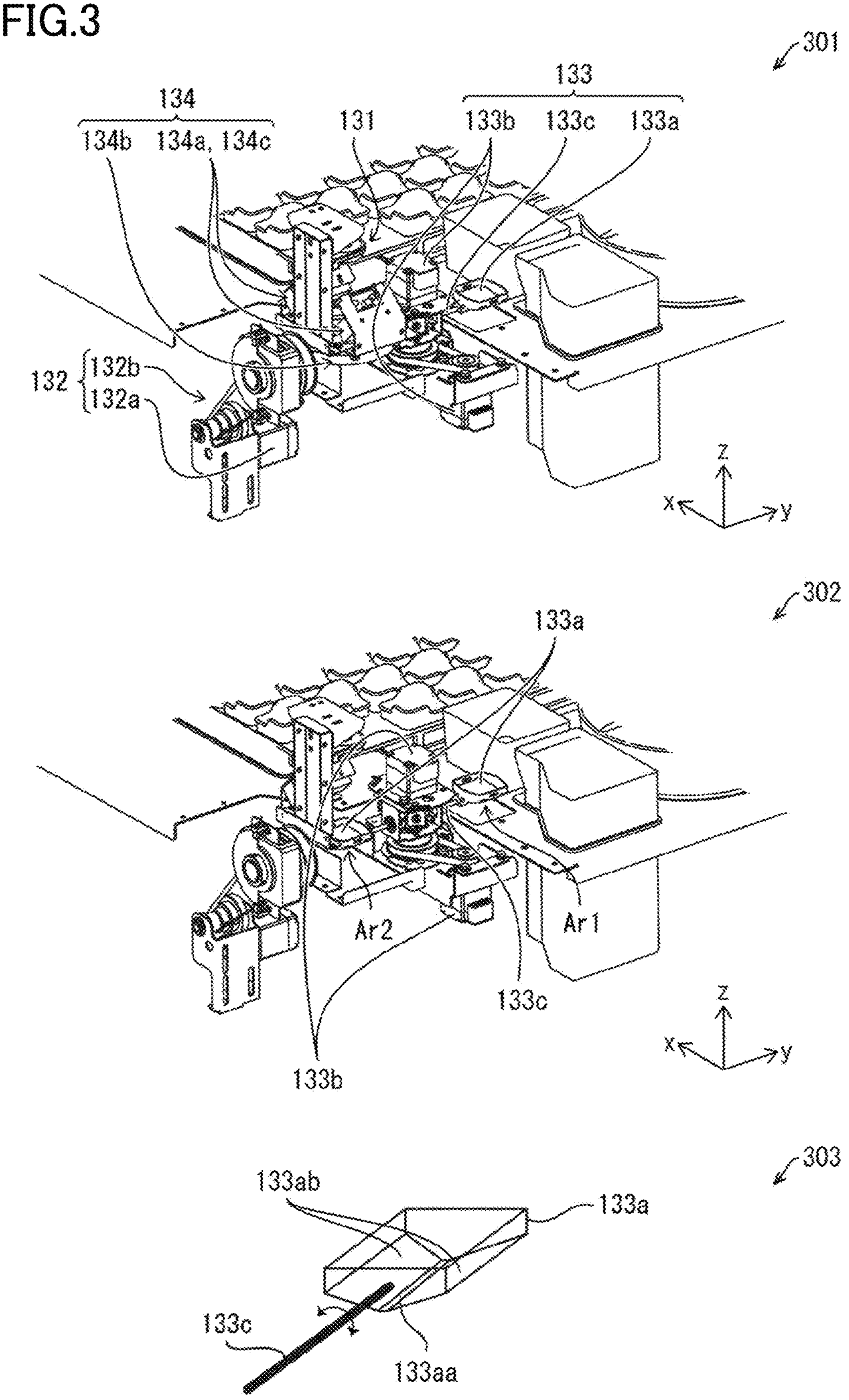
FIG. 3 shows perspective views for illustrating an example of an overall configuration of an image pickup unit and a drug placement table.

Specifically, the image pickup unit 13 picks up an image of a drug placed on the drug placement table 133*a* and arranged in an arrangement area Ar2 (image pickup area) for arranging a drug whose image is to be picked up, which is indicated by reference symbol 302 of FIG. 3. The image pickup control unit 63 controls this image pickup processing performed by the image pickup unit 13, swiveling movement of the first camera 131 and an illumination device 134, and movement of the drug holding mechanism 133. As illustrated in FIG. 1 and FIG. 3, the image pickup unit 13 includes the first camera 131 (image pickup unit), a rotating mechanism 132 (turning unit), the drug holding mechanism 133 (drug placement table and moving mechanism), and the illumination device 134 (ultraviolet light irradiation unit and visible light irradiation unit).

The first camera 131 picks up an image of a drug arranged in the arrangement area Ar2 opposed to the first camera 131 in order to discriminate the type of the drug in the discriminating unit 64 described later. The drug holding mechanism 133 is a mechanism for holding a drug, and as indicated by reference symbol 301 and reference symbol 302 of FIG. 3, includes the drug placement table (petri dish) 133*a*, a swiveling mechanism 133*b* (moving mechanism), and a shaft portion 133*c* for connecting the drug placement table 133*a* and the swiveling mechanism 133*b* to each other. The drug placement table 133*a* is used for placing the drug whose image is to be picked up. The swiveling mechanism 133*b* is used for moving the drug placement table 133*a*. Specifically, the swiveling mechanism 133*b* swivels the drug placement table 133*a* with respect to the XY-plane and swivels the shaft portion 133*c* in a circumferential direction of the shaft portion 133*c*.

When the drug conveyed from the first accommodating portion 11 is placed on the drug placement table 133*a*, the image pickup control unit 63 drives the swiveling mechanism 133*b* so as to move this drug placement table 133*a* from the receiving area Ar1 to the arrangement area Ar2. After that, the image pickup control unit 63 controls at least the first camera 131 and the illumination device 134 to pick up an image of the drug arranged in the arrangement area Ar2. The picked-up image is stored in the storage unit 80 as image data. For example, after the image pickup is finished, the image pickup control unit 63 drives the swiveling mechanism 133*b* so as to move the drug placement table 133*a* on which the drug whose image has been picked up is placed, from the arrangement area Ar2 to the receiving area Ar1.

In this embodiment, two drug placement tables 133*a* are provided to distal end portions (end portions) of the shaft portion 133*c*. The swiveling mechanism 133*b* swivels the shaft portion 133*c* so that, when one drug placement table 133*a* is arranged in the arrangement area Ar2, the other drug placement table 133*a* is arranged in the receiving area Ar1. At the time of image pickup of the drug in the arrangement area Ar2, when the drug is previously conveyed from the first accommodating portion 11 to the drug placement table 133*a* present in the receiving area Ar1 by the conveying/sorting unit 12, continuous drug image pickup processing is allowed. It is premised that this drug placement table 133*a* is in a state of having no drug placed thereon after the drug sorting processing with respect to the second accommodating portion 14 or the like is performed.

Further, in this embodiment, the drug placement table 133*a* has transparency. Accordingly, the first camera 131 can pick up images of the drug placed on the drug placement table 133*a* from various directions through the drug placement table 133*a*.

Further, as indicated by reference symbol 303 of FIG. 3, the drug placement table 133*a* may have a substantially V-shaped cross section in a state in which its bottom portion is recessed. Further, as indicated by reference symbol 302 of FIG. 3 and FIG. 4, when the drug placement tables 133*a* are arranged in the receiving area Ar1 and the arrangement area Ar2, a groove direction of the substantially V-shaped cross section (extending direction of the shaft portion 133*c*) is substantially parallel to a swivel axis Ay of an image pickup mechanism (described later) employed by the rotating mechanism 132. Further, the bottom portion of the drug placement table 133*a* is not required to have an acute V-shape. As indicated by reference symbol 303 of FIG. 3, the bottom portion may include a bottom surface portion 133*aa* and slope surface portions 133*ab* sloped from two opposed positions of the bottom surface portion 133*aa*. It suffices that the bottom portion has such a shape as to enable information (engraved information or printed information) indicated by an engraving or a print on a drug to be recognized even when the bottom portion is viewed (even when an image of the bottom portion is picked up) from a back side of the drug placement table 133*a*, and further has such a shape as to fix the drug.

In a case in which the drug is a capsule or a deformed tablet (for example, a rugby ball shaped tablet), when the bottom portion of the drug placement table 133*a* is flat, there is a possibility that the drug may not be oriented in the same direction on the XY-plane and it is difficult to acquire a clear image (engraved information or printed information) of the drug. When the cross section is substantially V-shaped, the capsule or the deformed tablet is fitted into a lowermost end portion so that this drug can be fixed. Accordingly, it becomes easier to acquire a clear image of the drug. In a case of a tablet, this drug may be reliably immobilized by, for example, swiveling the shaft portion 133*c* in the circumferential direction of the shaft portion 133*c* so that a flat surface portion (slope surface portion 133*ab*) of the drug placement table 133*a* is opposed to the first camera 131.

In addition, the swiveling mechanism 133*b* can also vibrate (finely move or shake) the drug placement table 133*a*. In this case, for example, the capsule placed on the drug placement table 133*a* can be vibrated and rolled to orient a printed portion of the capsule toward a predetermined direction (for example, this portion can be opposed to the first camera 131 arranged at an initial position described later). Further, for example, even when a cylindrical-shaped tablet (having a circular bottom portion) is placed under a state in which this tablet stands on the above-mentioned flat surface portion, the above-mentioned vibration enables the tablet to be laid sideways (to be arranged so that the bottom portion of the tablet is opposed to this flat surface portion).

The illumination device 134 emits light to be emitted to the drug at the time of image pickup of the drug under control of the image pickup control unit 63. As indicated by reference symbol 301 of FIG. 3, the illumination device 134 includes a visible light irradiation unit (first irradiation unit 134*a* and second irradiation unit 134*b*) for irradiating the drug with visible light and an ultraviolet light irradiation unit 134*c* for irradiating the drug with ultraviolet light.

The first irradiation unit 134*a* and the second irradiation unit 134*b* irradiate the drug with white light as the visible light. The first irradiation unit 134*a* is a bar-shaped visible light source (bar illumination), and the second irradiation unit 134*b* is a ring-shaped visible light source (ring illumination). The first camera 131 receives visible light emitted from the first irradiation unit 134*a* or the second irradiation unit 134*b* and reflected by the drug, to thereby acquire an image (visible light image) based on the visible light. The image pickup control unit 63 outputs image data indicating the visible light image acquired by the first camera 131 to the discriminating unit 64.

The ultraviolet light irradiation unit 134*c* irradiates the drug with ultraviolet light (for example, light having a peak wavelength of 365 nm or more and 410 nm or less), to thereby excite the components included in the drug. In this manner, fluorescence (for example, light having a peak wavelength of 410 nm or more and 800 nm or less) is extracted from the drug. The first camera 131 receives the fluorescence emitted from the drug, to thereby acquire an image (ultraviolet light image) based on ultraviolet light. The image pickup control unit 63 outputs image data indicating the ultraviolet light image acquired by the first camera 131 to the discriminating unit 64.

As illustrated in FIG. 3 and FIG. 4, the rotating mechanism 132 turns the first camera 131 so as to swivel the first camera 131 around the arrangement area Ar2 (drug placement table 133*a* arranged at this position) in which the drug whose image is to be picked up is arranged. The first camera 131 picks up images of the drug arranged in the arrangement area Ar2 from a plurality of positions to which the first camera 131 has been turned by the rotating mechanism 132. Specifically, the image pickup mechanism including the first camera 131 and the illumination device 134 is turned so as to be swiveled around the arrangement area Ar2. Accordingly, the first camera 131 can pick up images of the drug from a plurality of directions while maintaining a positional relationship of the first camera 131 and the illumination device 134 with respect to the arrangement area Ar2.

As indicated by reference symbol 301 of FIG. 3, the rotating mechanism 132 includes an image pickup mechanism driving unit 132*a* and a power transmission mechanism 132*b*. The image pickup mechanism driving unit 132*a* generates power for swiveling the image pickup mechanism around the arrangement area Ar2. The power transmission mechanism 132*b* transmits the power generated by the image pickup mechanism driving unit 132*a* to the image pickup mechanism. The image pickup mechanism driving unit 132*a* is driven by the control of the image pickup control unit 63 so as to change a position of the image pickup mechanism around the arrangement area Ar2.

The rotating mechanism 132 swivels the image pickup mechanism between an initial position and a position opposed to the initial position. The initial position is a position in a direction substantially perpendicular to the arrangement area Ar2 and also above the arrangement area Ar2. The position opposed to the initial position is a position in a direction substantially perpendicular to the arrangement area Ar2 and also below the arrangement area Ar2. Further, this position can also be expressed as a position at which the first camera 131 is opposed to the bottom portion of the drug placement table 133*a* present in the arrangement area Ar2.

As illustrated in FIG. 4, an axis passing through a center of the arrangement area Ar2 in parallel to the Z-axis is represented by an axis Ax0, and an axis passing through the center of the arrangement area Ar2 and a center of the image pickup mechanism is represented by an axis Ax1. Further, an angle formed by the axis Ax0 and the axis Ax1 is represented by "θ". In this embodiment, the rotating mechanism 132 arranges the image pickup mechanism at any one of positions of θ=0° (initial position), 45°, 135°, and 180°. Reference symbol 401 of FIG. 4 indicates a case in which the image pickup mechanism is arranged at the position of θ=0°, and reference symbol 402 of FIG. 4 indicates a case in which the image pickup mechanism is swiveled from the initial position to be arranged at the position of θ=45°.

Through the swiveling of the image pickup mechanism around the arrangement area Ar2 as described above, the images of the drug can be picked up from the plurality of directions under a state in which the drug is fixed in the arrangement area Ar2. Further, even when the drug (tablet) is standing even after the drug placement table 133*a* has been shaken, the information indicated by an engraving engraved to the drug or the like can be acquired through the image pickup from an oblique direction (θ=45° or 135°).

Images of a drug may be picked up from a plurality of directions by fixing the image pickup mechanism and turning this drug.

(Image Pickup Position Control)

Next, an example of position control of the image pickup mechanism is described. The image pickup control unit 63 first sets the image pickup mechanism at the initial position, and causes the first camera 131 to pick up an image of the drug arranged in the arrangement area Ar2 at this initial position. At this time, the first camera 131 acquires visible light images (two visible light images) based on visible light from the first irradiation unit 134*a* and visible light from the second irradiation unit 134*b*, and at the same time, acquires an ultraviolet light image based on ultraviolet light from the ultraviolet light irradiation unit 134*c*.

Next, the image pickup control unit 63 sets the image pickup mechanism at the position opposed to the initial position, and causes the first camera 131 to pick up an image of the drug arranged in the arrangement area Ar2 at this position so as to acquire two visible light images and an ultraviolet light image. The discriminating unit 64 discriminates the type of the drug by analyzing those six images. When the type of the drug cannot be identified as one, the image pickup control unit 63 causes the first irradiation unit 134*a* and the second irradiation unit 134*b* to emit visible light at the positions of θ=45° and 135°, and causes the first camera 131 to pick up an image of the drug. The discriminating unit 64 analyzes the visible light images obtained at this time to discriminate the type of the drug.

The position control of the image pickup mechanism is not limited to the above, and various methods can be employed. For example, the image pickup may be performed from the initial position after the image is picked up from the position opposed to the initial position. In another example, discrimination processing may be performed for the drug based on visible light images picked up from the position of θ=45°, and only when the type of the drug cannot be identified as one, visible light images may be acquired through the image pickup from the position of θ=135°. In another example, only ultraviolet light images may be acquired at the initial position and the position opposed to the initial position, and after the discrimination processing for the drug is performed based on those ultraviolet light images, visible light images may be acquired at those positions. In another example, visible light images and ultraviolet light images may be acquired at all positions.

[Image Processing/Discrimination Processing]

Next, image processing for the image picked up by the image pickup unit 13 and discrimination processing for the drug performed based on a result of the image processing are described with reference to FIG. 1. The above-mentioned image processing is mainly performed by the image pickup control unit 63, and the above-mentioned discrimination processing is mainly performed by the discriminating unit 64.

The discriminating unit 64 discriminates the type of the drug based on the image of the drug picked up by the first camera 131. Specifically, the discriminating unit 64 discriminates the type of the drug based on an image pickup result (visible light image) of the drug whose image has been picked up under a state of being irradiated with the visible light from the first irradiation unit 134*a* or the second irradiation unit 134*b*. Further, the discriminating unit 64 discriminates the type of the drug based on an image pickup result (ultraviolet light image) of the drug whose image has been picked up under a state of being irradiated with the ultraviolet light.

The discriminating unit 64 executes image analysis on each of the visible light image and/or the ultraviolet light image, to thereby extract a feature of the drug included in this image. In other words, the discriminating unit 64 extracts the feature of the drug. Examples of the feature of the drug include a size, a shape, an engraving, a print, a division line, and a representative color (color of an engraved or printed region). When optical character recognition (OCR) or the like is performed, identification information (identification information for identifying a drug) representing a drug name (for example, an identification code) or a manufacturer indicated by an engraving or a print, an expiration date, and other information are extracted as the features of the drug. Further, in a case of an ultraviolet light image, the feature of the drug includes a representative color of the drug in the image. The discriminating unit 64 stores the extracted feature of each drug in the storage unit 80 in association with the image data of the drug. The feature of the drug may be extracted by a publicly-known technology.

The discriminating unit 64 discriminates the type of the drug by comparing the feature of each drug against the drug database. In other words, the discriminating unit 64 narrows down candidates for drug data relating to the drug whose image has been picked up from the drug database through use of pattern matching or the like based on the extracted feature of the drug. In this case, for example, at least one of the above-mentioned size, shape, engraving, print, division line, or representative color is used to narrow down candidates for drug data. After that, the discriminating unit 64 performs the OCR or the like so as to read the identification information or the like indicated on the engraving or the print, and further narrows down the type of the drug from the above-mentioned candidates through use of the pattern matching or the like.

In addition, even in a case in which the feature (target feature) of the drug extracted through use of the pattern matching or the like is not included in the drug database, when the drug is estimated to be a drug (tablet or capsule) based on at least a part of the target feature, the discriminating unit 64 discriminates the type of the drug as the estimated drug. In this case, the estimated drug can also be set as an object to be sorted into the second accommodating portion 14 or the standby tray 15. In this embodiment, the estimated drug may first be temporarily placed on the standby tray 15.

As described above, the discriminating unit 64 (determining unit) determines whether or not drug data corresponding to the image (image data) picked up by the first camera 131 is present in the drug data (drug database) relating to the plurality of types of drugs registered in advance.

The discriminating unit 64 outputs the discrimination result of the type of the drug to the sorting control unit 62. For example, when the type of the drug can be identified as one or when the number of candidates is narrowed down to within a predetermined number, drug data relating to this drug is output as the discrimination result. In this case, the discriminating unit 64 stores the drug data relating to this drug in the storage unit 80 in association with the image data on this drug.

When the type of the drug is discriminated as the estimated drug, the discriminating unit 64 outputs the feature of the drug (feature of an object estimated as the estimated drug) as the discrimination result. Meanwhile, when the discriminating unit 64 discriminates that the drug is registered as a drug to be discarded in the drug database or when the discriminating unit 64 discriminates that the object accommodated in the first accommodating portion 11 is foreign matter other than the drug, the discriminating unit 64 outputs, as the discrimination result, a fact that the drug is not to be subjected to the sorting.

The conveying/sorting unit 12 executes, based on the discrimination result obtained by the discriminating unit 64, drug sorting processing of storing the drug into the second accommodating portion 14 for each type or storing the drug into the standby tray 15. The sorting control unit 62 controls the conveying/sorting unit 12 to convey, based on the discrimination result, the drug arranged in the receiving area Ar1 after the image pickup processing and the discrimination processing to a predetermined sorting cup 141 of the second accommodating portion 14 or the standby tray 15.

(Dispensing of Drug by First Dispensing Mechanism 4)

A container takeout mechanism 124 of the conveying/sorting unit 12 is used for taking out the sorting cup 141 from the second accommodating portion 14 so as to deliver the sorting cup 141 to the first dispensing mechanism 4. Specifically, the container takeout mechanism 124 grasps a part of the sorting cup 141 and pulls up the sorting cup 141, to thereby take out the sorting cup 141 from the second accommodating portion 14. An example of a specific configuration of the container takeout mechanism 124 is described later. The container takeout mechanism 124 may be an independent mechanism different from the conveying/sorting unit 12.

The first dispensing mechanism 4 is used for dispensing the drug accommodated in the sorting cup 141 to the packaging mechanism 6 for each sorting cup 141. At this time, the first dispensing mechanism 4 tilts the sorting cup 141 received from the container takeout mechanism 124 so as to dispense the drug accommodated in this sorting cup 141 to the packaging mechanism 6. However, in some cases, all of the drugs cannot be dispensed only by tilting the sorting cup 141 depending on conditions, such as the type and the number, of the drugs. In those cases, the first dispensing mechanism 4 completely turns the sorting cup 141 upside down. For example, the control unit 60*a* measures a mass of the sorting cup 141 (and the drugs therein) by a mass measuring mechanism (not shown), and determines that all of the drugs have been dispensed when this mass becomes substantially equal to the mass of the sorting cup 141. In the following description, description of the turning upside down is omitted.

In other words, in the drug sorting apparatus 1, a mechanism for taking out the sorting cup 141 from the second accommodating portion 14 and a mechanism for tilting the taken-out sorting cup 141 are different mechanisms. In the second accommodating portion 14, in order to increase the accommodation rate of the sorting cups 141, the sorting cups 141 are arranged in a state of coming close to each other. When the mechanism for taking out and the mechanism for tilting are formed as different configurations, a container takeout mechanism 124 suitable for taking out the sorting cup 141 can be used in order to appropriately take out the sorting cup 141 to be taken out from the plurality of sorting cups 141 arranged close to each other. Further, a first dispensing mechanism 4 suitable for holding and tilting the sorting cup 141 can be used in order to reliably hold the sorting cup 141 and tilt the sorting cup 141 to a desired angle. Thus, after the container takeout mechanism 124 appropriately takes out the sorting cup 141 to be taken out under a state in which the sorting cups 141 are arranged in high integration in the second accommodating portion 14, the first dispensing mechanism 4 can dispense the drug in this sorting cup 141 by tilting this sorting cup 141. Specific configurations of the container takeout mechanism 124 and the first dispensing mechanism 4 are described later.

Figure 5:
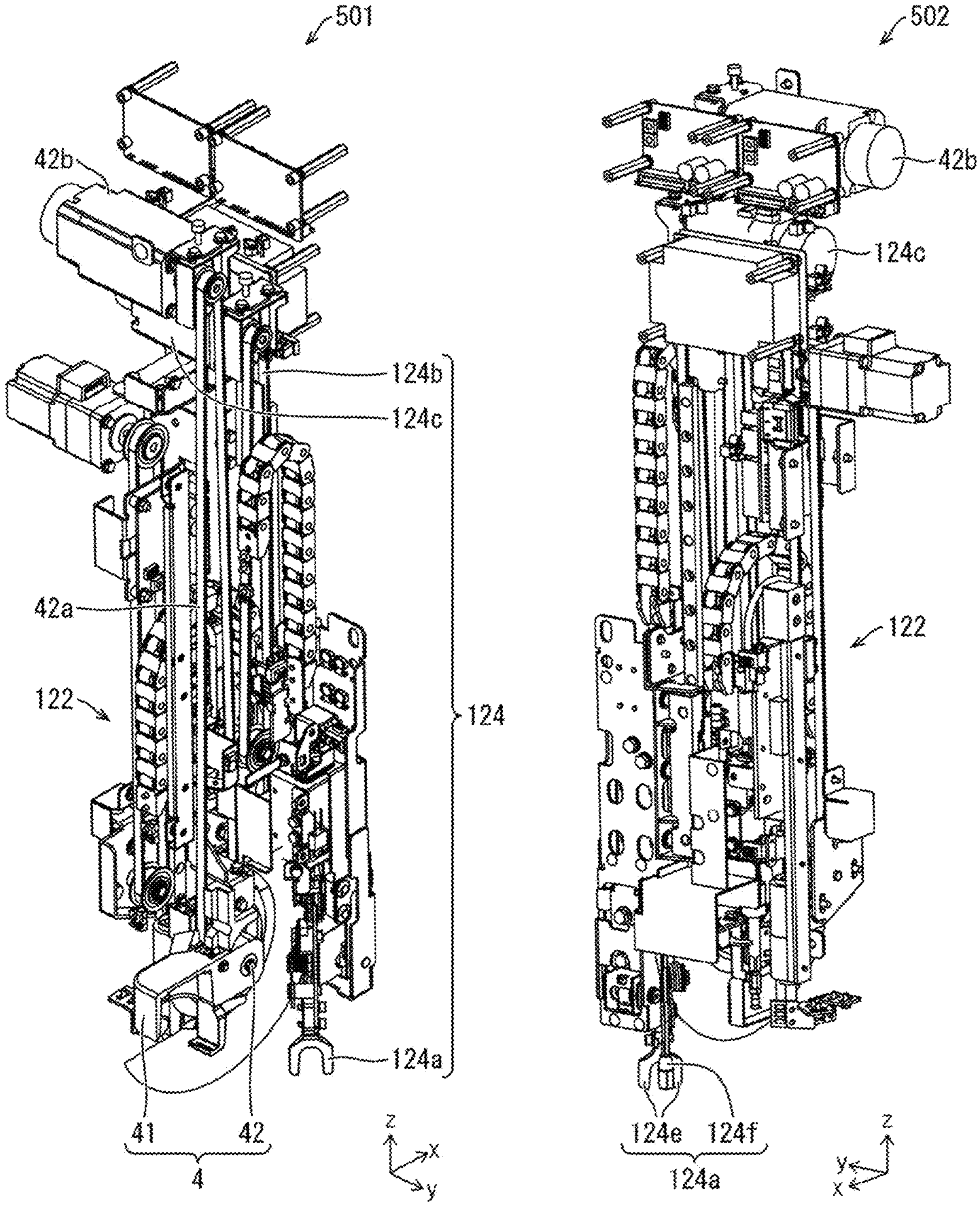
FIG. 5 shows views for illustrating a configuration of a first dispensing mechanism.

FIG. 5 shows views for illustrating the configuration of the first dispensing mechanism 4. In FIG. 5, reference symbol 501 and reference symbol 502 indicate perspective views obtained by viewing the first dispensing mechanism 4 from angles different from each other. In FIG. 5, the first dispensing mechanism 4 is formed integrally with the conveying/sorting unit 12. That is, the first dispensing mechanism 4 is conveyed in the X-axis and Y-axis directions by the conveying mechanism 123. However, the first dispensing mechanism 4 may be a mechanism independent of the conveying/sorting unit 12. In this case, the first dispensing mechanism 4 is conveyed by a conveying mechanism different from the conveying mechanism 123, which conveys the first dispensing mechanism 4 in the X-axis and Y-axis directions. Further, in this case, the container takeout mechanism 124 and the first dispensing mechanism 4 may be formed integrally with each other.

As illustrated in FIG. 5, the first dispensing mechanism 4 includes a placement table 41 and a tilting mechanism 42. The placement table 41 is a table on which the sorting cup 141 is to be placed. The tilting mechanism 42 is used for tilting the placement table 41. Specifically, the tilting mechanism 42 is a rotary shaft to be rotated integrally with the placement table 41. The tilting mechanism 42 is coupled to a motor **42*b* via a timing belt 42*a*. The tilting mechanism 42 turns the placement table 41 about a horizontal turning axis through rotation of the motor 42*b*, to thereby tilt the placement table 41**.

Further, as illustrated in FIG. 5, in the conveying/sorting unit 12, the container takeout mechanism 124 includes a plurality of claw portions **124*a*, a timing belt 124*b*, and a motor 124*c*. The plurality of claw portions 124*a* can change a distance relative to each other. The container takeout mechanism 124 grasps the sorting cup 141 by sandwiching a rim of the sorting cup 141 between the plurality of claw portions 124*a*. In the example illustrated in FIG. 5, the container takeout mechanism 124 includes, as the plurality of claw portions 124*a*, two inner claw portions 124*e* and one outer claw portion 124*f*. The container takeout mechanism 124 causes the inner claw portions 124*e* to abut against the inner side of the sorting cup 141 and causes the outer claw portion 124*f* to abut against the outer side of the sorting cup 141, to thereby grasp the sorting cup 141 at three points. The plurality of claw portions 124*a* are connected to the timing belt 124*b*. The timing belt 124*b* is connected to the motor 124*c*. Thus, the plurality of claw portions 124*a* are moved in the up-down direction through the rotation of the motor 124*c***.

Figure 6:
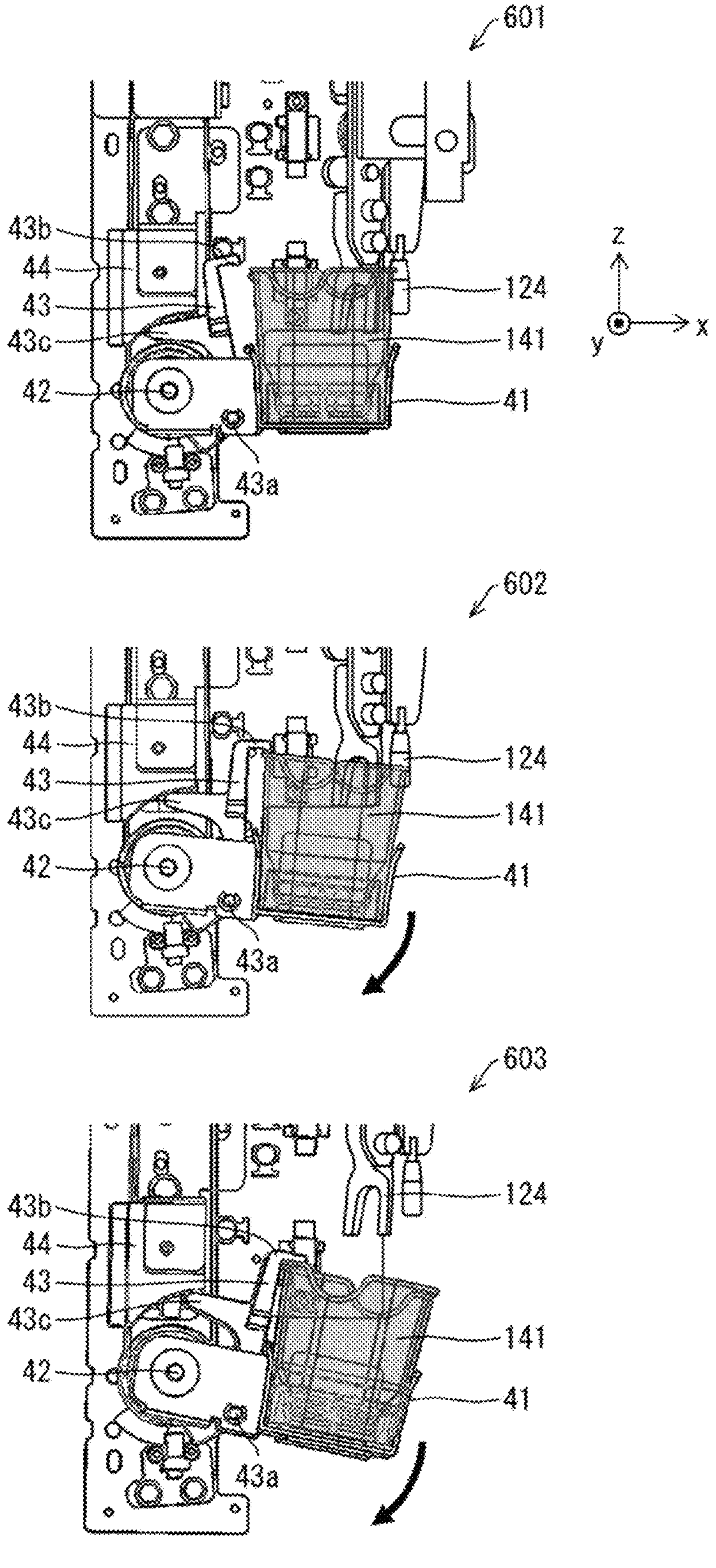
FIG. 6 shows views for illustrating an operation of the first dispensing mechanism.

FIG. 6 shows views for illustrating an operation of the first dispensing mechanism 4. As indicated by reference symbol 601 of FIG. 6, the tilting control unit **67*b* controls the tilting mechanism 42 to fix the placement table 41 so that a surface for placing the sorting cup 141 becomes horizontal. The takeout control unit 67*a* controls the container takeout mechanism 124 to place the sorting cup 141 taken out from the second accommodating portion 14 onto the placement table 41. The tilting control unit 67*b* controls the tilting mechanism 42 to tilt the placement table 41 as indicated by reference symbol 602 and reference symbol 603 of FIG. 6. In this manner, the placement table 41 and the sorting cup 141 placed on the placement table 41 are tilted so that the drug accommodated in the sorting cup 141 is dispensed to the packaging mechanism 6. Specifically, the drug is dropped into the drug feeding port 17**.

As illustrated in FIG. 6, the first dispensing mechanism 4 further includes a holding mechanism 43. The holding mechanism 43 is used for applying an external force to the sorting cup 141 placed on the placement table 41, to thereby hold this sorting cup 141 on the placement table 41. Thus, when the placement table 41 is tilted by the tilting mechanism 42, the sorting cup 141 is prevented from dropping off from the placement table 41. In the example illustrated in FIG. 6, the holding mechanism 43 is locked to the rim of the sorting cup 141 so as to apply an external force directed toward the placement table 41, to thereby hold the sorting cup 141 on the placement table 41. A specific configuration of the holding mechanism 43 is described later. Further, the holding mechanism 43 may sandwich a side surface of the sorting cup 141 from two directions. When the sorting cup 141 is placed on the placement table 41 and tilted as described above, a tilting angle of the sorting cup 141 can be stably changed. Further, stop and restart of the operation of tilting the sorting cup 141 can be controlled finely.

Further, when the sorting cup 141 is prevented from dropping off from the placement table 41, the tilting mechanism 42 can tilt the placement table 41 and the sorting cup 141 at a desired speed. Thus, the speed of tilting the placement table 41 and the sorting cup 141 can be adjusted depending on the number of drugs accommodated in the sorting cup 141. Specifically, the tilting mechanism 42 reduces the speed of tilting the placement table 41 and the sorting cup 141 as the number of drugs accommodated in the sorting cup 141 becomes larger. In this manner, a force of dispensing the drugs is reduced so that the drugs can be reliably dropped into the drug feeding port 17.

The holding mechanism 43 is used for holding the sorting cup 141 on the placement table 41 after the sorting cup 141 is placed on the placement table 41. Thus, the holding mechanism 43 holds the sorting cup 141 after the placing of the sorting cup 141 is finished so that the stability of the sorting cup 141 in a state of being placed on the placement table 41 and further in a state of being tilted can be reliably improved.

Specifically, the holding mechanism 43 includes a turning shaft **43*a*, a locking portion 43*b*, and a guided portion 43*c*. Further, the first dispensing mechanism 4 further includes a guiding member 44 for guiding the holding mechanism 43 in accordance with a tilting angle of the placement table 41. The turning shaft 43*a* is a shaft fixed to the placement table 41. The locking portion 43*b* is a member for locking the sorting cup 141 to the placement table 41. The locking portion 43*b* turns about the turning shaft 43*a*. A distal end of the locking portion 43*b* has such a shape that, as compared to a side farther from the placement table 41 in a circumferential direction of the turning shaft 43*a*, a side closer to the placement table 41 in the circumferential direction is closer to the turning shaft 43*a* so that the distal end is easily caught to the rim of the sorting cup 141. In other words, the distal end of the locking portion 43*b* has a shape of approaching the placement table 41 as coming closer to the inner side from the outer side of the sorting cup 141 under a state in which the distal end is brought into abutment against the rim of the sorting cup 141. Further, the guided portion 43*c* is a member integrated with the locking portion 43*b*, which is brought into abutment against the guiding member 44**.

A distance from the turning shaft **43*a* to the guiding member 44 is shortest when the placement table 41 is horizontal, and becomes longer as the tilting angle of the placement table 41 is increased. Further, the distance from the turning shaft 43*a* to the guiding member 44 is longer on the side of the turning shaft 43*a* farther from the placement table 41 in its circumferential direction than on the side of the turning shaft 43*a* closer to the placement table 41** in its circumferential direction.

Thus, when the tilting angle of the placement table 41 varies, the guided portion **43*c* turns about the turning shaft 43*a* so as to maintain a state of being brought into abutment against the guiding member 44. Specifically, when the tilting angle of the placement table 41 is increased, as described above, the distance from the turning shaft 43*a* to the guiding member 44 becomes longer. At this time, the guided portion 43***c* turns about the turning shaft 43*a* toward the placement table 41 side. As a result, a position at which the guided portion 43*c* comes into abutment against the guiding member 44 is displaced toward the placement table 41 side so that the state of being brought into abutment against the guiding member 44 is maintained. Along with the turning of the guided portion 43*c*, the locking portion 43*b* also turns about the turning shaft 43*a* so as to tilt. That is, the tilting mechanism 42 tilts the holding mechanism 43 in association with the tilting operation of the placement table 41.

Under a state in which a bottom portion of the placement table 41 is kept substantially horizontal by the tilting mechanism 42, at a time point at which the sorting cup 141 is placed on the placement table 41, as indicated by reference symbol 601 of FIG. 6, the holding mechanism 43 is not locked to the sorting cup 141. From this state, after the sorting cup 141 is placed on the placement table 41, the tilting mechanism 42 slightly tilts (for example, by 5°) the placement table 41. In this manner, as indicated by reference symbol 602 of FIG. 6, the holding mechanism 43 is guided by the guiding member 44 to be brought into a state of being almost locked to the sorting cup 141. The state of "being almost locked" to the sorting cup 141 refers to a state in which the holding mechanism 43 is only brought into contact with the sorting cup 141, and does not apply a sufficient external force for preventing the sorting cup 141 from dropping off. When the tilting mechanism 42 further tilts the placement table 41 so that the placement table 41 is tilted to a predetermined angle (for example, 10° or more) from the horizontal state, as indicated by reference symbol 603 of FIG. 6, the holding mechanism 43 is guided by the guiding member 44 in association with the tilting of the placement table 41 so as to be locked to the sorting cup 141. In this state, the holding mechanism 43 can apply a sufficient external force to the sorting cup 141 so as to prevent the sorting cup 141 from dropping off, and thus can hold the sorting cup 141 on the placement table 41. That is, even when the tilting mechanism 42 tilts the placement table 41 to an angle exceeding the predetermined angle, the sorting cup 141 can be held on the placement table 41 by the holding mechanism 43. Accordingly, when the drug accommodated in the sorting cup 141 is to be dropped into the drug feeding port 17, the sorting cup 141 can be prevented from dropping off from the placement table 41.

As described above, the first dispensing mechanism 4 does not require a different driving mechanism for switching whether or not to cause the holding mechanism 43 to hold the sorting cup 141 on the placement table 41. Thus, the configuration of the drug sorting apparatus 1 can be simplified. However, the first dispensing mechanism 4 may include the above-mentioned driving mechanism.

Further, as indicated by reference symbol 601 of FIG. 6, when the placement table 41 is in a horizontal state, the container takeout mechanism 124 takes out the sorting cup 141 arranged in the second accommodating portion 14 so as to place the sorting cup 141 on the placement table 41. After that, as indicated by reference symbol 603 of FIG. 6, after the holding mechanism 43 holds the sorting cup 141 on the placement table 41, the container takeout mechanism 124 cancels the grasping of the sorting cup 141. In other words, until the holding mechanism 43 holds the sorting cup 141 on the placement table 41, the container takeout mechanism 124 maintains a state of grasping the sorting cup 141. Thus, the dropping off of the sorting cup 141 from the placement table 41 is more reliably prevented.

The configuration of the first dispensing mechanism 4 is not limited to the example described above. The first dispensing mechanism 4 may be a mechanism for grasping and tilting the sorting cup 141 without including the placement table 41. Even in a case of such a configuration, when the container takeout mechanism 124 and the first dispensing mechanism 4 are formed of different mechanisms, the container takeout mechanism 124 does not require a mechanism for tilting the sorting cup 141. Meanwhile, the first dispensing mechanism 4 does not require a mechanism for conveying the sorting cup 141. That is, individual mechanisms can be simplified.

(Determination of Grasping Position)

Figure 7:
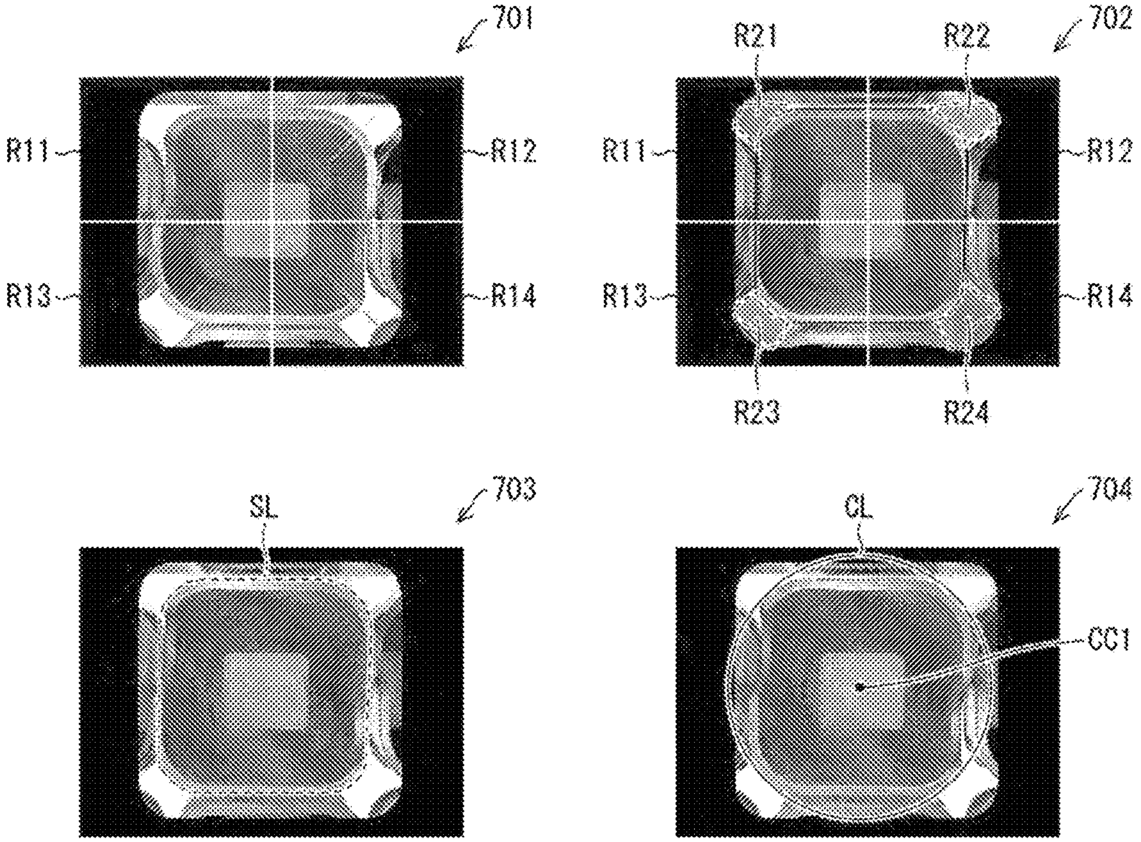
FIG. 7 shows diagrams for describing a method of determining, by a takeout control unit, a position of a sorting cup to be grasped by a container takeout mechanism.

FIG. 7 shows diagrams for describing a method of determining, by the takeout control unit 67*a*, a position of the sorting cup 141 to be grasped by the container takeout mechanism 124. The method of determining, by the takeout control unit 67*a*, the position of the sorting cup 141 to be grasped by the container takeout mechanism 124 is as follows.

First, the takeout control unit 67*a* picks up an image of the sorting cup 141 by the second camera 121, and divides this image into four regions R11 to R14 as indicated by reference symbol 701 of FIG. 7. The regions R11 to R14 are obtained by dividing an image being a rectangle by lines connecting between midpoints of opposing sides in this rectangle, and are unrelated to the position of the sorting cup 141 in the image.

In the second accommodating portion 14, against four corners of a section in which a sorting cup 141 is accommodated, sorting container bases for defining the position of this sorting cup 141 are brought into abutment. As indicated by reference symbol 702 of FIG. 7, the takeout control unit 67*a* identifies regions R21 to R24 of the sorting container bases in the regions R11 to R14, respectively. The sorting container base has a larger luminance in the image than that of the sorting cup 141. Thus, the takeout control unit 67*a* can identify a region having a luminance equal to or larger than a predetermined threshold value in the image as the regions R21 to R24 of the sorting container bases.

A relationship between the position of each of the regions R21 to R24 and a shape of an outer periphery SL in the image picked up by the second camera 121 is already known. As indicated by reference symbol 703 of FIG. 7, the takeout control unit 67*a* identifies the outer periphery SL of the sorting cup 141 based on the regions R21 to R24. After that, as indicated by reference symbol 704 of FIG. 7, the takeout control unit 67*a* identifies a circle CL circumscribed about the outer periphery SL, and acquires coordinates of a center CC1 of the circle CL. Further, the takeout control unit 67*a* corrects the coordinates of the center CC1 based on the height of the sorting cup 141, and identifies the actual center position of the bottom surface of the sorting cup 141.

FIG. 8 shows views for describing a method of identifying the actual center position of the bottom surface of the sorting cup 141. Reference symbol 801 of FIG. 8 indicates a view for illustrating a relationship among, in an actual space in the drug sorting area 2, the center CC1 of the circle CL, a center CC2 of the sorting cup 141 in the bottom surface of the sorting cup 141, and a center CC3 of the sorting cup 141 at a height of the rim of the sorting cup 141. The circle CL and the center CC1 of FIG. 8 are on an actual space corresponding to the circle CL and the center CC1 on the image shown in FIG. 7.

Reference symbol 802 of FIG. 8 indicates a view for illustrating a relationship between coordinates (x1, y1) of the center CC1 in the image and coordinates (x2, y2) of the center CC2. The position of the center CC1 in the actual space in a height direction (z-direction) is equal to a position of the rim of the sorting cup 141 in this direction. Thus, when the position of the center CC1 in the image is displaced from the center of the image, that is, from immediately below an image pickup element of the second camera 121, as indicated by reference symbol 802 of FIG. 8, the coordinates (x1, y1) of the center CC1 in the image are different from the coordinates (x2, y2) of the center CC2.

A height of the image pickup element of the second camera 121 with respect to the bottom surface of the sorting cup 141 is represented by H1, and a height of the rim of the sorting cup 141 with respect to the bottom surface of the sorting cup 141 is represented by H2. At this time, both of a ratio between x1 and x2 and a ratio between y1 and y2 are equal to a ratio between H1 and H2. Thus, the takeout control unit 67*a* derives the coordinates (x2, y2) of the center CC2 by the following expressions (1) and (2).

$$x2 = x1 \times H2/H1 \quad (1)$$

$$y2 = y1 \times H2/H1 \quad (2)$$

As an example, H1=140 mm and H2=52 mm are satisfied.

The position of the center CC3 in the horizontal plane is equal to the position of the center CC2 in the xy plane. Further, the position of the center CC3 in the height direction is equal to the position of the rim of the sorting cup 141 in this direction. Moreover, the position of the rim of the sorting cup 141 to be grasped by the container takeout mechanism 124, with respect to the position of the center CC3, is constant. Thus, the takeout control unit 67*a* can identify the position of the rim of the sorting cup 141 to be grasped by the container takeout mechanism 124.

(Rocking at Time of Tilting)

In a process of tilting the placement table 41 having the sorting cup 141 placed thereon, the tilting mechanism 42 may operate as a rocking mechanism for rocking the sorting cup 141 placed on the placement table 41. After the tilting mechanism 42 tilts the placement table 41 to a predetermined angle, the tilting mechanism 42 causes the placement table 41 to repeatedly move within a predetermined range, to thereby rock the sorting cup 141 placed on the placement table 41. Specifically, the tilting mechanism 42 temporarily stops the tilting operation of the placement table 41 when the placement table 41 is tilted to 40° to 60°, preferably to about 50° from the horizontal state. Then, the rotary shaft of the motor 42*b* for tilting the placement table 41 is caused to finely and repeatedly rotate in the forward direction and in the reverse direction so that the sorting cup 141 placed on the placement table 41 is rocked.

Figure 9:
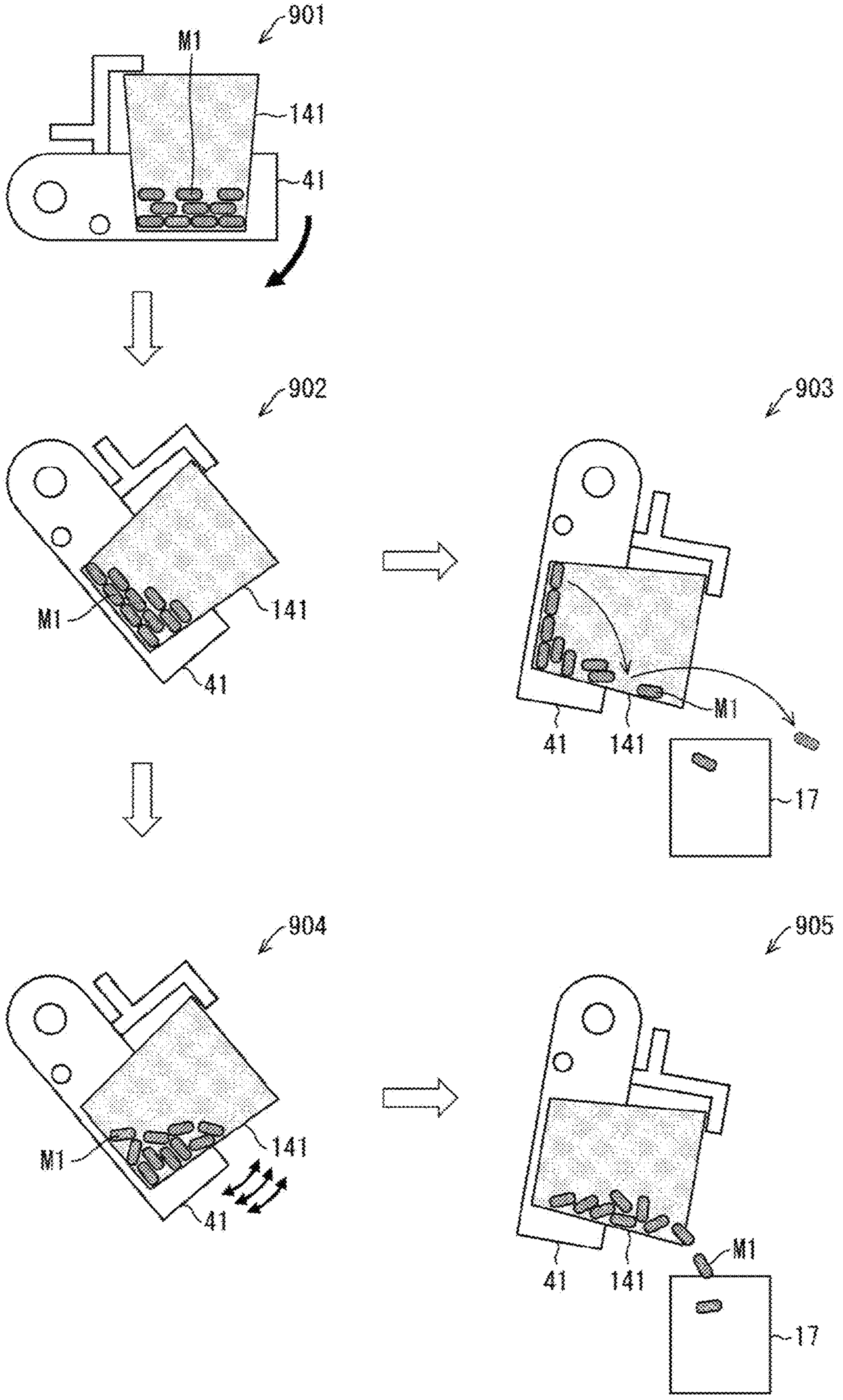
FIG. 9 shows views for describing an effect of rocking a placement table.

FIG. 9 shows views for describing an effect of rocking the placement table 41. Before the placement table 41 is tilted, as indicated by reference symbol 901 of FIG. 9, drugs M1 are in a state of being arranged side by side on the bottom surface of the sorting cup 141. In the middle of tilting the placement table 41, as indicated by reference symbol 902 of FIG. 9, a part of the drugs moves to the side surface side of the sorting cup 141, but there are also drugs M1 still in the state of being arranged side by side on the bottom surface of the sorting cup 141. When the placement table 41 is further tilted without being rocked, the drugs are dispensed to the drug feeding port 17 from the inside of the sorting cup 141. However, as indicated by reference symbol 903 of FIG. 9, among the drugs that have been arranged side by side on the bottom surface of the sorting cup 141, drugs that have been positioned on the opposite side of the direction of the tilting of the sorting cup 141 are dropped from a high position to come out vigorously, and there is a possibility that the drug comes off from the drug feeding port 17.

Meanwhile, when the placement table 41 is rocked, as indicated by reference symbol 904 of FIG. 9, a row of drugs M1 that have been arranged side by side on the bottom surface of the sorting cup 141 is collapsed in a direction of discharging those drugs M1. When the placement table 41 is further tilted in this state, as indicated by reference symbol 905 of FIG. 9, the force of dispensing the drugs M1 that have been positioned on the opposite direction of the direction of the tilting is reduced. Thus, when the sorting cup 141 placed on the placement table 41 is rocked in the tilted state, the possibility that the drug to be dispensed from the sorting cup 141 comes off from the drug feeding port 17 can be reduced.

The drug sorting apparatus 1 may include a rocking mechanism for rocking the sorting cup 141, which is different from the tilting mechanism 42. As an example of a rocking mechanism different from the tilting mechanism 42, there is given a mechanism for applying an impact to the sorting cup 141. Even when the drug sorting apparatus 1 includes such a rocking mechanism, the possibility that the drug to be dispensed from the sorting cup 141 comes off from the drug feeding port 17 can be reduced. However, in the drug sorting apparatus 1, when the tilting mechanism 42 operates as the rocking mechanism, the configuration of the apparatus can be simplified as compared to the case in which a different mechanism is included.

(Suction/Shutter Mechanism 122 Serving as Second Dispensing Mechanism)

The suction/shutter mechanism 122 also operates as a second dispensing mechanism for individually dispensing the drug accommodated in the second accommodating portion 14. Specifically, when the dispensing is to be performed by the suction/shutter mechanism 122, the drugs are conveyed and dispensed one by one to the packaging mechanism 6 from the sorting cup 141 in a state of being arranged in the second accommodating portion 14.

When only the first dispensing mechanism 4 is used to dispense the drugs accommodated in the second accommodating portion 14 to the packaging mechanism 6, an upper limit of the number of drugs that can be accommodated in one sorting cup 141 is restricted to an upper limit of the number of drugs that can be packaged in one packaging by the packaging mechanism 6 (hereinafter referred to as "packaging upper limit"). Thus, when the drugs are conveyed from the first accommodating portion 11 or the standby tray 15 to the second accommodating portion 14, there is a possibility that the number of drugs that cannot be accommodated in the second accommodating portion 14 is increased and the efficiency of the conveyance of the drugs is reduced.

In the drug sorting apparatus 1, the control unit 60*a* determines whether or not the number of drugs accommodated in the sorting cup 141 is larger than a defined number. The defined number is, for example, the packaging upper limit. However, the defined number may be a different value smaller than the packaging upper limit. When the number of drugs accommodated in the sorting cup 141 is larger than the defined number, the conveyance control unit 61 controls the suction/shutter mechanism 122 to perform dispensing of the drug from the sorting cup 141 to the packaging mechanism 6. When the number of drugs accommodated in the sorting cup 141 is equal to or smaller than the defined number, the takeout control unit 67*a* controls the container takeout mechanism 124 to take out the sorting cup 141 from the second accommodating portion 14 to deliver the sorting cup 141 to the first dispensing mechanism 4. After that, the tilting control unit 67*b* controls the tilting mechanism 42 to perform dispensing of the drug from the sorting cup 141 to the packaging mechanism 6.

When the control unit 60*a* determines that the number of drugs accommodated in the sorting cup 141 is larger than the defined number, the control unit 60*a* determines the number of drugs to be dispensed by the suction/shutter mechanism 122 as follows. That is, the control unit 60*a* calculates a difference between the number of drugs in the sorting cup 141 and the defined number. When this difference is equal to or larger than a defined number, the suction/shutter mechanism 122 dispenses the defined number of drugs to the packaging mechanism 6. Meanwhile, when this difference is smaller than the defined number, the suction/shutter mechanism 122 dispenses as many drugs as the number of this difference to the packaging mechanism 6.

Description is given below of a case in which, for example, the packaging upper limit serving as the defined number is fifteen, and the upper limit of the number of drugs that can be accommodated in the sorting cup 141 is fifty. The numbers of fifteen and fifty as used here are merely examples, and the numbers can be changed individually depending on the size of the drug, that is, for each sorting cup 141 for accommodating this drug. When fifty drugs corresponding to the upper limit of the number of drugs that can be accommodated are accommodated in the sorting cup 141, in the first dispensing, the difference between the number of drugs accommodated in the sorting cup 141 and the packaging upper limit is thirty five. Thus, the suction/shutter mechanism 122 conveys and dispenses fifteen drugs corresponding to the packaging upper limit one by one from the sorting cup 141 to the packaging mechanism 6. The packaging mechanism 6 packages the dispensed fifteen drugs. In this manner, the number of drugs accommodated in the sorting cup 141 becomes thirty five.

In the second dispensing, the difference between the number of drugs accommodated in the sorting cup 141 and the packaging upper limit is twenty. Thus, the suction/shutter mechanism 122 conveys and dispenses fifteen drugs corresponding to the packaging upper limit one by one from the sorting cup 141 to the packaging mechanism 6 as in the first dispensing. The packaging mechanism 6 packages the dispensed fifteen drugs. In this manner, the number of drugs accommodated in the sorting cup 141 becomes twenty.

In the third dispensing, the difference between the number of drugs accommodated in the sorting cup 141 and the packaging upper limit is five. Thus, the suction/shutter mechanism 122 conveys and dispenses not fifteen drugs corresponding to the packaging upper limit but five drugs corresponding to a difference between the number of drugs accommodated in the sorting cup 141 and the packaging upper limit one by one from the sorting cup 141 to the packaging mechanism 6. In this manner, the number of drugs accommodated in the sorting cup 141 becomes fifteen. In other words, the suction/shutter mechanism 122 ends the dispensing of the drug at a time point at which the number of drugs accommodated in the sorting cup 141 becomes fifteen.

In the fourth dispensing, the number of drugs accommodated in the sorting cup 141 is fifteen, and hence the control unit 60*a* determines that this number is not larger than the packaging upper limit. Thus, the first dispensing mechanism 4 dispenses the fifteen drugs remaining in the sorting cup 141 to the packaging mechanism 6.

As described above, in the drug sorting apparatus 1, the suction/shutter mechanism 122 operates as the second dispensing mechanism. When the number of drugs accommodated in the sorting cup 141 is larger than the packaging upper limit, the suction/shutter mechanism 122 dispenses the drug to the packaging mechanism 6 one by one. When the number of drugs accommodated in the sorting cup 141 becomes the packaging upper limit, the first dispensing mechanism 4 collectively dispenses the drugs to the packaging mechanism 6. Thus, in the drug sorting apparatus 1, the upper limit of the number of drugs that can be accommodated in one sorting cup 141 is not limited to the packaging upper limit.

Further, in the drug sorting apparatus 1, the user may be capable of setting whether or not to use the suction/shutter mechanism 122 for dispensing of the drug from the sorting cup 141 to the packaging mechanism 6. An embodiment of such a case is described later.

The drug sorting apparatus 1 may include a second dispensing mechanism different from the suction/shutter mechanism 122. However, when the suction/shutter mechanism 122 is operated as the second dispensing mechanism, the configuration of the drug sorting apparatus 1 can be simplified.

(Determination of Accommodation Destination of Drug)

As described above, the container takeout mechanism 124 grasps the sorting cup 141 so as to convey the sorting cup 141 to the first dispensing mechanism 4, and places the sorting cup 141 on the placement table 41. However, depending on the structure of the drug sorting apparatus 1, in some cases, it is difficult to take out the sorting cup 141 arranged in a part of the area of the second accommodating portion 14 by the container takeout mechanism 124. In the example indicated by reference symbol 202 of FIG. 2, the sorting cups 141 are arranged side by side in seven rows in the y-axis direction. Among them, the sorting cup 141 in the row on the most −y side is difficult to be taken out by the container takeout mechanism 124. For the drug accommodated in such a sorting cup 141, in some cases, it is required to perform dispensing not by the first dispensing mechanism 4 but by the suction/shutter mechanism 122.

Incidentally, the drugs include a drug of a type suitable for the dispensing by the first dispensing mechanism 4 and a drug of a type unsuitable for the dispensing by the first dispensing mechanism 4. Examples of the drug of the type unsuitable for the dispensing by the first dispensing mechanism 4 include a drug that is easily broken by an impact. It is preferred that such a drug be dispensed by the suction/shutter mechanism 122.

In the drug sorting apparatus 1, whether or not to perform dispensing by the first dispensing mechanism 4 can be set for each type of a drug. The control unit 60*a* may determine an accommodation destination of a drug which is not to be subjected to dispensing by the first dispensing mechanism 4 preferentially to a sorting cup 141 for which the dispensing by the first dispensing mechanism 4 is difficult. In the above-mentioned example, the control unit 60*a* may determine the accommodation destination of this drug sequentially from the sorting cup 141 arranged on the −y side. When the accommodation destination of the drug is determined as described above, the number of drugs that can be dispensed by the first dispensing mechanism 4 but are accommodated in the sorting cup 141 arranged at a position at which the dispensing by the container takeout mechanism 124 is difficult is minimized. Thus, there is a possibility that the dispensing efficiency of the drug in the drug sorting apparatus 1 is improved.

(Prevention of Pop-Out of Drug)

As described above, the first accommodating portion 11 is turnable about the center of the cylindrical shape. The drug sorting apparatus 1 may include an encoder for detecting the rotation of the first accommodating portion 11 with respect to the center of the cylindrical shape.

As described above, the first accommodating portion 11 accommodates the plurality of types of drugs in a mixed state. Thus, the shapes of the drugs accommodated in the first accommodating portion 11 are not uniform. Thus, when a large number of drugs are accommodated in the first accommodating portion 11, there is a possibility that the control unit 60*a* cannot appropriately recognize the drug to be taken out when the drug is taken out by the conveying/sorting unit 12.

For example, when a plurality of drugs are in contact with each other, there is a possibility that the control unit 60*a* erroneously recognizes those plurality of collected drugs as one drug. When the control unit 60*a* tries to take out those erroneously recognized drugs by the conveying/sorting unit 12, there is a possibility that the suction mechanism included in the conveying/sorting unit 12 comes into contact with an end portion of any of the plurality of drugs that have caused the erroneous recognition. Further, when a plurality of drugs overlap one on another, there is a possibility that the control unit 60*a* recognizes not the drug on the upper side but the drug on the lower side as the drug to be taken out. In this case, there is a possibility that the suction mechanism comes into contact with the end portion of the drug on the upper side. When the conveying/sorting unit 12 comes into contact with the end portion of the drug as described above, there is a possibility that this drug is popped outside of the first accommodating portion 11.

When the conveying/sorting unit 12 comes into contact with the end portion of the drug, a part of a force applied from the conveying/sorting unit 12 to the drug is transmitted from the drug to the first accommodating portion 11, and rotation of the first accommodating portion 11 is caused. When the rotation of the first accommodating portion 11 is caused, the control unit 60*a* detects this rotation by an encoder, and causes the lowering operation of the suction mechanism to stop. In this manner, the possibility that the drug is popped outside of the first accommodating portion 11 is reduced.

Further, when the control unit 60*a* causes the lowering operation of the suction mechanism to stop, the control unit 60*a* may notify the user of the drug sorting apparatus 1 of this fact. In this case, when the user appropriately changes the arrangement or the number of drugs accommodated in the first accommodating portion 11, the control unit 60*a* can appropriately recognize the drug to be taken out by the conveying/sorting unit 12.

(Counting of Drug in Drug Feeding Port 17)

The packaging mechanism 6 includes a shutter (not shown) for restricting the reception of the drug from the drug feeding port 17. The shutter is provided in a path through which the drug passes from the drug feeding port 17 to the packaging mechanism 6, and is controlled by the packaging control unit 68 to be opened and closed. The shutter functions as a bottom surface of the drug feeding port 17 in a closed state. With the packaging mechanism 6 including the shutter, during the operation of the drug sorting apparatus 1, the possibility that a drug erroneously dropped into the drug feeding port 17 (drug not to be packaged) is packaged by the packaging mechanism 6 can be reduced.

When the drug fed into the drug feeding port 17 is to be packaged by the packaging mechanism 6, the packaging control unit 68 causes the second camera 121 to pick up an image of the drug feeding port 17 viewed from above before the shutter is opened. Then, the packaging control unit 68 counts the number of drugs staying on the bottom surface of the drug feeding port 17 based on this image. At this time, the packaging control unit 68 identifies a region of the bottom surface of the drug feeding port 17 in the image, and counts the number of drugs in this region.

After the packaging control unit 68 counts the number of drugs staying on the bottom surface of the drug feeding port 17, the packaging control unit 68 determines whether or not the number of those drugs matches the number of drugs dispensed by the first dispensing mechanism 4 or the conveying/sorting unit 12. When the packaging control unit 68 determines that the numbers do not match, it is considered that an abnormality has occurred, such as shortage or excess of the drug. In this case, an abnormality occurs in packaging, and hence the packaging control unit 68 executes processing for a case in which the abnormality occurs in packaging. An example of the processing for the case in which the abnormality occurs in packaging is described later.

As described above, in some cases, a drug dispensed by the first dispensing mechanism 4 is fed into the drug feeding port 17. In order to facilitate the reception of such a drug, the drug feeding port 17 has a tapered shape in which the drug feeding port 17 is narrowed as coming closer to the lower side from the upper side. Thus, the image of the drug feeding port 17 includes an image of a side surface of the drug feeding port 17. A part of the drug dispensed by the first dispensing mechanism 4 collides with the side surface of the drug feeding port 17. Thus, in some cases, powder or a fragment of the drug adheres to the side surface of the drug feeding port 17.

When the packaging control unit 68 identifies, based on the picked-up image, the region of the bottom surface of the drug feeding port 17 in this image, in some cases, the packaging control unit 68 erroneously recognizes also the side surface of the drug feeding port 17 having powder or a fragment of the drug adhering thereto as a part of the bottom surface. Further, in some cases, the image of this side surface may include a reflected image of the drug present on the bottom surface. In those cases, the packaging control unit 68 erroneously recognizes an image of the drug reflected on the side surface as an actual drug. Further, in this case, the packaging control unit 68 determines that, although the number of drugs staying on the shutter actually matches the number of dispensed drugs, the numbers do not match so as to execute the processing for the case in which the abnormality has occurred in packaging. As a result, a time loss occurs to solve the abnormality.

In view of the above, the packaging control unit 68 picks up an image of the drug feeding port 17 in a state of having no powder or fragment of the drug adhering thereto (for example, in the initial state of the drug sorting apparatus 1 or a state at the time of initialization after camera adjustment), and determines whether or not this image includes an image of foreign matter such as dust. When the packaging control unit 68 determines that the image includes an image of foreign matter, the packaging control unit 68 outputs an error to urge the user to remove the foreign matter. After that, the packaging control unit 68 picks up the image of the drug feeding port 17 again.

When the packaging control unit 68 determines that the image of the drug feeding port 17 does not include an image of foreign matter such as dust, the packaging control unit 68 identifies the region of the bottom surface of the drug feeding port 17 and center coordinates thereof from the image of the drug feeding port 17, and stores the results in the storage unit 80. When the number of drugs to be packaged is counted, the packaging control unit 68 counts the number of drugs in the region of the bottom surface stored in the storage unit 80. Thus, the possibility that the side surface of the drug feeding port 17 having powder or fragment of the drug adhering thereto is erroneously recognized as a part of the bottom surface and the possibility that the image of the drug reflected on this side surface is erroneously recognized as an actual drug can be reduced.

Further, when the region whose image is taken changes due to the adjustment of the camera, the position of the region of the bottom surface of the drug feeding port 17 in the image also changes. Thus, at the time of activation of the drug sorting apparatus 1, the packaging control unit 68 newly takes an image of the drug feeding port 17, and determines whether coordinates of a center of the region of the bottom surface match the coordinates stored in the storage unit 80. When the coordinates of the center of the region of the bottom surface are different from those stored in the storage unit 80, the packaging control unit 68 re-identifies the region of the bottom surface of the drug feeding port 17 and the center coordinates thereof, and stores the results in the storage unit 80.

(Printing at Time of Abnormal Packaging)

The packaging mechanism 6 includes a printing mechanism for performing printing with respect to a packaging paper sheet. The packaging control unit 68 controls the printing mechanism to print information on a drug, such as a drug name or a drug code, onto the packaging paper sheet, and then packages the drug with this packaging paper sheet to obtain a packaged product.

Before packaging is started, the packaging control unit 68 prints in advance information on the drug planned to be packaged onto the packaging paper sheet. However, when the packaging control unit 68 determines that the number of drugs staying on the bottom surface of the drug feeding port 17 does not match the number of drugs dispensed by the first dispensing mechanism 4 or the conveying/sorting unit 12, the packaging control unit 68 executes the following processing as an example of the processing for the case in which an abnormality has occurred in packaging. That is, the packaging control unit 68 discards the packaging paper sheet having already printed thereon information on the drug, and prints, onto a new packaging paper sheet, a character string indicating that an abnormality has occurred in packaging in superimposition on a character string indicating the information on the drug.

Figure 10:
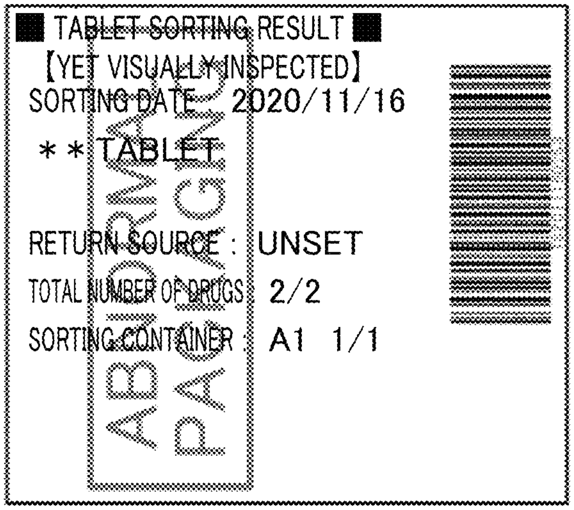
FIG. 10 is a view for illustrating an example of printing performed on a packaging paper sheet when an abnormality has occurred during packaging.

FIG. 10 is a view for illustrating an example of printing performed on the packaging paper sheet when an abnormality has occurred at the time of packaging. FIG. 10 shows a packaging paper sheet in which a character string of "abnormal packaging" is printed in superimposition on a character string indicating the information on the drug. The packaging control unit 68 packages the drug with the packaging paper sheet subjected to printing as described above to obtain the packaged product. Thus, the user can easily recognize the packaged product in which abnormal packaging has occurred.

The packaging control unit 68 prints the character string indicating that an abnormality has occurred in packaging so that this character string looks lighter than the character string indicating the information on the drug. Specifically, the packaging control unit 68 prints the character string indicating the information on the drug in black only. Meanwhile, the packaging control unit 68 prints the character string indicating that an abnormality has occurred in packaging not in black only but with white mixed for each certain number of pixels. For example, the packaging control unit 68 prints, for the character string indicating that an abnormality has occurred in packaging, in a region formed of a total of four pixels having two pixels horizontally and two pixels vertically, one pixel in white regardless of the position in the character string and the remaining three pixels in white or black depending on the position in the character string. When the packaging control unit 68 prints the character string indicating that an abnormality has occurred in packaging as described above, the viewability of the character string indicating the information on the drug can be maintained.

In the above-mentioned example, the packaging control unit 68 prints the information on the drug planned to be packaged onto the packaging paper sheet in advance before the packaging is started. However, instead of printing the information on the drug planned to be packaged onto the packaging paper sheet in advance, the packaging control unit 68 may print the information on the drug planned to be packaged onto the packaging paper sheet after the packaging control unit 68 makes determination on the number of drugs staying on the bottom surface of the drug feeding port 17.

(Brief Summary)

As described above, the drug sorting apparatus 1 causes the first dispensing mechanism 4 to tilt the sorting cup 141, to thereby dispense the drug accommodated in this sorting cup 141 to the packaging mechanism 6. Thus, as compared to a case in which the drug is conveyed one by one, the time required for packaging the drug can be shortened. Further, with the drug sorting apparatus 1, the time required for packaging the drug can be shortened, and hence energy required for this packaging is also reduced. Further, with the drug sorting apparatus 1, the time required for packaging the drug can be shortened, and hence sorting of a larger number of return drugs is allowed within a certain time period. Thus, a larger number of return drugs can be utilized more quickly, and thus an effect of reducing the medical bills can be improved. In this manner, the drug sorting apparatus 1 can contribute to achievement of the sustainable development goals (SDGs).

Second Embodiment

For example, in the second accommodating portion 14 in the first embodiment, the plurality of sorting cups 141 are arranged under a state in which rims thereof are close to each other. Thus, in order to grasp the rim of the sorting cup 141 by the container takeout mechanism 124, it is required to control the position of the container takeout mechanism 124 at high accuracy so as to prevent the container takeout mechanism 124 from grasping the rim of a different adjacent sorting cup 141.

Figure 11:
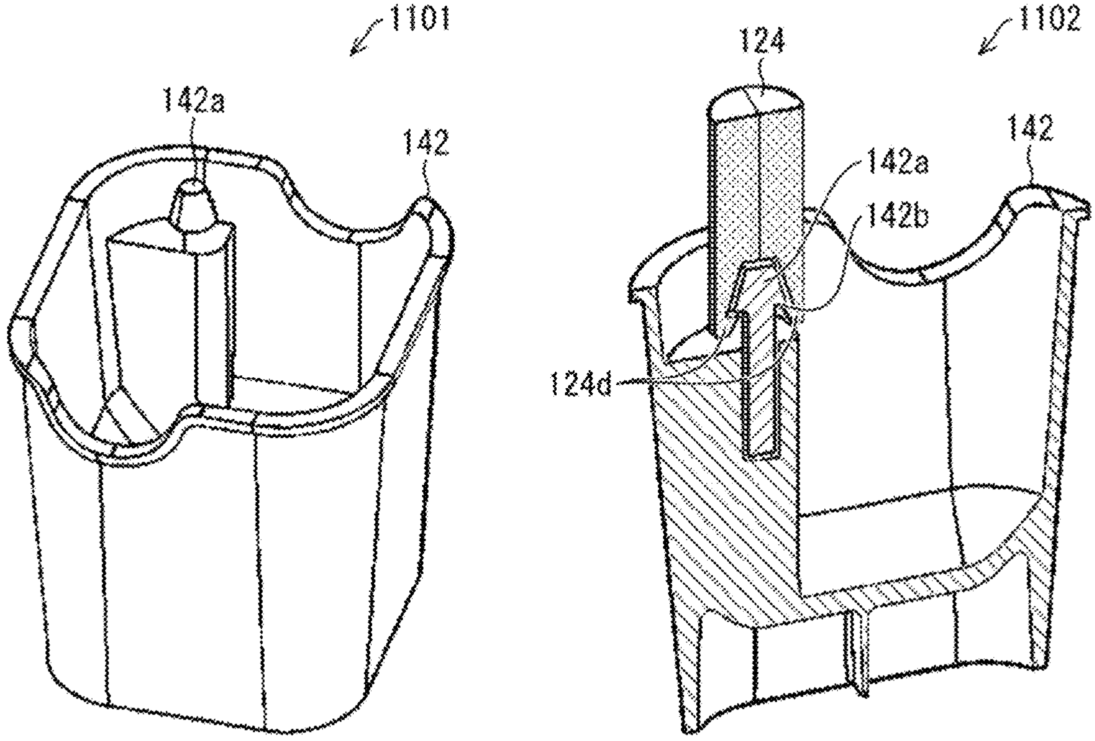
FIG. 11 shows views for illustrating a configuration of a sorting cup in a second embodiment.

FIG. 11 shows views for illustrating a configuration of a sorting cup 142 in a second embodiment. Reference symbol 1101 of FIG. 11 indicates a perspective view of the sorting cup 142. As indicated by reference symbol 1101 of FIG. 11, a pin 142*a* is formed on the inner side of the sorting cup 142. The pin 142*a* is a part protruding in a direction substantially perpendicular to the bottom surface of the sorting cup 142.

Further, reference symbol 1102 of FIG. 11 indicates a cross-sectional view of the sorting cup 142 in a plane including the center axis of the pin 142*a*. As indicated by reference symbol 1102 of FIG. 11, the pin 142*a* has a hook 142*b* provided in the vicinity of the distal end thereof. The hook 142*b* is a part having a diameter larger than that of a lower side of the hook 142*b*. The container takeout mechanism 124 in this embodiment includes a plurality of claw portions 124*d* for being engaged with the hook 142*b*. The container takeout mechanism 124 closes the plurality of claw portions 124*d* on the lower side of the hook 142*b*, to thereby grasp the hook 142*b* so as to take out the sorting cup 142. Thus, with the sorting cup 142, it becomes easier to take out this sorting cup 142 by the container takeout mechanism 124.

Third Embodiment

FIG. 12 shows views for illustrating a configuration of a drug sorting apparatus 1A according to a third embodiment. Reference symbol 1201 of FIG. 12 indicates a perspective view of an external appearance of the drug sorting apparatus 1A. As illustrated in FIG. 12, the drug sorting apparatus 1A includes a hopper 7. The hopper 7 is used for feeding drugs into the first accommodating portion 11. Other configurations of the drug sorting apparatus 1A are similar to those of the drug sorting apparatus 1.

Reference symbol 1202 of FIG. 12 indicates a cross-sectional view for illustrating a configuration of the hopper 7. The hopper 7 includes a casing 71 and sieves 72, 73, and 74. The sieves 72, 73, and 74 are arranged inside of the hopper 7 in the stated order from the upper side in the vertical direction. Further, the sieves 72, 73, and 74 allow only drugs having smaller sizes to pass therethrough in the stated order. Further, the sieves 72, 73, and 74 can be pulled out from the casing 71 in a substantially horizontal direction.

In the initial state, all of the sieves 72, 73, and 74 are inserted in the hopper 7. When drugs are fed into this hopper 7 in this state, drugs M21 having sizes that cannot pass through the sieve 72 stay on the sieve 72. Further, drugs M22 having sizes that can pass through the sieve 72 but cannot pass through the sieve 73 stay on the sieve 73. Similarly, drugs M23 having sizes that can pass through the sieve 73 but cannot pass through the sieve 74 stay on the sieve 74. In addition, only drugs M24 that can pass through the sieve 74 are accommodated into the first accommodating portion 11.

The control unit 60*a* causes the conveying/sorting unit 12 to perform conveyance and sorting of the drugs M24. After the conveyance and sorting of the drugs M24 are ended, the sieve 74 is pulled out from the casing 71. The sieve 74 may be pulled out by the user. As another example, the drug sorting apparatus 1A may include a mechanism capable of being controlled by the control unit 60*a* so as to pull out the sieve 74. In this manner, the drugs M23 are accommodated into the first accommodating portion 11. The control unit 60*a* causes the conveying/sorting unit 12 to perform conveyance and sorting of the drugs M23. After that, in a similar way, the sieves 73 and 72 are pulled out from the casing 71 in the stated order. The control unit 60*a* causes the conveying/sorting unit 12 to sequentially perform conveyance and sorting of the drugs M22 and M21 accommodated into the first accommodating portion 11.

In the first embodiment, the timing to feed the drugs into the first accommodating portion 11 is unrelated to the size of those drugs. Thus, in some cases, the number of types of the drugs to be accommodated into the first accommodating portion 11 is remarkedly larger than the number of the sorting cups 141. As the number of types of drugs to be accommodated into the first accommodating portion 11 becomes larger, the number of drugs to be conveyed to the standby tray 15 is increased, resulting in that the time required for performing conveyance and sorting by the conveying/sorting unit 12 becomes longer.

In the drug sorting apparatus 1A, the timing to accommodate the drugs into the first accommodating portion 11 can be changed depending on the size of the drugs, and hence the number of types of the drugs to be simultaneously accommodated into the first accommodating portion 11 can be reduced. Thus, the number of drugs to be conveyed to the standby tray 15 is reduced, and there is a possibility that the time required for performing conveyance and sorting by the conveying/sorting unit 12 can be reduced.

Further, in the hopper 7, drugs can be additionally fed even while the control unit 60*a* is causing the conveying/sorting unit 12 to perform conveyance and sorting. In this case, there is a possibility that the number of types of drugs to be simultaneously accommodated into the first accommodating portion 11 is increased. For example, when drugs are additionally fed into the hopper 7 in a state of having the sieve 74 pulled out therefrom, the drugs that cannot pass through the sieve 74 are accommodated into the first accommodating portion 11 under a state in which the drugs that can pass through the sieve 74 are mixed therewith. However, even in this case, drugs staying on the sieves 72 and 73 are not simultaneously accommodated into the first accommodating portion 11, and hence there is still a possibility that the time required for performing conveyance and sorting by the conveying/sorting unit 12 can be reduced. Further, even when drugs are additionally fed into the hopper 7 in a state of having all of the sieves 72, 73, and 74 pulled out therefrom, similarly to the first embodiment, the drugs are only fed into the first accommodating portion 11 at a timing unrelated to the size of the drugs. Thus, the time required for performing conveyance and sorting by the conveying/sorting unit 12 does not become longer than that in the first embodiment.

Further, in the drug sorting apparatus 1A, the drugs fed from the hopper 7 move in the horizontal direction to be accommodated into the first accommodating portion 11. When the width of the first accommodating portion 11 with respect to the moving direction of the drugs when being accommodated into the first accommodating portion 11 is narrowed, the drugs can be brought into an aligned state. Thus, the accuracy of the conveyance and sorting performed by the conveying/sorting unit 12 can be improved.

Fourth Embodiment

Figure 13:
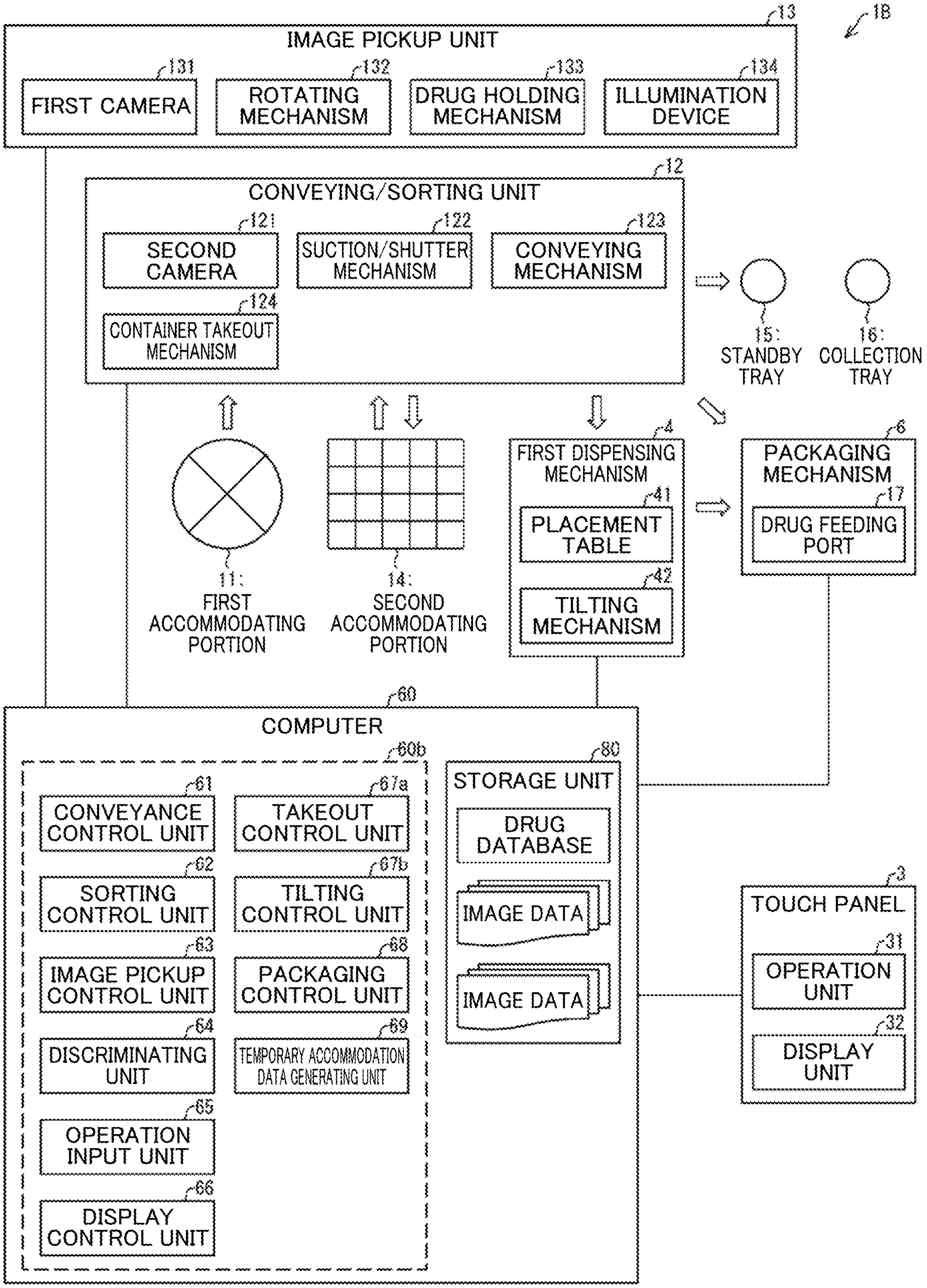
FIG. 13 is a block diagram for illustrating an overall configuration of a drug sorting apparatus according to a fourth embodiment.

FIG. 13 is a block diagram for illustrating an overall configuration of a drug sorting apparatus 1B according to a fourth embodiment. The drug sorting apparatus 1B is different from the drug sorting apparatus 1 in that the drug sorting apparatus 1B includes a control unit 60*b* in place of the control unit 60*a*. The control unit 60*b* includes a temporary accommodation data generating unit 69 in addition to the configuration of the control unit 60*a*. The temporary accommodation data generating unit 69 generates temporary accommodation data indicating the number of drugs of each type accommodated from the first accommodating portion 11 to the standby tray 15.

In the drug sorting apparatus 1B, the conveying/sorting unit 12 also functions as a re-conveying unit for conveying the drug from the standby tray 15 to the second accommodating portion 14. When the conveying/sorting unit 12 functions as the re-conveying unit, the conveying/sorting unit 12 conveys the drug from the standby tray 15 to the second accommodating portion 14 based on the temporary accommodation data. Specifically, the conveying/sorting unit 12 conveys the drug from the standby tray 15 to the second accommodating portion 14 in order from a drug of a type having a larger number of drugs of each type included in the temporary accommodation data.

A specific operation performed by the conveying/sorting unit 12 when functioning as the re-conveying unit is described below. In the following description, in the drug sorting apparatus 1B, performing sorting for all of the drugs accommodated in the first accommodating portion 11 or the standby tray 15 is referred to as one sorting. The temporary accommodation data generating unit 69 generates temporary accommodation data in a process of the first sorting. The control unit 60*b* determines, for all of the drugs included in the temporary accommodation data, in which sorting cup 141 the drug is to be accommodated in the second sorting or sorting thereafter in order from a drug of a type having a larger number in the temporary accommodation data. In each time of sorting, the sorting control unit 62 controls the conveying/sorting unit 12 to accommodate the drug in the second accommodating portion 14 along the order determined in advance by the control unit 60*b*. In other words, the sorting control unit 62 controls, in each time of sorting, the conveying/sorting unit 12 to accommodate a drug other than a drug determined to be accommodated in the second accommodating portion 14 in this time of sorting into the standby tray 15 or the first accommodating portion 11 even when a vacant sorting cup 141 is present. In this manner, the number of drugs that cannot be accommodated into the second accommodating portion 14 can be reduced in each time of sorting. Thus, there is a possibility that the time required until all of the drugs are accommodated into the second accommodating portion 14 can be reduced.

The drug sorting apparatus 1B may include a mechanism different from the conveying/sorting unit 12, which functions as the re-conveying unit for accommodating the drug from the standby tray 15 to the second accommodating portion 14. However, in the drug sorting apparatus 1B, when the conveying/sorting unit 12 functions as the re-conveying unit, the configuration of the apparatus can be simplified.

As described above, the conveyance control unit 61 may accommodate the drug that cannot be accommodated from the standby tray 15 to the second accommodating portion 14 in the second sorting into the first accommodating portion 11 again. In this case, similarly to the first sorting, the conveyance control unit 61 accommodates the drug that cannot be accommodated into the second accommodating portion 14 in the third sorting from the first accommodating portion 11 to the standby tray 15. However, in the third sorting, the first accommodating portion 11 is only used as the second standby tray. Thus, the temporary accommodation data generating unit 69 does not generate the temporary accommodation data in the third sorting. Further, the same holds true also in the sorting thereafter. In other words, the temporary accommodation data generating unit 69 generates the temporary accommodation data only when the drug is first accommodated from the first accommodating portion 11 to the standby tray 15.

FIG. 14 shows tables for describing an example of processing in a drug sorting apparatus of a comparative example. In the following description, the time required for sorting depends on the number of drugs to be conveyed, and is assumed to be 30 seconds (=0.5 minutes) per drug. In other words, it is assumed that the conveyance destination of the drug does not affect the time required for sorting. For the sake of convenience, in the following description, it is assumed that the number of types of drugs to be accommodated in the second accommodating portion 14 in one sorting is five.

In the drug sorting apparatus of the comparative example, it is assumed that eleven types of drugs MA, MB, . . . , MK have been accommodated in the standby tray 15 in the first sorting. The total number of drugs MA to MK is one hundred and five. Further, the breakdown by type of the drugs MA to MK is as indicated by reference symbol 1401 of FIG. 14.

In this drug sorting apparatus, the number of drugs that have become a target of the second sorting is all drugs accommodated in the standby tray 15, that is, one hundred and five. Among them, in the second sorting, as indicated by reference symbol 1402 of FIG. 14, five types of drugs MA to ME were accommodated in the second accommodating portion 14. Thus, the time required for the second sorting was 52.5 minutes (=105×0.5). Further, the number of drugs accommodated in the second accommodating portion 14 in the second sorting was fifteen (total number of drugs MA to ME).

In the third sorting, as indicated by reference symbol 1403 of FIG. 14, five types of drugs MF to MJ were accommodated in the second accommodating portion 14. The number of drugs that have become the target of the third sorting was the number of drugs that were not accommodated in the second accommodating portion 14 in the second sorting among the drugs that have become the target of the second sorting. Thus, the number of drugs that have become the target of the third sorting was ninety. Thus, the time required for the third sorting was 45 minutes (=90×0.5). Further, the number of drugs accommodated in the second accommodating portion 14 in the third sorting was forty (total number of drugs MF to MJ).

In the fourth sorting, as indicated by reference symbol 1404 of FIG. 14, the drugs MK remaining in the first accommodating portion 11 serving as the temporarily accommodating portion were accommodated in the second accommodating portion 14. The number of drugs that have become the target of the fourth sorting was fifty, which was the number of drugs MK. Thus, the time required for the fourth sorting was 25 minutes (=50×0.5).

In the drug sorting apparatus of the comparative example, in the example described with reference to FIG. 14, the total of the time required for the second sorting to the fourth sorting was 122.5 minutes. In this example, the drugs MK having a particularly large number were not accommodated in the second accommodating portion 14 until the fourth sorting. As a result, the number of drugs accommodated in the standby tray 15 was increased, and a long time was required for sorting. As described above, when the sorting is performed without considering the number of types of the drugs accommodated in the standby tray 15, there is a possibility that a long time is required for sorting.

FIG. 15 shows tables for describing an example of processing in the drug sorting apparatus 1B. In the drug sorting apparatus 1B as well, it is assumed that the sorting control unit 62 has accommodated eleven types of drugs MA to MK in the standby tray 15 in the first sorting. Reference symbol 1501 of FIG. 15 indicates an example of temporary accommodation data generated by the temporary accommodation data generating unit 69. In the temporary accommodation data, the total number of drugs MA to MK and the breakdown by type are the same as the breakdown in the drug sorting apparatus of the comparative example indicated by reference symbol 1401 of FIG. 14. However, in the temporary accommodation data, the order of drugs is changed from that of reference symbol 1401 of FIG. 14 so that the drugs are arranged in descending order of the number of drugs.

In the drug sorting apparatus 1B, the control unit 60*b* determines the order of accommodation so that the drugs are sequentially accommodated in the second accommodating portion 14 from the drugs of a type having a larger number in the temporary accommodation data. Accordingly, in the second sorting, as indicated by reference symbol 1502 of FIG. 15, the sorting control unit 62 accommodated five types of drugs MK to MG in the second accommodating portion 14. The number of drugs that have become the target of the second sorting was all drugs accommodated in the standby tray 15, and hence was the same as that in the drug sorting apparatus of the comparative example described above. Accordingly, the time required for the second sorting was the same as the time in the drug sorting apparatus of the comparative example described above. However, in the drug sorting apparatus 1B, the number of drugs accommodated in the second accommodating portion 14 by the sorting control unit 62 in the second sorting was eighty four (total number of drugs MK to MG indicated by the temporary accommodation data).

In the third sorting, as indicated by reference symbol 1503 of FIG. 15, the sorting control unit 62 accommodated five types of drugs MF to MB in the second accommodating portion 14. The number of drugs that have become the target of the third sorting was the number of drugs that were not accommodated in the second accommodating portion 14 in the second sorting among the drugs that have become the target of the second sorting. Thus, in the drug sorting apparatus 1B, the number of drugs that have become the target of the third sorting was twenty one. Accordingly, in the drug sorting apparatus 1B, the time required for the third sorting was 10.5 minutes (=21×0.5). Further, the number of drugs accommodated in the second accommodating portion 14 by the sorting control unit 62 in the third sorting was twenty (total number of drugs MF to MB).

In the fourth sorting, as indicated by reference symbol 1504 of FIG. 15, the sorting control unit 62 accommodated the drug MA remaining in the first accommodating portion 11 serving as the temporarily accommodating portion into the second accommodating portion 14. In the drug sorting apparatus 1B, the number of drugs that have become the target of the fourth sorting was one, which was the number of drugs MA. Thus, in the drug sorting apparatus 1B, the time required for the fourth sorting was 0.5 minutes.

In the example of the drug sorting apparatus 1B described with reference to FIG. 15, the total of the time required for the second sorting to the fourth sorting was 63.5 minutes. Thus, the time required for the second sorting to the fourth sorting was reduced by about 48% as compared to the example of the drug sorting apparatus of the comparative example described with reference to FIG. 14.

The description given above with reference to FIG. 14 and FIG. 15 is merely an example. In any of the drug sorting apparatus of the comparative example and the drug sorting apparatus 1B, the time required for the second sorting and sorting thereafter is different from that in the above-mentioned example depending on the type and the number of drugs to be accommodated into the standby tray 15 in the first sorting. Further, the time required for the second sorting and sorting thereafter is different from that in the above-mentioned example also depending on the number of types of the drugs that can be accommodated in the second accommodating portion 14 in one sorting.

Further, the example of the drug sorting apparatus of the comparative example described with reference to FIG. 14 is merely an example. In the drug sorting apparatus of the comparative example, even when drugs of the same type and the same number have been accommodated in the standby tray 15 in the first sorting, the order in which the drugs are accommodated in the second accommodating portion 14 in the second sorting and sorting thereafter is not constant. If this order becomes the same as the order described above in the drug sorting apparatus 1B, also in the drug sorting apparatus of the comparative example, the time required for the second sorting to the fourth sorting becomes the same as this time in the drug sorting apparatus 1B.

However, in the drug sorting apparatus 1B, when the drugs are accommodated from the standby tray 15 to the second accommodating portion 14, the number of drugs that are not to be accommodated into the second accommodating portion 14 can always be minimized. Thus, the time required for sorting can be expected to be reduced.

Further, it is conceivable that, among the drugs accommodated in the standby tray 15, the number of drugs of the same type is larger than the upper limit value of drugs that can be accommodated in one sorting cup 141. In such a case, in the drug sorting apparatus of the comparative example, in some cases, only a part of those drugs of the same type is accommodated into the second accommodating portion 14, and the remaining part is accommodated in the standby tray 15.

For example, a case in which the number of drugs MK is sixty in reference symbol 1401 of FIG. 14 is considered. In this case, when the drugs MA to MD and MK are determined to be accommodated into the second accommodating portion 14 in the second sorting, only fifty of the drugs MK are packaged in the second sorting. The remaining ten drugs MK are accommodated in the standby tray 15 in the second sorting, and are accommodated into the sorting cup 141 in the third sorting or sorting thereafter so as to be packaged. In this case, there is a possibility that, although the drugs have the same type, the packaging timing is greatly deviated. Thus, there is a possibility that, after the packaging is finished for all of the drugs, it takes time and effort to find the drugs of the same type from the packaged products.

In contrast, in the drug sorting apparatus 1B, as described above, the drugs are sequentially accommodated in the second accommodating portion 14 from a drug of a type having a larger number in the temporary accommodation data. Thus, even when the number of drugs of the same type is larger than the upper limit value of drugs that can be accommodated in one sorting cup 141, all of those drugs can be accommodated in the second accommodating portion 14 in the same time of sorting so as to be packaged. Thus, after the packaging is finished for all of the drugs, the drugs of the same type can be easily found from the packaged products.

For example, a case in which the number of drugs MK is sixty in FIG. 15 is considered. As described above, the control unit 60*b* selects the drugs MK as drugs to be packaged first. Thus, in this case, the control unit 60*b* determines the accommodation destination of fifty of the sixty drugs MK to the first sorting cup 141, and then determines the accommodation destination of the remaining ten drugs MK to the second sorting cup 141.

However, depending on the type and the number of the drugs in the temporary accommodation data, the conveying/sorting unit 12 does not always convey the drugs in order from a drug of a type having a larger number. For example, when drugs of another type having a number larger than the number of drugs MK are accommodated in the standby tray 15, the control unit 60*b* first determines the sorting cup 141 for accommodating those drugs of the another type. In this case, it is conceivable that, at a time point at which the control unit 60*b* determines the sorting cup 141 for accommodating the drugs MK, there is only one sorting cup 141 vacant in this time of sorting. In this case, when the control unit 60*b* determines the accommodation destination of fifty of the drugs MK to the one sorting cup 141 vacant in this time of sorting, the remaining ten drugs MK are accommodated in the sorting cup 141 in the next sorting or sorting thereafter. That is, the drugs MK of the same type have a deviation in the timing to be packaged between the first fifty drugs and the remaining ten drugs.

In order to prevent such a deviation from being caused, the control unit 60*b* determines the accommodation destination of not the fifty of the sixty drugs MK but fifty or lower drugs of another type to the one sorting cup 141 vacant in this time of sorting. The accommodation destination of the drugs MK is determined to the sorting cup 141 in the next sorting. The conveying/sorting unit 12 conveys the drugs along the order determined by the control unit 60*b*. In this manner, the drugs of the same type can all be reliably sorted in the same time of sorting. Thus, the user can easily find the drugs of the same type from the packaged products.

Fifth Embodiment

The drug sorting apparatus 1 in another embodiment is described below. In a fifth embodiment, processing in the control unit 60*a* is different from that in the first embodiment or other embodiments.

In the fifth embodiment, the control unit 60*a* determines whether or not the number of drugs accommodated in each of the sorting cups 141 has reached a predetermined upper limit value at the time when the drug is conveyed from the first accommodating portion 11 or the standby tray 15 to the second accommodating portion 14. When the control unit 60*a* determines that the number of drugs accommodated in any of the sorting cups 141 has reached the predetermined upper limit value in the middle of the conveyance of the drug, the control unit 60*a* suspends the conveyance processing, the image pickup processing, and the discrimination processing of the drug. For example, the conveyance control unit 61 suspends the conveyance of the drug by the conveying/sorting unit 12. After that, the takeout control unit 67*a* controls the container takeout mechanism 124 to take out the sorting cup 141 whose number of accommodated drugs has reached the upper limit value from the second accommodating portion 14 so as to deliver this sorting cup 141 to the first dispensing mechanism 4. The tilting control unit 67*b* controls the first dispensing mechanism 4 to tilt the delivered sorting cup 141 so as to dispense the drugs to the packaging mechanism 6. The packaging control unit 68 packages the drugs dispensed to the packaging mechanism 6. After that, the control unit 60*a* restarts the conveyance processing, the image pickup processing, and the discrimination processing of the drug.

FIG. 16 shows diagrams for describing the operation of the drug sorting apparatus 1 in the fifth embodiment. In FIG. 16, each of squares indicates the arrangement position of the sorting cup 141 in the second accommodating portion 14. In each of the squares, a current value N1 and an upper limit value N2 of drugs accommodated in the sorting cup 141 at this position are represented in a form of "N1/N2." A square in which no drug is accommodated in the sorting cup 141 is blank.

In the following description, a position at which the sorting cup 141 is accommodated is expressed by a combination of a column indicated in FIG. 16 by alphabet letters of A to F and a row indicated in FIG. 16 by numbers of 1 to 7. For example, a position corresponding to the column A and the first row is referred to as "position A1."

In FIG. 16, the change of the accommodation situation of drugs in the sorting cups 141, which is caused by the operation of the drug sorting apparatus 1, is indicated by reference symbol 1601 to reference symbol 1604. For the square whose accommodation situation has changed from the previous accommodation situation, for the sake of convenience, the numbers are surrounded by parentheses "( )". For simplifying the illustration, in reference symbol 1602 to reference symbol 1604, only the first row and the second row of the second accommodating portion 14 are shown.

It is assumed that drugs are accommodated in the second accommodating portion 14 as indicated by reference symbol 1601 at a certain time point. In this case, when the conveyance control unit 61 controls the conveying/sorting unit 12 to accommodate the drug in the sorting cup 141 at a position C1, as indicated by reference symbol 1602, the number of drugs accommodated in this sorting cup 141 reaches the upper limit value. The control unit 60*a* determines whether or not the number of drugs has reached the upper limit value for the sorting cup 141 at the position C1 in which a new drug has been accommodated, and determines that the number of drugs has reached the upper limit value. Accordingly, the control unit 60*a* suspends the conveyance processing or other processing of the drug, and packages the drugs accommodated in this sorting cup 141 as described above. As a result, as indicated by reference symbol 1603, the sorting cup 141 at the position C1 becomes vacant. After that, the control unit 60*a* restarts the conveyance processing or other processing of the drug. Thus, as indicated by reference symbol 1604, the conveyance control unit 61 can control the conveying/sorting unit 12 to accommodate a new drug in the sorting cup 141 at the position C1. At this time, the drug to be newly accommodated in the sorting cup 141 at the position C1 may be a drug of the same type as the drug accommodated before the packaging, or may be a drug of a different type.

As described above, in the drug sorting apparatus 1 according to the fifth embodiment, when the number of drugs accommodated in any of the sorting cups 141 has reached the upper limit value, the control unit 60*a* packages the drugs accommodated in this sorting cup 141. Thus, a drug can be further accommodated in this vacant sorting cup 141. Thus, the number of drugs that cannot be accommodated in the second accommodating portion 14 in one sorting can be reduced, and the time required for packaging the drugs can be reduced.

In the above-mentioned example, after the control unit 60*a* suspends the conveyance processing or other processing of the drug, the control unit 60*a* controls the first dispensing mechanism 4 to perform dispensing of the drug. However, the control unit 60*a* may control the conveying/sorting unit 12 to perform dispensing of the drug.

Sixth Embodiment

The drug sorting apparatus 1 in further another embodiment is described below. In a sixth embodiment, processing in the control unit 60*a* is different from that in the first embodiment or other embodiments.

In the sixth embodiment, the control unit 60*a* determines whether or not one or more drugs have been accommodated in all of the sorting cups 141 at the time of conveyance of the drug from the first accommodating portion 11 or the standby tray 15 to the second accommodating portion 14. When the control unit 60*a* determines that one or more drugs have been accommodated in all of the sorting cups 141 in the middle of the conveyance of the drug, the control unit 60*a* suspends the conveyance processing, the image pickup processing, and the discrimination processing of the drug. For example, the conveyance control unit 61 suspends the conveyance of the drug performed by the conveying/sorting unit 12. After that, the takeout control unit 67*a* takes out at least one sorting cup 141 from the second accommodating portion 14 so as to deliver the at least one sorting cup 141 to the first dispensing mechanism 4. The tilting control unit 67*b* tilts this sorting cup 141 so as to dispense the drug to the packaging mechanism 6. The packaging control unit 68 packages the drug dispensed to the packaging mechanism 6. After that, the control unit 60*a* restarts the conveyance processing, the image pickup processing, and the discrimination processing of the drug.

As the at least one sorting cup 141, for example, a predetermined number of sorting cups 141 may be selected in descending order of the number of accommodated drugs. In this manner, at least one sorting cup 141 is in a vacant state, and a drug can be further accommodated in this sorting cup 141. Thus, similarly to the fifth embodiment, the number of drugs that cannot be accommodated in the second accommodating portion 14 in one sorting can be reduced, and the time required for packaging the drugs can be reduced.

In the sixth embodiment, in each of the sorting cups 141, a reference value for allowing packaging of the drugs accommodated in this sorting cup 141 may be set. The reference value may be set as appropriate within a range that does not cause inefficiency when the number of drugs equal to this reference value are packaged. It suffices that the reference value be set to, for example, about 50% to 80% of the upper limit value of the number of drugs that can be accommodated in the sorting cup 141.

In this case, the control unit 60*a* determines whether or not one or more drugs have been accommodated in all of the sorting cups 141 every time the conveyance control unit 61 controls the conveying/sorting unit 12 to accommodate the drug in any one of the sorting cups 141. When the control unit 60*a* determines that one or more drugs have been accommodated in all of the sorting cups 141, the control unit 60*a* suspends the conveyance processing, the image pickup processing, and the discrimination processing of the drug. Further, the control unit 60*a* determines whether or not each of the sorting cups 141 accommodates the number of drugs equal to or larger than the reference value. The takeout control unit 67*a* sequentially takes out each of the sorting cups 141 determined as accommodating the number of drugs equal to or larger than the reference value so as to deliver this sorting cup 141 to the first dispensing mechanism 4. The tilting control unit 67*b* tilts this sorting cup 141 so as to dispense the drugs to the packaging mechanism 6. The packaging control unit 68 packages the drugs dispensed to the packaging mechanism 6. After that, the control unit 60*a* restarts the conveyance processing, the image pickup processing, and the discrimination processing of the drug.

FIG. 17 shows diagrams for describing an operation performed when the reference value is set in the drug sorting apparatus 1 in the sixth embodiment. The squares and the numbers in FIG. 17 are used similarly to those in the description of FIG. 16. Further, in the following description, the reference value is set to ten. Further, in FIG. 17, the position in a case in which a drug is accommodated in a vacant sorting cup 141 is determined to a position vacant in the order of A1 to F1, B1 to B7, . . . , A5 to F5, B6 to F6, and B7 to F7.

Reference symbol 1701 indicates the number of drugs accommodated in each of the sorting cups 141 in the second accommodating portion 14 at a certain time point. In reference symbol 1701, the conveyance control unit 61 controls the conveying/sorting unit 12 to accommodate the drug in the sorting cup 141 at the position F7. As a result, one or more drugs are accommodated in all of the sorting cups 141. The control unit 60*a* determines whether or not one or more drugs have been accommodated in all of the sorting cups 141, and determines that one or more drugs have been accommodated in all of the sorting cups 141. The control unit 60*a* determines whether or not each of the sorting cups 141 accommodates the number of drugs equal to or larger than ten, and determines that the sorting cups 141 arranged at the squares whose numbers are surrounded by square brackets "[ ]" accommodate ten or more drugs.

The control unit 60*a* packages the drugs accommodated in the sorting cup 141 determined as accommodating ten or more drugs. When the drugs accommodated in those sorting cups 141 are packaged, as indicated by reference symbol 1702, those sorting cups 141 are brought into a vacant state. After that, the control unit 60*a* restarts the conveyance processing or other processing of the drug. Thus, as indicated by reference symbol 1703, the conveyance control unit 61 controls the conveying/sorting unit 12 to newly accommodate the drug in the sorting cup 141 at the position A1. The sorting cup 141 at the position A1 has accommodated fourteen drugs at the time point of reference symbol 1701, and hence the sorting cup 141 has been in a state of being capable of accommodating only one more drug. However, the accommodated drugs have been packaged, and hence the sorting cup 141 can newly accommodate fifteen drugs.

As described above, in the drug sorting apparatus 1, when one or more drugs have been accommodated in all of the sorting cups 141, for each of the sorting cups 141 accommodating the number of drugs equal to or larger than the reference value, drugs accommodated in this sorting cup 141 may be packaged. In this case, for example, as compared to a case in which the drugs are packaged for only one sorting cup 141, the frequency of suspending conveyance of the drug from the first accommodating portion 11 or the standby tray 15 to the second accommodating portion 14 is reduced. Thus, the time required for packaging the drugs can be further reduced.

In the above-mentioned example, after the control unit 60*a* suspends the conveyance processing or other processing of the drug, the control unit 60*a* controls the first dispensing mechanism 4 to perform dispensing of the drug. However, the control unit 60*a* may control the conveying/sorting unit 12 to perform dispensing of the drug.

Seventh Embodiment

Figure 18:
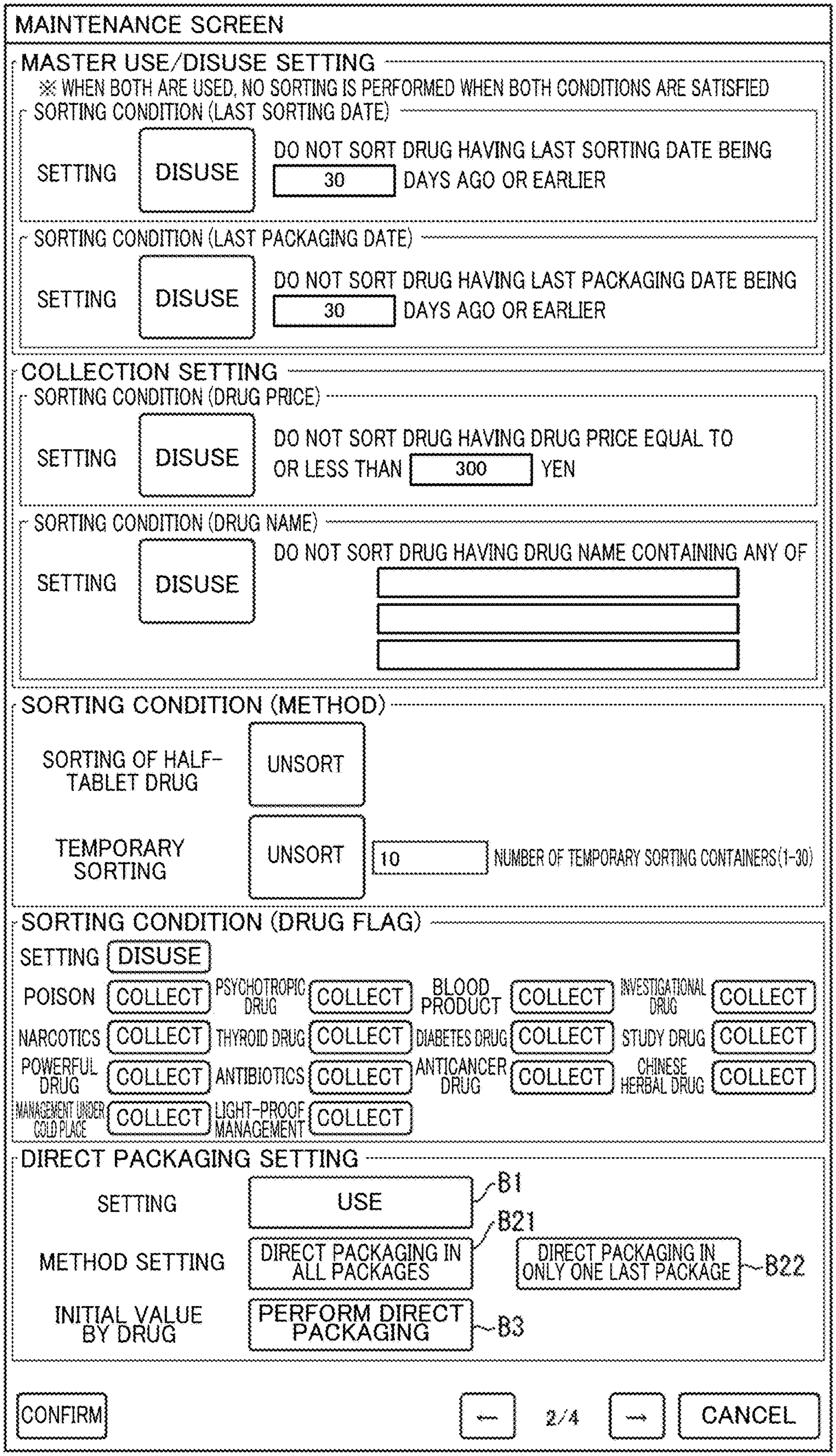
FIG. 18 is a view for illustrating a setting image for setting a comprehensive dispensing method for a drug accommodated in a sorting cup in the drug sorting apparatus according to the first embodiment.
Figure 19:
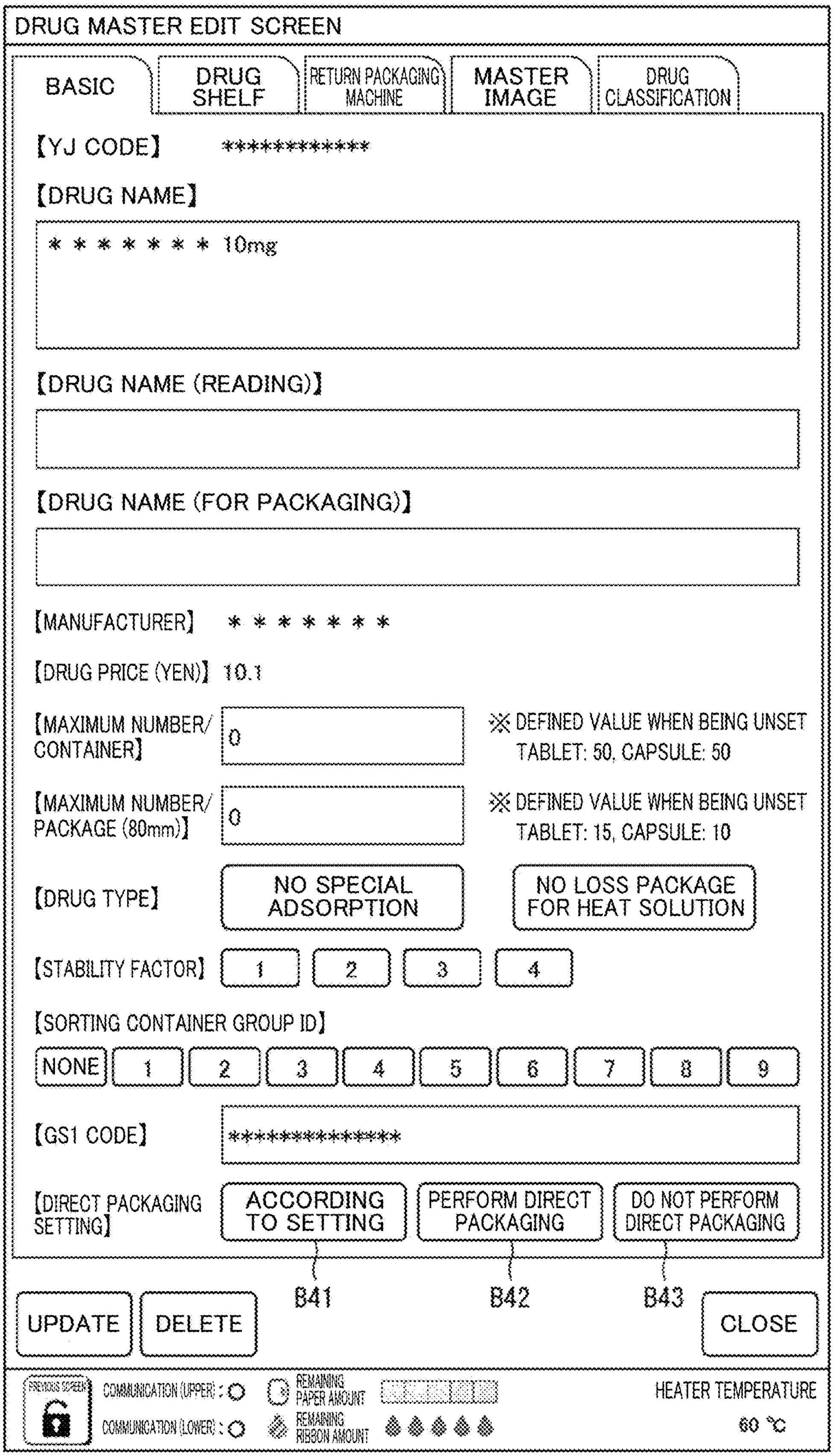
FIG. 19 is a view for illustrating a setting image for setting a dispensing method by type for a drug accommodated in the sorting cup in the drug sorting apparatus according to the first embodiment.

FIG. 18 is a view for illustrating a setting image (setting screen) for setting a comprehensive dispensing method for a drug accommodated in the sorting cup 141 in the drug sorting apparatus 1. FIG. 19 is a view for illustrating a setting image (setting screen) for setting a dispensing method by type for a drug accommodated in the sorting cup 141 in the drug sorting apparatus 1. The setting images illustrated in FIG. 18 and FIG. 19 are displayed on the display unit 32 of the touch panel 3 included in the drug sorting apparatus 1.

In the setting image illustrated in FIG. 18, buttons B1, B21, B22, and B3 are displayed. In the setting image illustrated in FIG. 19, buttons B41, B42, and B43 are displayed. When the user operates those buttons through the operation unit 31, the user sets the method of dispensing the drug from the second accommodating portion 14 to the packaging mechanism 6.

The button B1 is a button for setting whether or not to perform dispensing by the first dispensing mechanism 4. Every time the user operates the button B1, the setting on whether or not to perform the dispensing by the first dispensing mechanism 4 is alternately switched. When the button B1 indicates the setting of performing the dispensing by the first dispensing mechanism 4, the control unit 60*a* performs the dispensing by the first dispensing mechanism 4 in accordance with the settings indicated by other buttons. Meanwhile, when the button B1 indicates the setting of not performing the dispensing by the first dispensing mechanism 4, the control unit 60*a* never performs the dispensing by the first dispensing mechanism 4. That is, the control unit 60*a* performs only the dispensing by the suction/shutter mechanism 122.

The buttons B21 and B22 are buttons for setting whether to (i) perform only the dispensing by the first dispensing mechanism 4, or to (ii) use both of the dispensing by the first dispensing mechanism 4 and the dispensing by the suction/shutter mechanism 122. In other words, the buttons B21 and B22 are buttons for allowing the user to set whether or not to use the suction/shutter mechanism 122 for the dispensing of the drug from the sorting cup 141 to the packaging mechanism 6.

When the user operates the button B21, the control unit 60*a* performs only the dispensing by the first dispensing mechanism 4. That is, the suction/shutter mechanism 122 does not operate as the second dispensing mechanism. In this case, the control unit 60*a* can dispense the drug accommodated in the sorting cup 141 in a time period shorter than that in the case in which the dispensing is performed by the suction/shutter mechanism 122. In order to achieve such dispensing, the upper limit of the drugs that can be accommodated in the sorting cup 141 is set to an upper limit of the number of drugs that can be packaged in one packaging by the packaging mechanism 6.

When the user operates the button B22, the control unit 60*a* uses both of the dispensing by the first dispensing mechanism 4 and the dispensing by the suction/shutter mechanism 122. In this case, as described in the first embodiment, the control unit 60*a* selectively uses the suction/shutter mechanism 122 and the first dispensing mechanism 4 depending on the number of drugs accommodated in the sorting cup 141 so as to dispense the drug from the sorting cup 141 to the packaging mechanism 6. Thus, the upper limit of the drugs that can be accommodated in the sorting cup 141 can be set to a number larger than the packaging upper limit.

The button B3 is a button for setting which of the dispensing by the first dispensing mechanism 4 or the dispensing by the suction/shutter mechanism 122 is set as the basic setting. Every time the user operates the button B3, the basic setting is alternately switched between the dispensing by the first dispensing mechanism 4 and the dispensing by the suction/shutter mechanism 122. The control unit 60*a* refers to the basic setting when the button B41 is operated in the selection of the dispensing method by drug type to be described next.

The buttons B41, B42, and B43 are buttons for selecting the dispensing method by drug type. The user operates any of the buttons B41, B42, and B43 so as to select the dispensing method corresponding to the operated button.

The button B41 is a button for the setting of performing dispensing in accordance with the basic setting, that is, the setting indicated by the button B3 described above. In the initial state, the button B41 is in a state of being operated. The button B42 is a button for the setting of performing the dispensing by the first dispensing mechanism 4 regardless of the setting indicated by the button B3 described above. The button B43 is a button for the setting of not performing the dispensing by the first dispensing mechanism 4 regardless of the setting indicated by the button B3 described above.

For the drug of the type for which the button B42 is operated, the control unit 60*a* performs the following processing even when the basic setting indicates the dispensing by the suction/shutter mechanism 122. That is, for this drug, depending on the setting indicated by the button B21 or the button B22 described above, the control unit 60*a* performs (i) only the dispensing by the first dispensing mechanism 4 or (ii) both of the dispensing by the first dispensing mechanism 4 and the dispensing by the suction/shutter mechanism 122. The same holds true also for the drug of the type for which the button B41 is operated when the basic setting indicates the dispensing by the first dispensing mechanism 4.

For the drug of the type for which the button B43 is operated, the control unit 60*a* performs the following processing even when the basic setting indicates the dispensing by the first dispensing mechanism 4. That is, for this drug, the control unit 60*a* performs the dispensing only by the suction/shutter mechanism 122. The same holds true also for the drug of the type for which the button B41 is operated when the basic setting indicates the dispensing by the suction/shutter mechanism 122.

The setting to be indicated by each of the buttons can be changed before the drug is conveyed from the first accommodating portion 11 to the second accommodating portion 14. Further, the setting to be indicated by each of the buttons can be changed also before the drug is dispensed to the packaging mechanism 6 after the drug is accommodated in the sorting cup 141 of the second accommodating portion 14. However, before the drug is conveyed from the first accommodating portion 11 to the second accommodating portion 14, when (i) the button B1 indicates the setting of not performing the dispensing by the first dispensing mechanism 4 or when (ii) the button B22 is operated, there is a possibility that the number of drugs larger than the packaging upper limit are accommodated in the sorting cup 141. In this case, even when the button B21 is operated before the drug is dispensed to the packaging mechanism 6 after the drug is accommodated in the sorting cup 141 of the second accommodating portion 14, the control unit 60*a* does not receive the operation of the button B21. Accordingly, the control unit 60*a* causes the first dispensing mechanism 4 and the suction/shutter mechanism 122 to perform the same operation as that in the case in which the button B22 is operated. With such an operation, the number of drugs larger than the packaging upper limit are prevented from being dispensed to the packaging mechanism 6.

Eighth Embodiment

Figure 20:
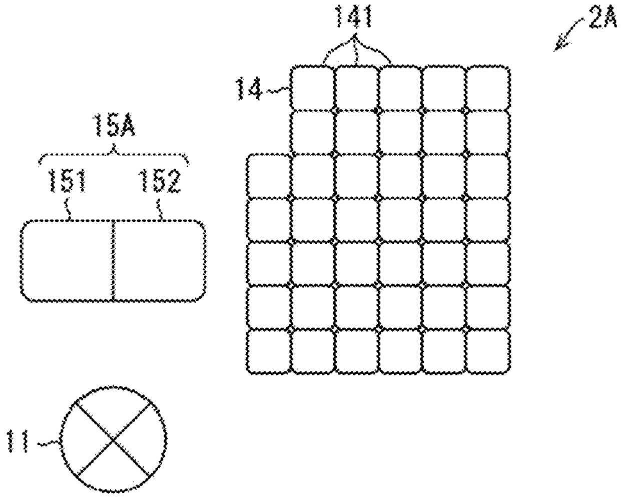
FIG. 20 is a diagram for illustrating an outline of a drug sorting area in an eighth embodiment.

FIG. 20 is a diagram for illustrating an outline of a drug sorting area 2A in an eighth embodiment. As illustrated in FIG. 20, the drug sorting area 2A is different from the drug sorting area 2 in that a standby tray 15A is included in place of the standby tray 15. The standby tray 15A includes, as regions for accommodating drugs, a first standby region 151 and a second standby region 152. The first standby region 151 is a region for accommodating a drug whose type has been able to be discriminated in the first sorting. The control unit 60_a_ determines, when the type of the drug has been able to be discriminated, whether there is a sorting cup 141 that can accommodate this drug. When there is no sorting cup 141 that can accommodate this drug, the control unit 60_a_ accommodates this drug in the first standby region 151. The second standby region 152 is a region for accommodating a drug whose type has not been able to be discriminated in the first sorting.

Further, in this embodiment, a part of the plurality of sorting cups 141 placed in the second accommodating portion 14 is set as the sorting cup 141 for accommodating the drug whose type has been able to be discriminated, and other sorting cups 141 are set as the sorting cup 141 for accommodating the drug whose type has not been able to be discriminated. In the following description, the sorting cup 141 for accommodating the drug whose type has been able to be discriminated is referred to as "sorting cup 141 for sorting." Further, the sorting cup 141 for accommodating the drug whose type has not been able to be discriminated is referred to as "sorting cup 141 for temporary sorting."

In the first sorting, the control unit 60_a_ conveys the drug by the conveying/sorting unit 12 from the first accommodating portion 11 to the second accommodating portion 14, the first standby region 151, or the second standby region 152. In the second sorting and sorting thereafter, the control unit 60_a_ separately sorts the drug accommodated in the first standby region 151 and the drug accommodated in the second standby region 152.

It is highly possible that the type of the drug accommodated in the first standby region 151 can be discriminated even in the second sorting or sorting thereafter. Thus, when the drug accommodated in the first standby region 151 is sorted, the control unit 60_a_ reduces the number of sorting cups 141 for temporary sorting so as to increase the number of sorting cups 141 for sorting. Thus, the sorting can be efficiently performed.

Further, it is highly possible that the type of the drug accommodated in the second standby region 152 cannot be discriminated even in the second sorting or sorting thereafter. Thus, when the drug accommodated in the second standby region 152 is sorted, the control unit 60_a_ increases the number of sorting cups 141 for temporary sorting. Thus, the sorting can be efficiently performed.

Figure 21:
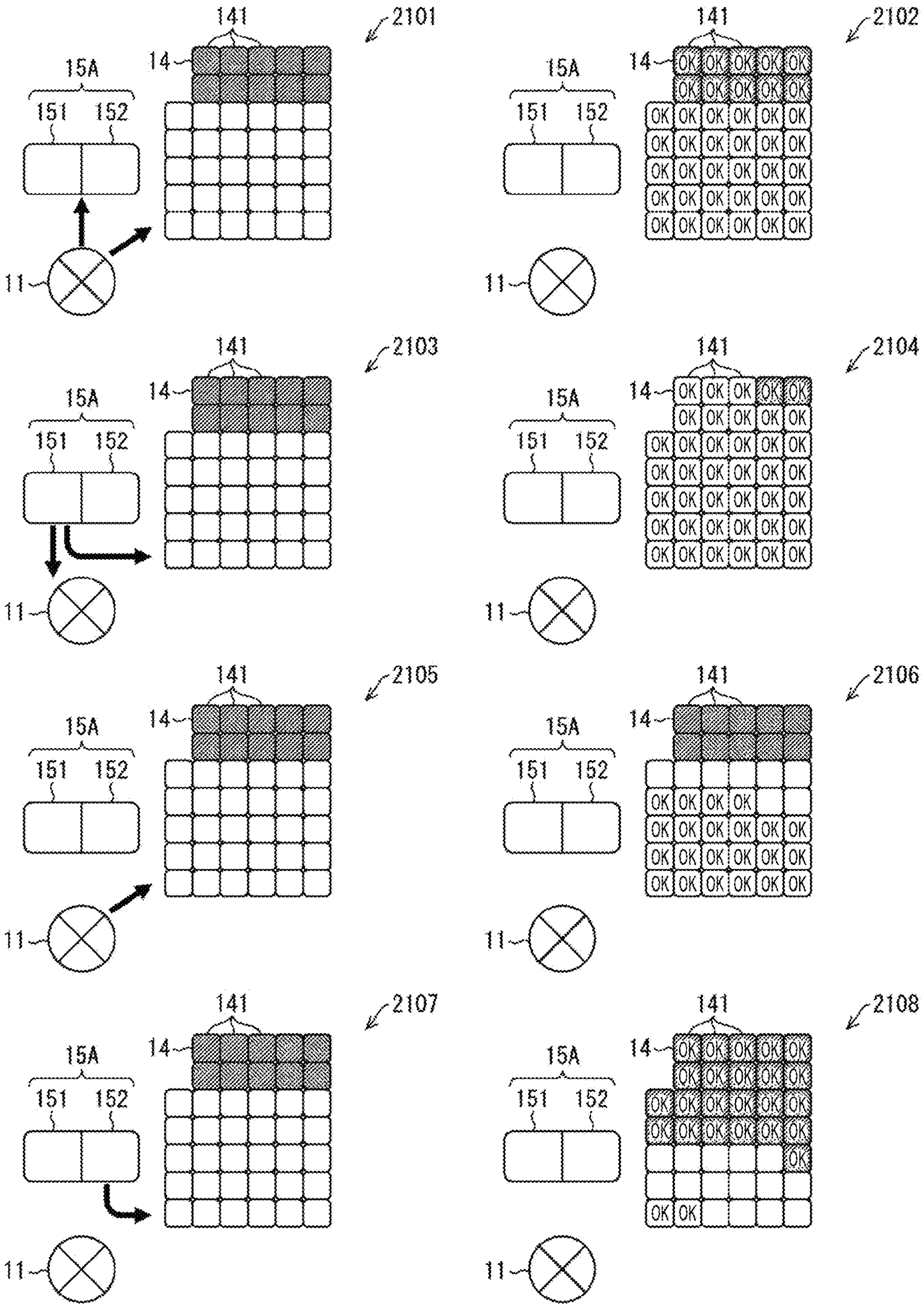
FIG. 21 shows diagrams for illustrating an example of sorting performed by the drug sorting apparatus including the drug sorting area in the eighth embodiment.

FIG. 21 shows diagrams for illustrating an example of sorting performed by the drug sorting apparatus 1 including the drug sorting area 2A. In FIG. 21, letters of "OK" are written for the sorting cup 141 in a state of accommodating a drug. In FIG. 21, the sorting cup 141 for temporary sorting is shaded.

In the example illustrated in FIG. 21, the second accommodating portion 14 includes forty sorting cups 141. For simplifying the illustration, in FIG. 21, only a part of the sorting cups 141 are denoted by a reference symbol. The same holds true also in FIG. 22 and FIG. 23 referred to later. In the initial state, ten sorting cups 141 are set as the sorting cup 141 for temporary sorting. Thus, the number of sorting cups 141 for sorting is thirty.

As indicated by reference symbol 2101, first, the control unit 60_a_ sorts the drugs accommodated in the first accommodating portion 11. At this time, the control unit 60_a_ accommodates, among the drugs whose types have been able to be discriminated, drugs of up to the thirtieth type in the sorting cups 141 for sorting by type. Further, the control unit 60_a_ accommodates, among the drugs whose types have not been able to be discriminated, drugs of up to the tenth type in the sorting cups 141 for temporary sorting. At this time, the control unit 60_a_ accommodates, among the drugs whose types have not been able to be discriminated, drugs estimated to have the same type from the features in the images into the same sorting cup 141.

Meanwhile, the control unit 60_a_ accommodates, among the drugs whose types have been able to be discriminated, drugs of the thirty-first type and the subsequent types into the first standby region 151 of the standby tray 15A because there is no vacant sorting cup 141 for sorting. Further, the control unit 60_a_ accommodates, among the drugs whose types have not been able to be discriminated, drugs of the eleventh type and the subsequent types into the second standby region 152 of the standby tray 15A because there is no vacant sorting cup 141 for temporary sorting.

As indicated by reference symbol 2102, after all of the drugs accommodated in the first accommodating portion 11 are accommodated in the second accommodating portion 14, the first standby region 151, or the second standby region 152, the control unit 60_a_ packages the drugs accommodated in the second accommodating portion 14 for each sorting cup 141.

After the drugs accommodated in the second accommodating portion 14 are packaged, as indicated by reference symbol 2103, the control unit 60_a_ sorts the drugs accommodated in the first standby region 151 to the second accommodating portion 14 or the first accommodating portion 11. At this time, the control unit 60_a_ can dynamically set the number of sorting cups 141 for sorting. For example, in a process of re-sorting the drugs accommodated in the first standby region 151, when there are two types of drugs whose types have not been able to be discriminated, as indicated by reference symbol 2104, the control unit 60_a_ sets two sorting cups 141 as the sorting cup 141 for temporary sorting. Further, the control unit 60_a_ sets the remaining thirty-eight sorting cups 141 as the sorting cup 141 for sorting. The dynamical setting of the sorting cup 141 for temporary sorting is described in a ninth embodiment.

As indicated by reference symbol 2104, the control unit 60_a_ packages the drugs accommodated in the second accommodating portion 14. After that, as indicated by reference symbol 2105, the control unit 60_a_ sorts the drugs accommodated in the first accommodating portion 11 to the second accommodating portion 14 or the first standby region 151. In this time of sorting, as the initial setting, similarly to reference symbol 2101, the number of sorting cups 141 for temporary sorting is set to ten, and the number of sorting cups 141 for sorting is set to thirty. The control unit 60_a_ sequentially discriminates the types of the drugs accommodated in the first accommodating portion 11, and as a result, sorts those drugs without changing the initial setting when the number of types of those drugs is thirty or less. In this example, it is assumed that the remaining number of types of the drugs accommodated in the first accommodating portion 11 is twenty two, and the control unit 60_a_ has been able to discriminate the types of all of those drugs. In this case, as indicated by reference symbol 2106, the control unit 60_a_ accommodates the drugs into the twenty-two sorting cups 141 for sorting without changing the initial setting. At a time point at which the state indicated by reference symbol 2106 is achieved, the sorting of the drugs that have been sorted in the first standby region 151 in the first sorting is finished.

As indicated by reference symbol 2106, the control unit 60_a_ packages the drugs accommodated in the second accommodating portion 14. After that, as indicated by reference symbol 2107, the control unit 60_a_ sorts the drugs accommodated in the second standby region 152 to the second accommodating portion 14 or the first accommodating portion 11. For example, in a process of re-sorting the drugs accommodated in the second standby region 152, when there are twenty-three types of drugs whose types have not been able to be discriminated, as indicated by reference symbol 2108, the control unit 60*a* sets twenty-three sorting cups 141 as the sorting cup 141 for temporary sorting. At a time point indicated by reference symbol 2108, the sorting of the drugs that have been sorted in the second standby region 152 in the first sorting is finished. In this manner, a series of steps of sorting for sorting all of the drugs first accommodated in the first accommodating portion 11 are ended.

As described above, in the sorting performed by the drug sorting apparatus 1 including the drug sorting area 2A, the control unit 60*a* accommodates the drug whose type has been able to be discriminated in the first sorting and the drug whose type has not been able to be discriminated in the first sorting into regions different from each other of the standby tray 15A. Further, the control unit 60*a* sorts, in the second sorting and sorting thereafter, the drug whose type has been able to be discriminated in the first sorting and the drug whose type has not been able to be discriminated in the first sorting separately. In the second sorting and sorting thereafter, the control unit 60*a* dynamically sets the number of sorting cups 141 for temporary sorting.

Thus, the number of drugs that can be sorted in the second accommodating portion 14 in one sorting is increased, and the number of times of sorting is reduced. Thus, the time required for the entire series of sorting steps for sorting all of the drugs first accommodated in the first accommodating portion 11 can be reduced.

Ninth Embodiment

The dynamic setting of the number of sorting cups 141 for temporary sorting is described below.

Figure 22:
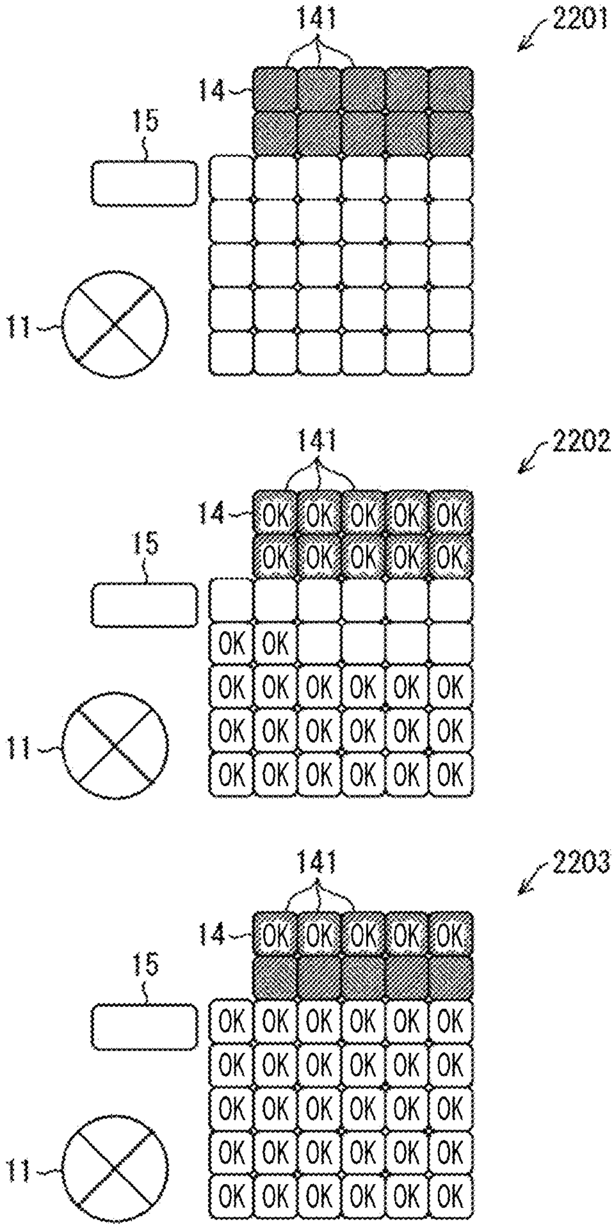
FIG. 22 shows diagrams for describing an example of a case in which the number of sorting cups for temporary sorting is not dynamically set during sorting.

FIG. 22 shows diagrams for describing an example of a case in which the number of sorting cups 141 for temporary sorting is not dynamically set during sorting. Reference symbol 2201 of FIG. 22 indicates a diagram for illustrating an example of the setting of the sorting cup 141 for sorting and the sorting cup 141 for temporary sorting. In reference symbol 2201 of FIG. 22, the sorting cup 141 arranged in a shaded region is the sorting cup 141 for temporary sorting. In the example indicated by reference symbol 2201 of FIG. 22, the second accommodating portion 14 includes forty sorting cups 141. The user sets the number of sorting cups 141 for temporary sorting before the sorting is started. In the example indicated by reference symbol 2201 of FIG. 22, ten of the forty sorting cups 141 are set as the sorting cup 141 for temporary sorting.

Reference symbol 2202 of FIG. 22 indicates a diagram for illustrating an example of sorting using the second accommodating portion 14 having the setting indicated by reference symbol 2201. Reference symbol 2202 of FIG. 22 indicates an example in which twenty types of drugs whose types can be discriminated and twenty types of drugs whose types cannot be discriminated have been accommodated in the first accommodating portion 11. In this example, the control unit 60*a* can accommodate all types of drugs whose types can be discriminated in the second accommodating portion 14. However, the control unit 60*a* can accommodate only ten types of drugs whose types cannot be discriminated in the second accommodating portion 14, and accommodates the remaining ten types of drugs in the standby tray 15. Meanwhile, in the second accommodating portion 14, ten sorting cups 141 are in a state of not accommodating a drug.

Reference symbol 2203 of FIG. 22 indicates a diagram for illustrating an example of sorting using the second accommodating portion 14 having the setting indicated by reference symbol 2201, which is different from that of reference symbol 2202. Reference symbol 2203 of FIG. 22 indicates an example in which thirty-five types of drugs whose types can be discriminated and five types of drugs whose types cannot be discriminated have been accommodated in the first accommodating portion 11. In this example, the control unit 60*a* can accommodate all of the drugs whose types cannot be discriminated in the second accommodating portion 14. However, the control unit 60*a* can only accommodate thirty types of drugs whose types can be discriminated in the second accommodating portion 14, and accommodates the remaining five types in the standby tray 15. Meanwhile, in the second accommodating portion 14, five sorting cups 141 are in a state of not accommodating a drug.

As described above, when the number of sorting cups 141 for temporary sorting is not dynamically set during sorting, in some cases, even though there is a sorting cup 141 in a state of not accommodating a drug, the control unit 60*a* cannot accommodate the drug into the second accommodating portion 14 and accommodates the drug into the standby tray 15. Thus, the usage efficiency of the sorting cups 141 is reduced.

Figure 23:
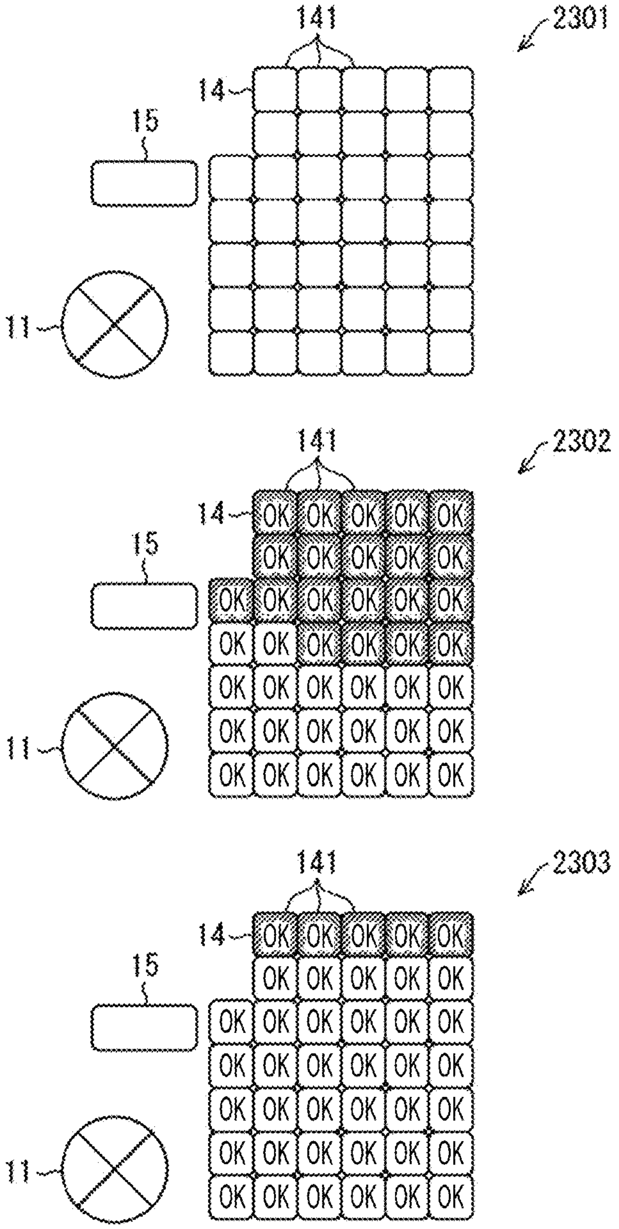
FIG. 23 shows diagrams for describing an example of a case in which the number of sorting cups for temporary sorting is dynamically set during sorting.

FIG. 23 shows diagrams for describing an example of a case in which the number of sorting cups 141 for temporary sorting is dynamically set during sorting. Reference symbol 2301 of FIG. 23 indicates a view for describing the initial setting of a case in which the number of sorting cups 141 for temporary sorting is dynamically changed. When the number of sorting cups 141 for temporary sorting is dynamically changed, the user only sets whether or not to perform temporary sorting as the initial setting. "To perform temporary sorting" refers to accommodating the drug whose type cannot be discriminated into the sorting cup 141 for temporary sorting based on the feature in the image. When the temporary sorting is performed, the user does not set the specific number of sorting cups 141 for temporary sorting. Thus, in reference symbol 2301 of FIG. 23, no sorting cup 141 for temporary sorting is shown.

Reference symbols 2302 and 2303 of FIG. 23 each indicates a diagram for illustrating an example of sorting using the second accommodating portion 14 having the setting indicated by reference symbol 2301. Reference symbol 2302 of FIG. 23 indicates an example in which, similarly to reference symbol 2202 of FIG. 22, twenty types of drugs whose types can be discriminated and twenty types of drugs whose types cannot be discriminated have been accommodated in the first accommodating portion 11. Reference symbol 2303 of FIG. 23 indicates an example in which, similarly to reference symbol 2203 of FIG. 22, thirty-five types of drugs whose types can be discriminated and five types of drugs whose types cannot be discriminated have been accommodated in the first accommodating portion 11.

When the control unit 60*a* cannot discriminate the type of the drug, the control unit 60*a* sets any of the sorting cups 141 as the sorting cup 141 for temporary sorting, and accommodates the drug whose type has not been able to be discriminated in this sorting cup 141. As a result, the number of sorting cups 141 for temporary sorting is dynamically set depending on the number of drugs whose types cannot be discriminated.

In the example indicated by reference symbol 2302 of FIG. 23, the control unit 60*a* sets twenty sorting cups 141 as the sorting cup 141 for temporary sorting in accordance with the number of drugs whose types cannot be discriminated. In the example indicated by reference symbol 2303 of FIG. 23, the control unit 60*a* sets five sorting cups 141 as the sorting cup 141 for temporary sorting in accordance with the number of drugs whose types cannot be discriminated. Thus, in any of the examples indicated by reference symbols 2302 and 2303 of FIG. 23, unlike the examples indicated by reference symbols 2202 and 2203 of FIG. 22, sorting can be performed through use of all of the sorting cups 141.

As described above, when the control unit 60*a* dynamically sets the number of sorting cups 141 for temporary sorting during sorting, the sorting cups 141 can be efficiently used. Thus, the time required for the entire sorting can be reduced.

Tenth Embodiment

In some cases, the packaging performed by the packaging mechanism 6 is suspended through the operation of the user. In such cases, the packaging control unit 68 may package the drug that has been dispensed from the sorting cup 141 to the packaging mechanism 6 at a time point at which the operation of the user for suspending the packaging is received.

Information on the drug planned to be packaged is printed on the packaging paper sheet in advance before the dispensing of the drug to the packaging mechanism 6 is started. The information printed on the packaging paper sheet includes a total number of drugs to be packaged (total number of drugs accommodated in the sorting cup 141). However, when the above-mentioned user operation is received in the middle of the dispensing of the drugs to the packaging mechanism 6, the number of drugs to be packaged by the packaging mechanism 6 is smaller than the number of drugs printed on the packaging paper sheet.

Thus, the packaging control unit 68 may additionally print information on the fact that the packaging has been suspended onto a journal on which information on the drug to be packaged (for example, inspection date and time, ID of the sorting cup 141, drug name, total number of the above-mentioned drugs, and the like) is to be printed. In this case, the drug sorting apparatus 1 further includes a printing output unit (not shown) for performing printing on the journal.

The packaging mechanism 6 causes the printing mechanism to print a code (for example, a two-dimensional code or a barcode) on a part of a band of the packaging paper sheet. For example, the code is printed on the first or last of a series of packaging paper sheets used for packaging all of the drugs first accommodated in the first accommodating portion 11. Further, the code may be printed on a vacant package provided between two packaged products.

After the drug sorting apparatus 1 sorts the drugs accommodated in the first accommodating portion 11, a pharmacist or the like visually inspects the contents of this sorting, and, when there is no problem, inputs this fact through the operation unit 31. When the pharmacist or the like causes a reader (not shown) included in the drug sorting apparatus 1 to read the code printed on the packaging paper sheet as described above after the packaging is performed by the drug sorting apparatus 1, the printing output unit outputs the journal for the drugs packaged by the packaging paper sheet. When the packaging is suspended, the information on the fact that the packaging has been suspended is additionally printed on the journal.

Further, the packaging control unit 68 may package also the drug remaining in the sorting cup 141 separately from the drug that has been dispensed to the packaging mechanism 6. On the packaging paper sheet that packages the drug remaining in the sorting cup 141, the packaging control unit 68 prints the number of those drugs.

In this manner, when the user visually recognizes the journal and the two packaged products obtained by packaging with the packaging paper sheets as described above, the user can determine that the drugs included in those two packaged products are drugs whose packaging has been suspended in the middle of the packaging. Further, the control unit 60*a* dispenses the packaged products and the journal as described above for the drugs in the middle of being packaged when the above-mentioned user operation has been received, and hence no re-sorting is required.

As another operation, when the packaging has been suspended in the middle of dispensing drugs to the packaging mechanism 6, the packaging control unit 68 may not package the drug accommodated in the sorting cup 141 for which the packaging has been performed. In this case, the packaging control unit 68 accommodates the drug that has been dispensed to the packaging mechanism 6 at the time point at which the packaging has been suspended in another package continuous to the package originally planned to package the drug in the packaging paper sheet. In this case, restart of packaging is not allowed for the drug remaining in the second accommodating portion 14 at the time point at which the packaging has been suspended. In this manner, it is possible to prevent the number of drugs to be actually packaged from becoming different from the number of drugs that has been already printed on the packaging paper sheet. Further, the drug remaining in the second accommodating portion 14 can be packaged by re-feeding the drug into the first accommodating portion 11 to perform sorting.

As further another operation, when the user performs an operation of suspending the packaging in the middle of dispensing drugs to the packaging mechanism 6, the drugs accommodated in the sorting cup 141 for which the packaging has been performed at this time point may be packaged after all of the drugs are dispensed to the packaging mechanism 6. In this case, the number of drugs to be packaged matches the number of drugs printed on the packaging paper sheet.

Eleventh Embodiment

As described above, the information on the drug stored in the second accommodating portion 14 may be written into a RFID tag of the sorting cup 141. For example, the drug accommodated in the sorting cup 141 is loaded to an external packaging machine with reference to the information written on the RFID tag. As another example, the drug accommodated in the sorting cup 141 is dispensed to the packaging mechanism 6. After the user loads the drug accommodated in the sorting cup 141 to the external packaging machine, or after the control unit 60*a* dispenses the drug to the packaging mechanism 6, the control unit 60*a* requires to eliminate the information written on the RFID tag in order to use the sorting cup 141 for the next sorting.

As a method of initializing the RFID tag, for example, there is a method of performing initialization by causing an external RFID tag reader/writer to read the information of the RFID tag of the sorting cup 141 one by one. As another example, there is a method of performing initialization through use of an RFID tag reader/writer provided to the second accommodating portion 14 after the control unit 60*a* recognizes that no drug is remaining in the sorting cup 141 one by one. Those methods both require time of about four to five minutes until the next sorting is allowed from when the initialization of the RFID tag of the sorting cup 141 is started.

The control unit 60*a* may control the RFID tag reader/writer provided to the second accommodating portion 14 to collectively initialize the RFID tags of all of the sorting cups 141 placed in the second accommodating portion 14. For example, the control unit 60*a* may execute this processing when an operation of the user is received. In this manner, the control unit 60*a* does not require to initialize the RFID tag of the sorting cup 141 one by one after the drug accommodated in the sorting cup 141 is loaded to the external packaging machine or after this drug is dispensed to the packaging mechanism 6. Thus, the time required until the next sorting is started can be reduced.

Twelfth Embodiment

In the second accommodating portion 14, the position of the sorting cup 141 of each type of drug is determined by the order in which the drug is sorted. For example, a case in which drugs of the same type are accommodated in a plurality of sorting cups 141 is considered. In this case, a drug of another type sorted from when the first sorting cup 141 is started to be used until when the second sorting cup 141 is started to be used is accommodated in a sorting cup 141 positioned between the first sorting cup 141 and the second sorting cup 141. As a result, in some cases, a plurality of sorting cups 141 accommodating the drugs of the same type are dotted at positions separated away from each other in the second accommodating portion 14.

In the drug sorting apparatus 1, in some cases, the user takes out the sorting cup 141 from the second accommodating portion 14 so as to pack the drugs of the same type or return the drugs to the packaging machine, without packaging the sorted drugs by the packaging mechanism 6. In those cases, when the plurality of sorting cups 141 accommodating the drugs of the same type are dotted in the second accommodating portion 14, the user requires to find the drugs of the same type, and the work efficiency of the user is reduced.

The control unit 60*a* may re-arrange the sorting cups 141 by the container takeout mechanism 124 after the sorting is ended so that the plurality of sorting cups 141 accommodating the drugs of the same type are arranged at positions close to each other. In this manner, the work efficiency of the user is improved.

Thirteenth Embodiment

In some cases, a designer or a user that determines the setting of the drug sorting apparatus 1 sets, in the sorting to be executed by the drug sorting apparatus 1, the upper limit of the number of the drugs to be accommodated in the individual sorting cup 141 to be smaller than the upper limit of the number of the drugs that can be actually accommodated in the sorting cup 141. For example, in some cases, the upper limit of the number of drugs to be accommodated during the sorting in the sorting cup 141 having a volume that can actually accommodate up to sixty drugs is set to fifty drugs. When such an upper limit is set, for example, the possibility that, when a drug bounces in the sorting cup 141, this drug jumps outside of the sorting cup 141 can be reduced. However, in consideration of the efficiency of usage of the sorting cups 141, in some cases, it is preferred that the upper limit of the drugs to be accommodated in the sorting cup 141 be brought closer to the upper limit of the drugs that can be actually accommodated in the sorting cup 141.

The control unit 60*a* may have a function of presenting the user of, when drugs of one type are accommodated in a plurality of sorting cups 141 in one sorting in the sorting within a certain period in the past, an average value of surplus tablet numbers of drugs of this type. The surplus tablet number refers to a remainder of each type of drug, which is obtained when the total number of drugs sorted in one sorting is divided by the upper limit of the number of drugs to be accommodated in one sorting cup 141. When the control unit 60*a* includes this function, the user can refer to the surplus tablet number so as to check whether or not the setting of the upper limit of drugs to be accommodated is appropriate. The certain period in the past may be set as appropriate by the user or the designer of the drug sorting apparatus 1, and may be set to, for example, two weeks, one month, or the like.

For example, an example in which fifty-one to sixty drugs for which the upper limit to be accommodated in the sorting cup 141 is set to fifty are sorted on a fixed day of the week is considered. In this example, the surplus tablet number is one to ten. The user can check the surplus tablet number so as to recognize that the second sorting cup 141 is regularly used in order to sort the one to ten drugs, and can reconsider the setting of the upper limit of accommodating this drug in the sorting cup 141. For example, when the user changes the setting of the upper limit of accommodating this drug in the sorting cup 141 to sixty drugs, this drug can be sorted in one sorting cup 141 in the next sorting and sorting thereafter. As a result, the sorting cups 141 can be efficiently used.

Further, in some cases, the number of drugs that become a target of sorting varies depending on factors such as drugs to be prescribed only in a specific period (for example, month or season) or a doctor in charge or the like of each day of week. There is a possibility that the surplus tablet number also varies in accordance with the variation of the number of drugs. Thus, artificial intelligence (AI) may learn the variation of the surplus tablet number caused by those factors, and this AI may propose a change of the upper limit of accommodation of the sorting cup 141 with respect to the user.

Fourteenth Embodiment

Figure 24:
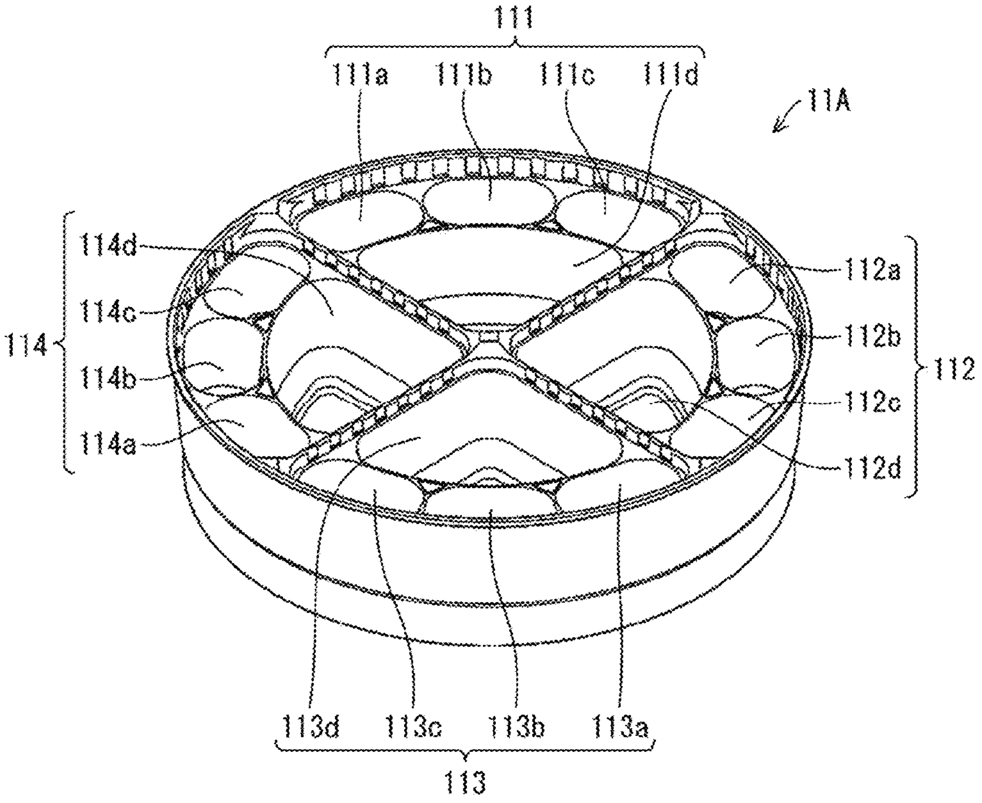
FIG. 24 is a view for illustrating an example of a first accommodating portion.

FIG. 24 is a view for illustrating an example of a first accommodating portion 11A which is a modification example of the first accommodating portion 11. The first accommodating portion 11A illustrated in FIG. 24 has an internal structure that allows the drug sorting apparatus 1 to efficiently sort the brought drugs. In the example of FIG. 24, the first accommodating portion 11A includes four accommodating portions 111 to 114 having substantially the same volume.

Each of the four accommodating portions 111 to 114 is further divided into four portions. The accommodating portion 111 includes three small accommodating portions 111*a* to 111*c* and one middle accommodating portion 111*d*. The accommodating portion 112 includes three small accommodating portions 112*a* to 112*c* and one middle accommodating portion 112*d*. The accommodating portion 113 includes three small accommodating portions 113*a* to 113*c* and one middle accommodating portion 113*d*. The accommodating portion 114 includes three small accommodating portions 114*a* to 114*c* and one middle accommodating portion 114*d*.

When the brought drugs are accommodated in the first accommodating portion 11A, the user accommodates the brought drugs while classifying the brought drugs into a first brought drug and a second brought drug. The first brought drug is a brought drug which has been prescribed to a certain patient PA from a certain medical institution as a drug to be administered by the certain patient PA for each of a plurality of times of administration at a predetermined date of administration (predetermined timing of administration), and is then brought to a medical institution different from this medical institution. The second brought drug is, among brought drugs which have been prescribed to a patient PA from a certain medical institution and are then brought to a medical institution different from this medical institution, a surplus brought drug other than the first brought drug.

In the accommodating portion 111, each of the small accommodating portions 111*a* to 111*c* functions as a portion for accommodating the first brought drug of the patient PA. The middle accommodating portion 111*d* functions as a portion for accommodating the second brought drug of the patient PA. For example, when the brought drugs are prescribed as drugs to be administered three times in each day, drugs for three times to be administered in the first day are the first brought drug, and drugs to be administered in the second day and thereafter are the second brought drug.

In the respective accommodating portions 111 to 114, for example, the first brought drugs and the second brought drugs of patients different from each other may be accommodated. In this case, the first accommodating portion 11A can accommodate brought drugs of up to four people at maximum at once.

In this embodiment, when the brought drugs of a plurality of patients are accommodated in the first accommodating portion 11A, the control unit 60*a* first sorts the first brought drug of each of the patients. At a time point at which the sorting of the first brought drugs of all of the patients is ended, the control unit 60*a* brings the first brought drugs to a visually inspectable state. The user performs visual check for the first brought drug of the patient for which an inspection result is desired to be output. After the visual check is performed by the user, the control unit 60*a* outputs the inspection result for the first brought drug. After that, the control unit 60*a* sorts the second brought drug of each of the patients.

As described above, when the control unit 60*a* sorts the first brought drugs of all of the patients accommodated in the first accommodating portion before the second brought drugs of all of those patients, the user can perform visual inspection of the first brought drugs before the second brought drugs. In many cases, the first brought drug and the second brought drug have the same content of prescription. Accordingly, as compared to a case in which the user performs the visual inspection after all of the brought drugs accommodated in the first accommodating portion 11A are sorted, the user can recognize the type of the drug prescribed to each patient at an earlier stage.

[Example of Implementation by Software]

The function of the drug sorting apparatus 1, 1A, or 1B (hereinafter referred to as "apparatus") can be implemented by a program for causing a computer to function as this apparatus and also for causing a computer to function as each control block of this apparatus (particularly, each unit included in the control unit 60*a* or 60*b*).

In this case, the above-mentioned apparatus includes, as hardware for executing the above-mentioned program, a computer including at least one control device (for example, a processor) and at least one recording device (for example, a memory). This control device and this recording device execute the above-mentioned program so that each function described in each of the above-mentioned embodiments is implemented.

The above-mentioned program may be recorded in one or a plurality of computer-readable recording media instead of being temporarily recorded. This recording media may be or not be included in the above-mentioned apparatus. In the latter case, the above-mentioned program may be supplied to the above-mentioned apparatus via any wired or wireless transmission medium.

Further, a part or all of the functions of the above-mentioned control blocks can be implemented by a logic circuit. For example, an integrated circuit having formed thereon a logic circuit for functioning as the above-mentioned control blocks also falls within the scope of the present disclosure. In addition, the functions of the above-mentioned control blocks can also be implemented by, for example, a quantum computer.

Further, each step of processing described in each of the above-mentioned embodiments may be executed by AI. In this case, the AI may operate in the above-mentioned control device or may operate in another device (for example, an edge computer, a cloud server, or the like).

[Supplementary Notes]

The present disclosure is not limited to each embodiment described above, and various changes may be made thereto within the appended claims. An embodiment obtained by combining as appropriate technical means disclosed in different embodiments is also included in the technical scope of the present disclosure.

The invention claimed is:

1. A drug sorting apparatus, comprising:

a conveying/sorting unit configured to sort a plurality of drugs based on a plurality of types of drugs;

an accommodating portion in which a plurality of sorting containers are arrangeable, the plurality of sorting containers being configured to accommodate the plurality of types of drugs in a state of being sorted by type, and the conveying/sorting unit is configured to convey they plurality of drugs in the state of being sorted by type to the accommodating portion;

a packaging unit configured to package a drug of the plurality of types of drugs, which is accommodated in the accommodating portion;

a first dispensing mechanism configured to dispense, for each of the plurality of sorting containers, the drug accommodated in the accommodating portion to the packaging unit; and a container takeout mechanism configured to take out a sorting container of the plurality of sorting containers from the accommodating portion so as to deliver the sorting container to the first dispensing mechanism, wherein the first dispensing mechanism is configured to tilt or turn upside down the sorting container received from the container takeout mechanism, to thereby dispense the drug accommodated in the sorting container to the packaging unit.

2. The drug sorting apparatus according to claim 1, wherein the first dispensing mechanism includes:

a placement table on which the sorting container is to be placed; and a tilting mechanism configured to tilt or turn upside down the placement table under a state in which the sorting container is placed on the placement table, and wherein the container takeout mechanism is configured to place the sorting container on the placement table.

3. The drug sorting apparatus according to claim 2, wherein the first dispensing mechanism further includes a holding mechanism configured to apply an external force to the sorting container so as to hold the sorting container on the placement table.

4. The drug sorting apparatus according to claim 3, wherein the holding mechanism is configured to hold the sorting container on the placement table after the sorting container is placed on the placement table.

5. The drug sorting apparatus according to claim 4, wherein the tilting mechanism is configured to tilt the holding mechanism in association with a tilting operation of the placement table, and wherein the holding mechanism is configured to be locked to the sorting container when the placement table is tilted to a predetermined angle from a horizontal state, to thereby apply the external force to the sorting container.

6. The drug sorting apparatus according to claim 5, wherein the container takeout mechanism is configured to:

take out, when the placement table is in a horizontal state, the sorting container arranged in the accommodating portion so as to place the sorting container on the placement table; and cancel grasping of the sorting container after the holding mechanism holds the sorting container on the placement table.

7. The drug sorting apparatus according to claim 4, wherein the container takeout mechanism is configured to:

take out, when the placement table is in a horizontal state, the sorting container arranged in the accommodating portion so as to place the sorting container on the placement table; and cancel grasping of the sorting container after the holding mechanism holds the sorting container on the placement table.

8. The drug sorting apparatus according to claim 2, further comprising a rocking mechanism configured to rock the sorting container placed on the placement table in a process of tilting the placement table by the first dispensing mechanism.

9. The drug sorting apparatus according to claim 2, wherein the tilting mechanism is configured to repeatedly move the placement table within a predetermined range so as to rock the sorting container placed on the placement table.

10. The drug sorting apparatus according to claim 1, further comprising a second dispensing mechanism different from the first dispensing mechanism, the second dispensing mechanism being configured to individually dispense the drug accommodated in each of the plurality of sorting containers to the packaging unit, wherein the second dispensing mechanism is configured to dispense the drug when the number of the drugs accommodated in the sorting container is larger than a defined number, and wherein the first dispensing mechanism is configured to dispense the drug when the number of the drugs accommodated in the sorting container is equal to or smaller than the defined number.

11. A drug sorting apparatus, comprising:

an accommodating portion in which a plurality of sorting containers are arrangeable, the plurality of sorting containers being configured to accommodate a plurality of types of drugs in a state of being sorted by type;

a packaging unit configured to package a drug of the plurality of types of drugs, which is accommodated in the accommodating portion;

a first dispensing mechanism configured to dispense, for each of the plurality of sorting containers, the drug accommodated in the accommodating portion to the packaging unit;

a container takeout mechanism configured to take out a sorting container of the plurality of sorting containers from the accommodating portion so as to deliver the sorting container to the first dispensing mechanism;

a placement table on which the sorting container is to be placed;

a tilting mechanism configured to tilt or turn upside down the placement table under a state in which the sorting container is placed on the placement table, and wherein the first dispensing mechanism is configured to tilt or turn upside down the sorting container received from the container takeout mechanism, to thereby dispense the drug accommodated in the sorting container to the packaging unit, and wherein the container takeout mechanism is configured to place the sorting container on the placement table.

12. The drug sorting apparatus according to claim 11, wherein the first dispensing mechanism further includes a holding mechanism configured to apply an external force to the sorting container so as to hold the sorting container on the placement table.

13. The drug sorting apparatus according to claim 12, wherein the holding mechanism is configured to hold the sorting container on the placement table after the sorting container is placed on the placement table.

14. The drug sorting apparatus according to claim 13, wherein the tilting mechanism is configured to tilt the holding mechanism in association with a tilting operation of the placement table, and wherein the holding mechanism is configured to be locked to the sorting container when the placement table is tilted to a predetermined angle from a horizontal state, to thereby apply the external force to the sorting container.

15. The drug sorting apparatus according to claim 13, wherein the container takeout mechanism is configured to:

take out, when the placement table is in a horizontal state, the sorting container arranged in the accommodating portion so as to place the sorting container on the placement table; and cancel grasping of the sorting container after the holding mechanism holds the sorting container on the placement table.

16. The drug sorting apparatus according to claim 11, further comprising a rocking mechanism configured to rock the sorting container placed on the placement table in a process of tilting the placement table by the first dispensing mechanism.

17. The drug sorting apparatus according to claim 16, wherein the rocking mechanism is the tilting mechanism, and wherein the tilting mechanism is configured to repeatedly move the placement table within a predetermined range so as to rock the sorting container placed on the placement table.

18. A drug sorting apparatus, comprising:

an accommodating portion in which a plurality of sorting containers are arrangeable, the plurality of sorting containers being configured to accommodate a plurality of types of drugs in a state of being sorted by type;

a packaging unit configured to package a drug of the plurality of types of drugs, which is accommodated in the accommodating portion;

a first dispensing mechanism configured to dispense, for each of the plurality of sorting containers, the drug accommodated in the accommodating portion to the packaging unit; and a container takeout mechanism configured to take out a sorting container of the plurality of sorting containers from the accommodating portion so as to deliver the sorting container to the first dispensing mechanism, wherein the first dispensing mechanism is configured to tilt or turn upside down the sorting container received from the container takeout mechanism, to thereby dispense the drug accommodated in the sorting container to the packaging unit, wherein the first dispensing mechanism includes:

a placement table on which the sorting container is to be placed; and a tilting mechanism configured to tilt or turn upside down the placement table under a state in which the sorting container is placed on the placement table, and wherein the container takeout mechanism is configured to place the sorting container on the placement table.

* * * * *